United States Patent
Nomura et al.

(10) Patent No.: US 9,792,528 B2
(45) Date of Patent: *Oct. 17, 2017

(54) INFORMATION PROCESSING SYSTEM, INFORMATION PROCESSING METHOD, INFORMATION PROCESSING APPARATUS AND CONTROL METHOD AND CONTROL PROGRAM THEREOF, AND COMMUNICATION TERMINAL AND CONTROL METHOD AND CONTROL PROGRAM THEREOF

(71) Applicant: NEC Corporation, Tokyo (JP)

(72) Inventors: Toshiyuki Nomura, Tokyo (JP); Akio Yamada, Tokyo (JP); Kota Iwamoto, Tokyo (JP); Ryota Mase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 564 days.

This patent is subject to a terminal disclaimer.

(21) Appl. No.: 14/375,524

(22) PCT Filed: Jan. 30, 2013

(86) PCT No.: PCT/JP2013/051953
§ 371 (c)(1),
(2) Date: Jul. 30, 2014

(87) PCT Pub. No.: WO2013/115202
PCT Pub. Date: Aug. 8, 2013

(65) Prior Publication Data
US 2015/0010237 A1    Jan. 8, 2015

(30) Foreign Application Priority Data
Jan. 30, 2012    (JP) .................... 2012-017384

(51) Int. Cl.
G06K 9/62 (2006.01)
G06K 9/32 (2006.01)
(Continued)

(52) U.S. Cl.
CPC ....... G06K 9/6232 (2013.01); G06F 17/3079 (2013.01); G06F 17/30805 (2013.01);
(Continued)

(58) Field of Classification Search
CPC ............... G06K 9/6232; G06K 9/3241; G06K 9/00771; G06K 9/4671; G06T 7/74;
(Continued)

(56) References Cited

U.S. PATENT DOCUMENTS 6,711,293 B1  3/2004 Lowe
8,027,514 B2  9/2011 Takaki et al.
(Continued)

FOREIGN PATENT DOCUMENTS

JP    2004-151820    5/2004
JP    2005-222250    8/2005
(Continued)

OTHER PUBLICATIONS

Li et al. "SURFTrac: Efficient Tracking and Continuous Object Recognition using Local Feature Descriptors" Presentation for EECS 598, Nov. 2010, pp. 1-17.*
(Continued)

Primary Examiner — Chan Park
Assistant Examiner — Mia M Thomas
(74) Attorney, Agent, or Firm — Young & Thompson

(57) ABSTRACT

A search object and m-number of first local features respectively constituted by a feature vector of 1 to i dimensions of local areas of m-number of feature points in an image of the search object are stored, feature points are extracted from the image, second local features respectively constituted by a (Continued)

feature vector of 1 dimension to j dimensions are generated with respect to local areas of n-number of feature points, a smaller number of dimensions among the number of dimensions i of the first local features and the number of dimensions j of the second local features is selected, and an existence of the search object in the image in the video is recognized when a prescribed ratio of the m-number of first local features up to the selected number of dimensions corresponds to the n-number of second local features up to the selected number of dimensions.

19 Claims, 42 Drawing Sheets

(51) Int. Cl.
    *G06F 17/30*     (2006.01)
    *G06K 9/00*     (2006.01)
    *G06K 9/46*     (2006.01)
    *G06T 7/73*     (2017.01)

(52) U.S. Cl.
    CPC ....... *G06K 9/00771* (2013.01); *G06K 9/3241* (2013.01); *G06K 9/4671* (2013.01); *G06T 7/74* (2017.01); *G06T 2207/30112* (2013.01); *G06T 2207/30232* (2013.01)

(58) Field of Classification Search
    CPC . G06T 2207/30112; G06T 2207/30232; G06F 17/3079; G06F 17/30805
    See application file for complete search history.

(56) References Cited

U.S. PATENT DOCUMENTS

| | | | | |
|---|---|---|---|---|
| 8,064,685 B2* | 11/2011 | Solem | ................ | G06K 9/00214 382/118 |
| 8,515,180 B2* | 8/2013 | Kato | ................ | G06K 9/00281 382/195 |
| 9,053,371 B2* | 6/2015 | Ko | ................ | G06K 9/00771 |
| 9,313,359 B1* | 4/2016 | Stojancic | ................ | H04N 1/32 |
| 9,530,081 B2* | 12/2016 | Kami | ................ | G06K 9/6215 |
| 2004/0125991 A1* | 7/2004 | Yokoi | ................ | G06K 9/00268 382/115 |
| 2010/0045423 A1* | 2/2010 | Glickman | ................ | G06Q 10/087 340/5.1 |
| 2010/0054611 A1* | 3/2010 | Nomura | ................ | G06K 9/6212 382/224 |
| 2011/0158542 A1* | 6/2011 | Kato | ................ | G06K 9/00281 382/195 |
| 2012/0109901 A1* | 5/2012 | Mase | ................ | G06F 17/30265 707/687 |
| 2012/0237081 A1* | 9/2012 | Datta | ................ | G06K 9/00778 382/103 |
| 2013/0039566 A1* | 2/2013 | Reznick | ................ | G06T 9/005 382/154 |
| 2013/0113929 A1* | 5/2013 | DeLand | ................ | G06K 9/00677 348/143 |
| 2013/0194428 A1* | 8/2013 | Chao | ................ | G01C 21/20 348/159 |
| 2013/0208984 A1* | 8/2013 | Mase | ................ | G06K 9/00624 382/190 |
| 2013/0254191 A1* | 9/2013 | He | ................ | G06F 17/3053 707/728 |
| 2013/0302017 A1* | 11/2013 | Nomura | ................ | H04N 9/8227 386/278 |
| 2013/0314601 A1* | 11/2013 | Nomura | ................ | G11B 27/34 348/571 |
| 2013/0322696 A1* | 12/2013 | Nomura | ................ | G06K 9/00624 382/103 |
| 2014/0092244 A1* | 4/2014 | Tang | ................ | G06F 17/3079 348/143 |
| 2014/0301647 A1* | 10/2014 | Mase | ................ | G06K 9/4671 382/195 |
| 2014/0310097 A1* | 10/2014 | Nomura | ................ | G06Q 30/0252 705/14.49 |
| 2014/0321755 A1* | 10/2014 | Iwamoto | ................ | G06K 9/4671 382/197 |
| 2014/0321765 A1* | 10/2014 | Iwamoto | ................ | H04N 19/54 382/243 |
| 2014/0328543 A1* | 11/2014 | Iwamoto | ................ | G06K 9/4604 382/201 |
| 2014/0334668 A1* | 11/2014 | Saund | ................ | G06T 7/20 382/103 |
| 2014/0376815 A1* | 12/2014 | Nomura | ................ | G06F 17/30784 382/195 |
| 2015/0003704 A1* | 1/2015 | Nomura | ................ | G06K 9/6232 382/128 |
| 2015/0213328 A1* | 7/2015 | Mase | ................ | G06K 9/4642 382/201 |
| 2015/0220810 A1* | 8/2015 | Mase | ................ | G06K 9/6202 382/195 |
| 2015/0356374 A1* | 12/2015 | Mase | ................ | G06K 9/4671 382/195 |

FOREIGN PATENT DOCUMENTS

| | | |
|---|---|---|
| JP | 2005-347905 | 12/2005 |
| JP | 2008-003753 | 1/2008 |
| JP | 2008-257649 | 10/2008 |
| JP | 2010-277264 | 12/2010 |
| JP | 2011-008507 | 1/2011 |
| JP | 2011-198130 | 10/2011 |
| JP | 2011-221688 | 11/2011 |
| JP | 2011-242861 | 12/2011 |

OTHER PUBLICATIONS

Ta et al. "SURFTrac: Efficient Tracking and Continuous Object Recognition using Local Feature Descriptors" IEEE Conference on Computer Vision and Pattern Recognition, 2009. June CVPR 2009. pp. 1-8.*
Ahmed, Y. "Multiple Random Projection for Fast, Approximate Nearest Neighbor Search in High Dimensions" Univ of Toronto, Copyright 2004, pp. 1-92.*
David G. Lowe, "Distinctive Image Features from Scale-Invariant key points", International Journal of Computer Vision, 2004, pp. 91 to 110.
International Search Report PCT/JP2013/051953 dated Mar. 12, 2013.
Hironobu Fujiyoshi, "Gradient-Based Feature Extraction: SIFT and HOG", IEICE Technical Report, Aug. 27, 2007 (Aug. 27, 2007), vol. 107, No. 206, pp. 211 to 224.
Japanese Office Action dated Dec. 27, 2016 in corresponding Japanese Patent Application No. 2013-556424 with English translation of Japanese Office Action.
Yan Ke et al., "PCA-SIFT: A More Distinctive Representation for Local Image Descriptors", Proceedings of the 2004 IEEE Computer Society Conference on Computer Vision and Pattern Recognition, vol. 2, pp. 506-513, IEEE Computer Society.
Ryo Mukai et al., "A Report on the TRECVID 2010 Content-Based Copy Detection Task", IEICE Technical Report PRMU2010-217 (Feb. 2011), pp. 55-60, The Institute of Electronics, Information and Communication Engineers.

* cited by examiner

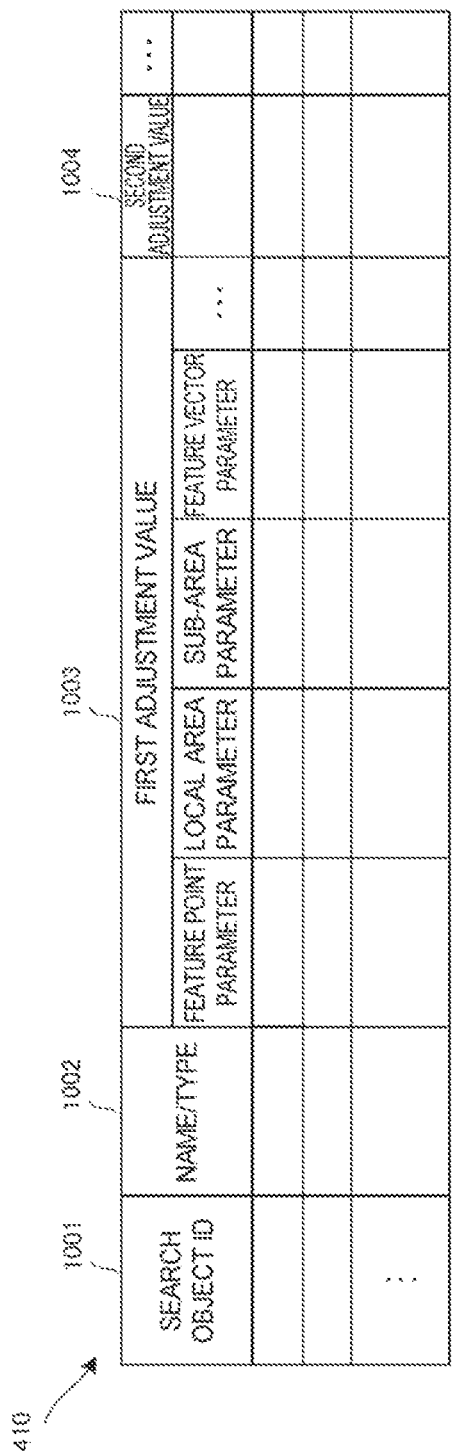

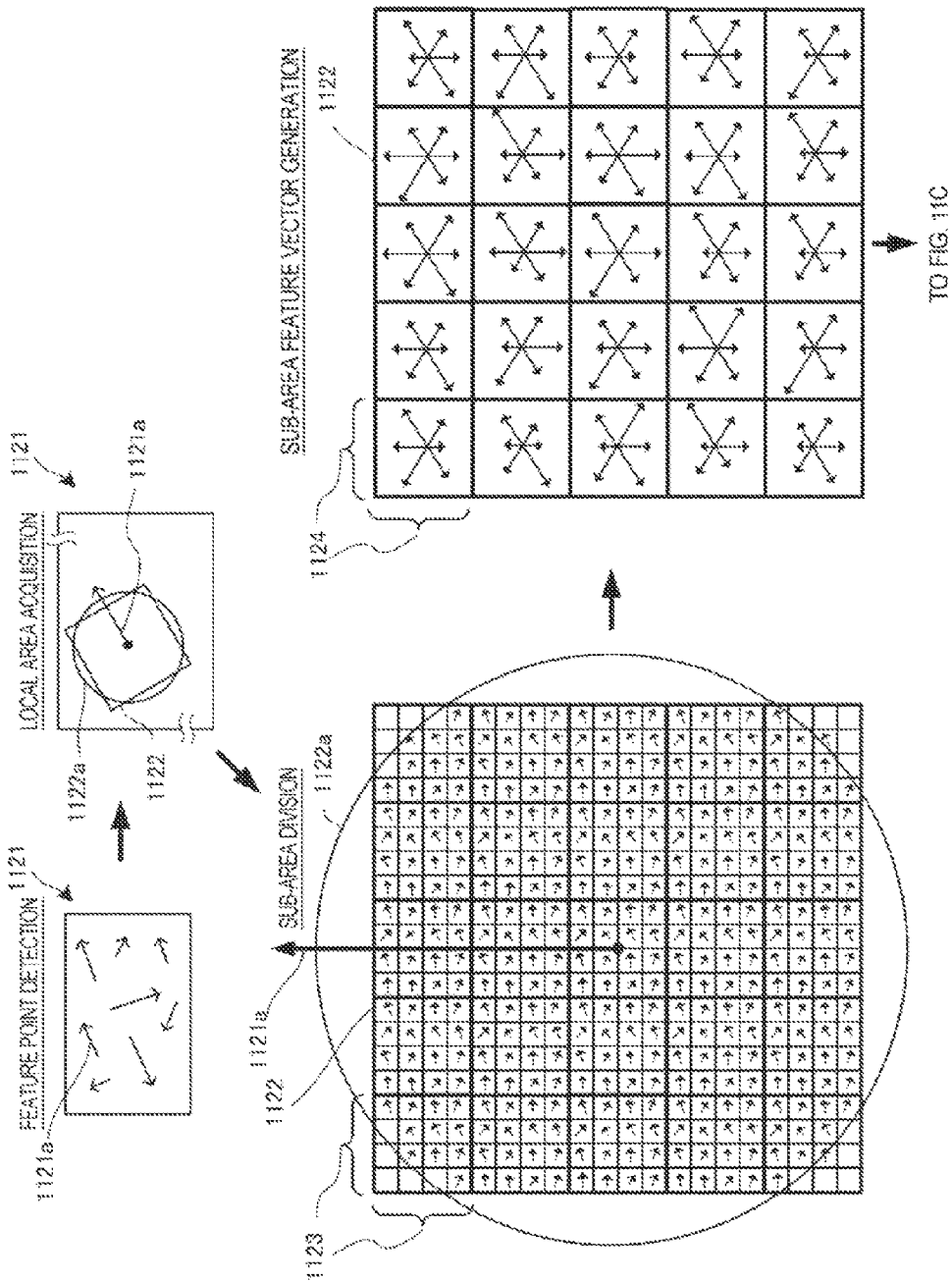

Fig. 11D

|  |  |  |  |  |
|---|---|---|---|---|
| 22 | 14 | 10 | 18 | 23 |
| 21 | 6 | 2 | 24 | 15 |
| 13 | 5 | 1 | 3 | 11 |
| 124 | 9 | 4 | 8 | 19 |
| 25 | 20 | 12 | 16 | 24 |

1141

|  |  |  |  |  |
|---|---|---|---|---|
| 10 | 18 | 6 | 22 | 11 |
| 25 | 2 | 14 | 3 | 19 |
| 9 | 124 | 1 | 15 | 24 |
| 21 | 5 | 16 | 4 | 23 |
| 13 | 24 | 8 | 20 | 12 |

1142

|  |  |  |  |  |
|---|---|---|---|---|
| 22 | 14 | 10 | 18 | 23 |
| 21 | 6 | 2 | 24 | 15 |
| 13 | 5 | 1 | 3 | 11 |
| 124 | 9 | 4 | 8 | 19 |
| 25 | 20 | 12 | 16 | 24 |

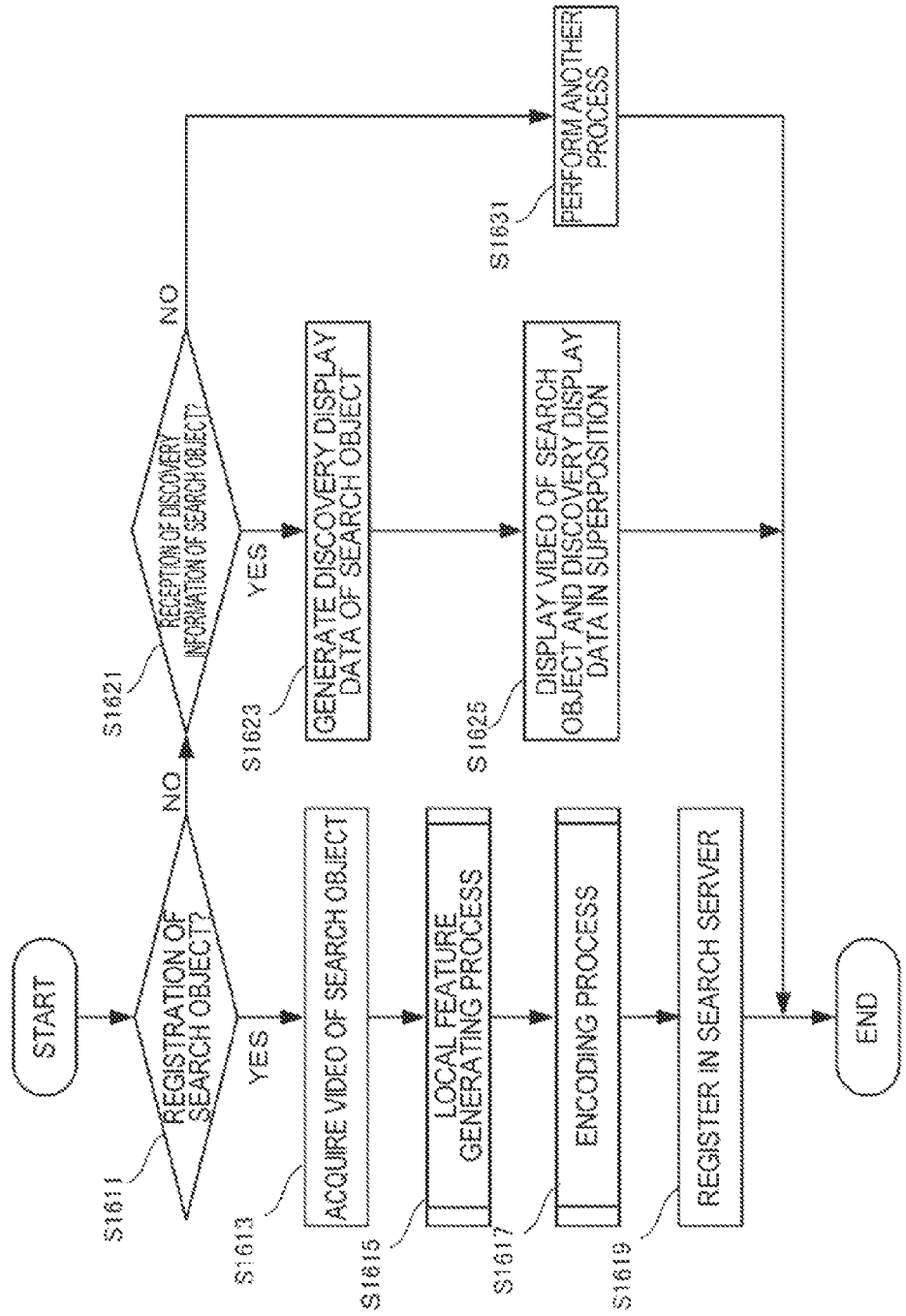

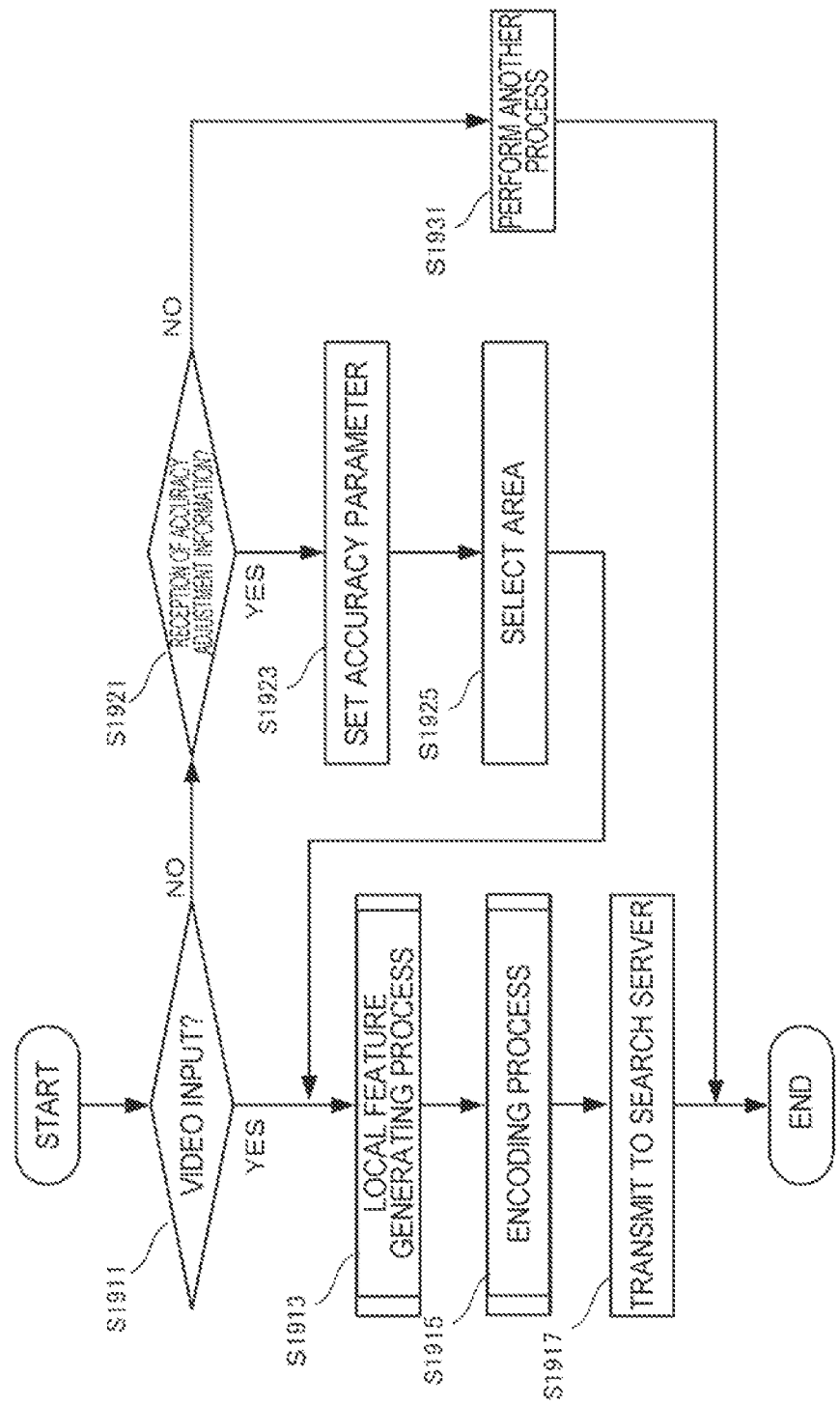

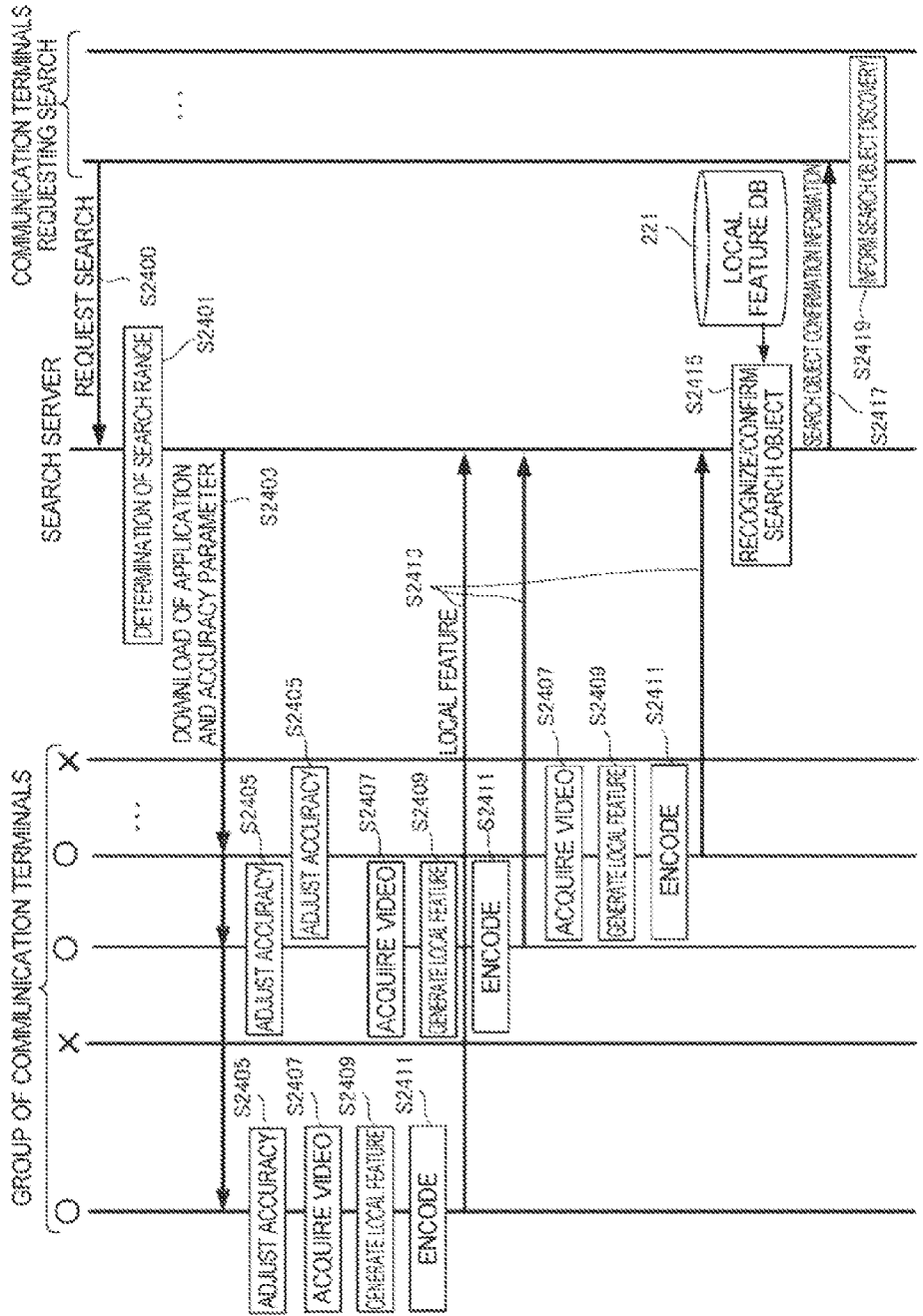

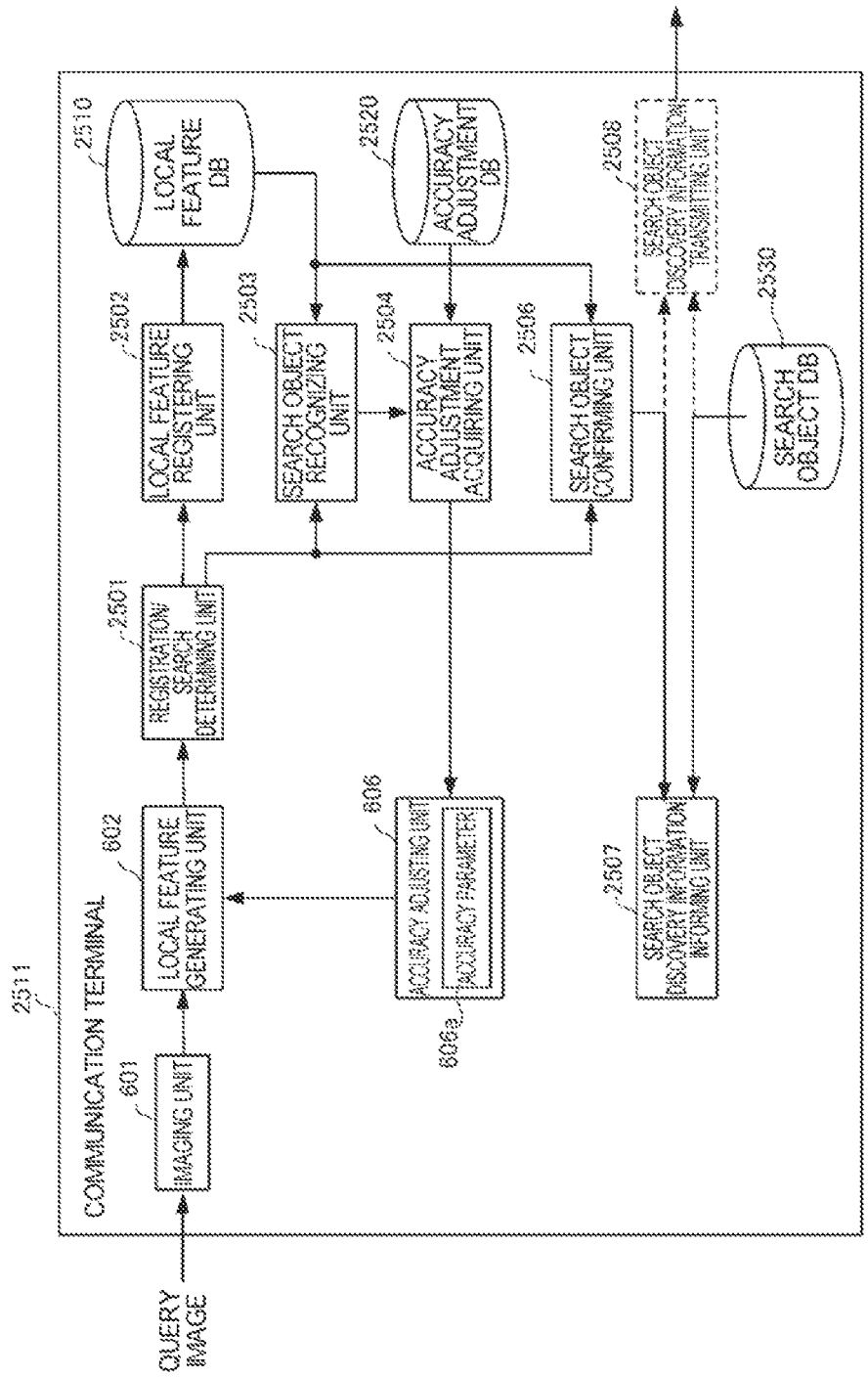

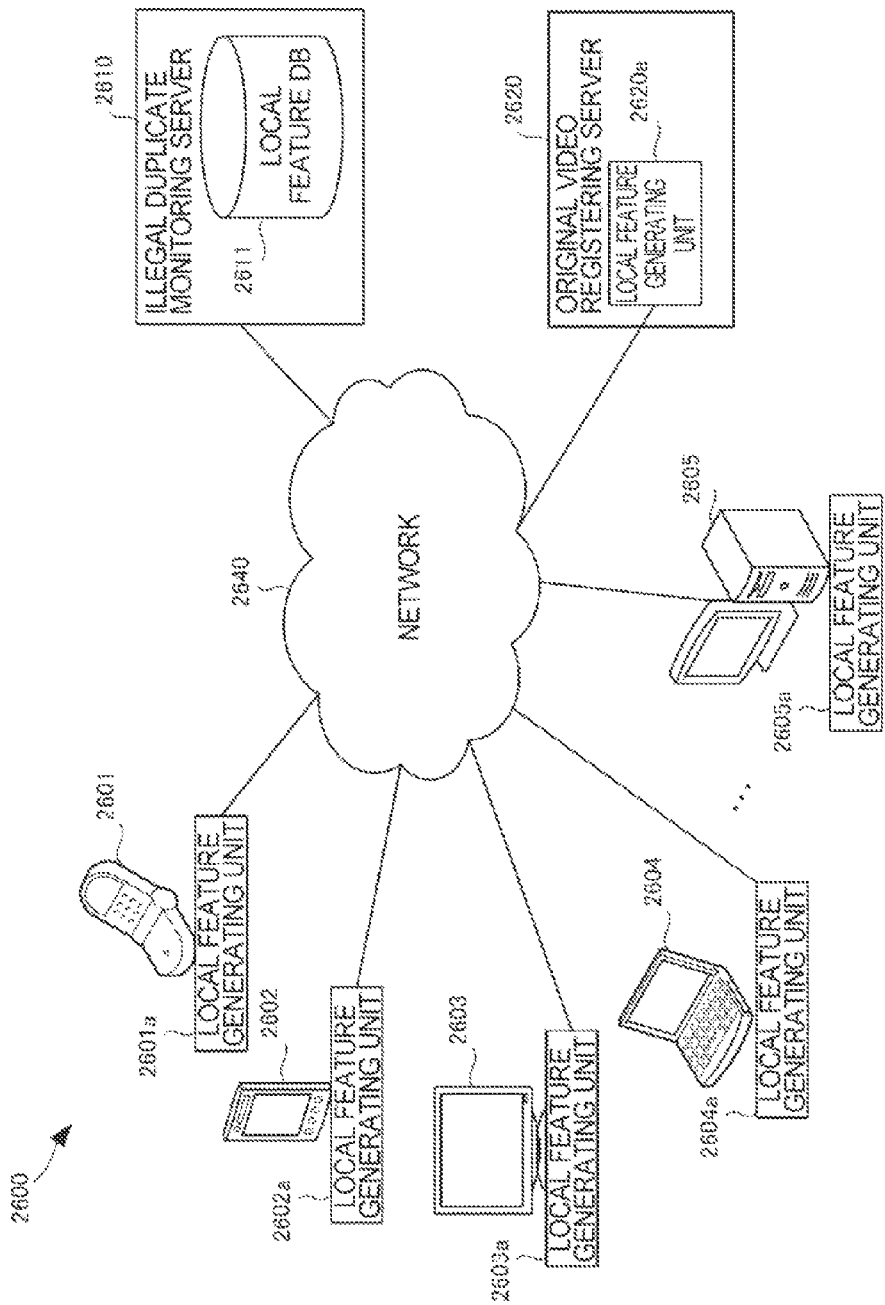

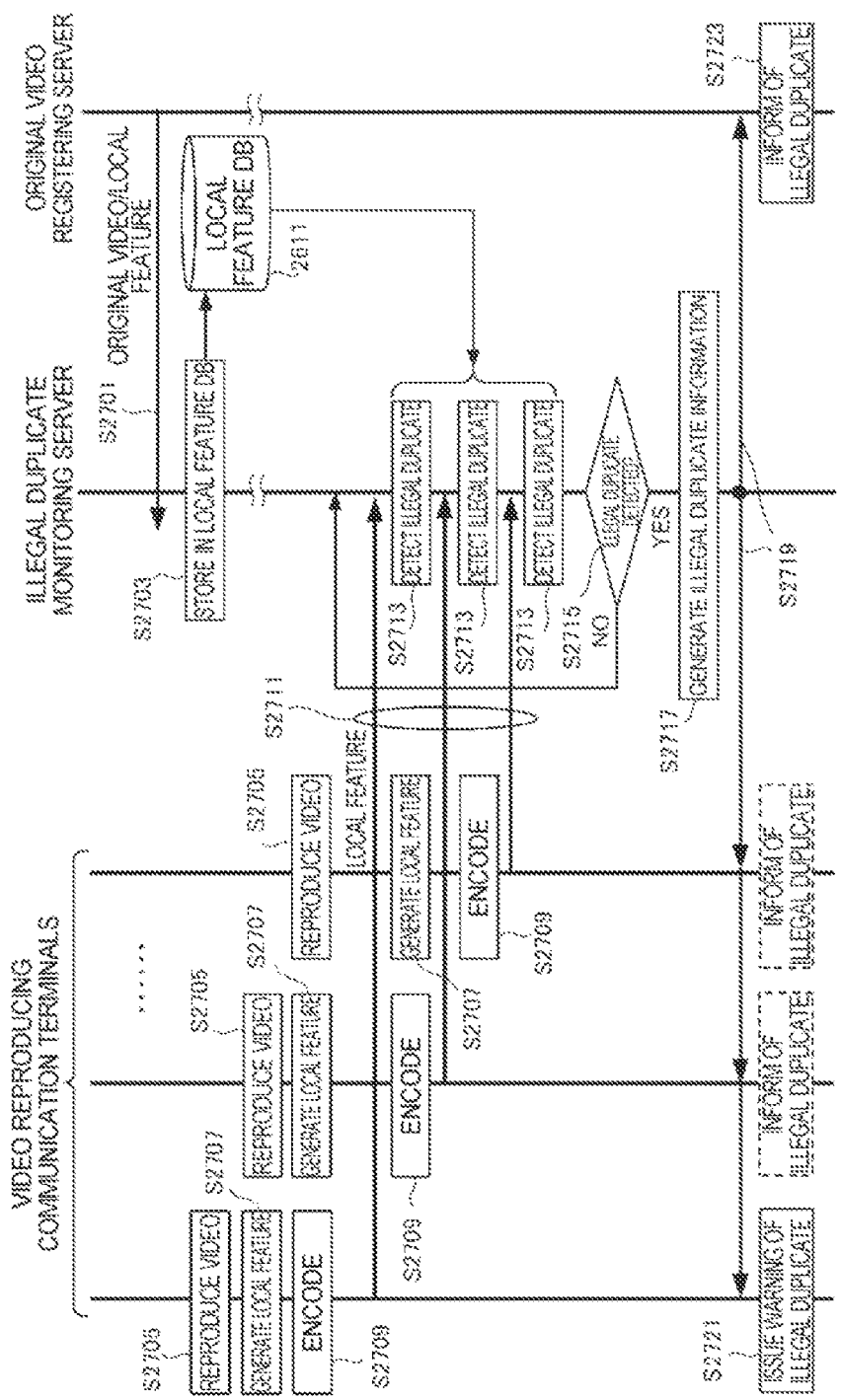

INFORMATION PROCESSING SYSTEM, INFORMATION PROCESSING METHOD, INFORMATION PROCESSING APPARATUS AND CONTROL METHOD AND CONTROL PROGRAM THEREOF, AND COMMUNICATION TERMINAL AND CONTROL METHOD AND CONTROL PROGRAM THEREOF

BACKGROUND

The present invention relates to a technique for finding a search object from a video captured using a local feature.

In the technical field described above, Patent Document 1 describes a technique for searching a match between image information of a search request and provided image information and providing a search result for a search target to a search requester. In addition, Patent Document 2 describes a technique for improving recognition speed by clustering features when recognizing a query image using a model dictionary generated in advance from a model image.

Patent Document 1: Patent Publication JP-A-2005-222250

Patent Document 2: Patent Publication JP-A-2011-221688

SUMMARY

However, with the techniques described in the documents above, a search object in an image in a video cannot be recognized in real time.

An object of the present invention is to provide a technique for solving the problem described above.

In order to achieve the object described above, a system according to the present invention includes:

first local feature storing unit that stores, in association with each other, a search object and m-number of first local features which are respectively constituted by a feature vector of 1 dimension to i dimensions and which are generated for each of m-number of local areas including each of m-number of feature points in an image of the search object;

second local feature generating unit that extracts n-number of feature points from an image of a video captured by first imaging unit, and that generates n-number of second local features respectively constituted by a feature vector of 1 dimension to j dimensions for n-number of local areas including each of the n-number of feature points; and recognizing unit that selects a smaller number of dimensions among the number of dimensions i of the feature vector of the first local feature and the number of dimensions j of the feature vector of the second local feature, and that recognizes that the search object exists in the image in the video when determining that a prescribed ratio or more of the m-number of first local features constituted by a feature vector up to the selected number of dimensions corresponds to the n-number of second local features constituted by a feature vector up to the selected number of dimensions.

In order to achieve the object described above, a method according to the present invention is an information processing method of an information processing system including first local feature storing unit that stores, in association with each other, a search object and m-number of first local features which are respectively constituted by a feature vector of 1 dimension to i dimensions and which are generated for each of m-number of local areas including each of m-number of feature points in an image of the search object, the method including the steps of:

extracting n-number of feature points from an image of a video captured by first imaging unit and generating n-number of second local features respectively constituted by a feature vector of 1 dimension to j dimensions for n-number of local areas including each of the n-number of feature points; and selecting a smaller number of dimensions among the number of dimensions i of the feature vector of the first local feature and the number of dimensions j of the feature vector of the second local feature, and recognizing that the search object exists in the image in the video when determining that a prescribed ratio or more of the m-number of first local features constituted by a feature vector up to the selected number of dimensions corresponds to the n-number of second local features constituted by a feature vector up to the selected number of dimensions.

In order to achieve the object described above, an apparatus according to the present invention includes:

second local feature generating unit that extracts n-number of feature points from an image in a captured video and that generates n-number of second local features respectively constituted by a feature vector of 1 dimension to j dimensions for n-number of local areas including each of the n-number of feature points; and first transmitting unit that transmits the n-number of second local features to an information processing apparatus that recognizes a search object included in the captured image based on a collation of local features.

In order to achieve the object described above, a method according to the present invention includes the steps of:

extracting n-number of feature points from an image in a captured video and generating n-number of second local features respectively constituted by a feature vector of 1 dimension to j dimensions for n-number of local areas including each of the n-number of feature points; and transmitting the n-number of second local features to an information processing apparatus that recognizes a search object included in the captured image based on a collation of local features.

In order to achieve the object described above, a program according to the present invention causes a computer to execute the steps of:

extracting n-number of feature points from an image of a captured video and generating n-number of second local features respectively constituted by a feature vector of 1 dimension to j dimensions for n-number of local areas including each of the n-number of feature points;

transmitting the n-number of second local features to an information processing apparatus that recognizes a search object included in the captured image based on a collation of local features.

In order to achieve the object described above, an apparatus according to the present invention includes:

first local feature generating unit that extracts m-number of feature points from a captured image of a search object and that generates m-number of first local features respectively constituted by a feature vector of 1 dimension to i dimensions for m-number of local areas including each of the m-number of feature points;

second transmitting unit that transmits the m-number of first local features to an information processing apparatus that recognizes whether or not a captured search object is included in another image based on a collation of local features; and first receiving unit that receives information indicating the captured search object included in the other image from the information processing apparatus.

In order to achieve the object described above, a method according to the present invention includes the steps of:

extracting m-number of feature points from a captured image of a search object and generating m-number of first local features respectively constituted by a feature vector of 1 dimension to i dimensions for m-number of local areas including each of the m-number of feature points;

transmitting the m-number of first local features to an information processing apparatus that recognizes whether or not a captured search object is included in another image based on a collation of local features; and receiving information indicating the captured search object included in the other image from the information processing apparatus.

In order to achieve the object described above, a program according to the present invention causes a computer to execute the steps of:

extracting m-number of feature points from a captured image of a search object and generating m-number of first local features respectively constituted by a feature vector of 1 dimension to i dimensions for m-number of local areas including each of the m-number of feature points;

transmitting the m-number of first local features to an information processing apparatus that recognizes whether or not a captured search object is included in another image based on a collation of local features; and receiving information indicating the captured search object included in the other image from the information processing apparatus.

In order to achieve the object described above, an apparatus according to the present invention includes:

first local feature storing unit that stores, in association with each other, a search object and m-number of first local features which are respectively constituted by a feature vector of 1 dimension to i dimensions and which are generated for each of m-number of local areas including each of m-number of feature points in an image of the search object;

second receiving unit that extracts n-number of feature points from an image of a video captured by a first communication terminal which searches for the search object and that receives, from the first communication terminal, n-number of second local features respectively constituted by a feature vector of 1 dimension to j dimensions for n-number of local areas including each of the n-number of feature points;

recognizing unit that selects a smaller number of dimensions among the number of dimensions i of the feature vector of the first local feature and the number of dimensions j of the feature vector of the second local feature and that recognizes that the search object exists in the image in the video when determining that a prescribed ratio or more of the m-number of first local features constituted by a feature vector up to the selected number of dimensions corresponds to the n-number of second local features constituted by a feature vector up to the selected number of dimensions; and second transmitting unit that transmits information indicating the recognized search object to a second communication terminal having requested a search for the search object.

In order to achieve the object described above, a method according to the present invention is a control method of an information processing apparatus including first local feature storing unit that stores, in association with each other, a search object and m-number of first local features which are respectively constituted by a feature vector of 1 dimension to i dimensions and which are generated for each of m-number of local areas including each of m-number of feature points in an image of the search object, the method including the steps of:

extracting n-number of feature points from an image of a video captured by a first communication terminal that searches for the search object and receiving, from the first communication terminal, n-number of second local features respectively constituted by a feature vector of 1 dimension to j dimensions for n-number of local areas including each of the n-number of feature points;

selecting a smaller number of dimensions among the number of dimensions i of the feature vector of the first local feature and the number of dimensions j of the feature vector of the second local feature and recognizing that the search object exists in the image in the video when determining that a prescribed ratio or more of the m-number of first local features constituted by a feature vector up to the selected number of dimensions corresponds to the n-number of second local features constituted by a feature vector up to the selected number of dimensions; and transmitting information indicating the recognized search object to a second communication terminal having requested a search for the search object.

In order to achieve the object described above, a program according to the present invention is a control program of an information processing apparatus including first local feature storing unit that stores, in association with each other, a search object and m-number of first local features which are respectively constituted by a feature vector of 1 dimension to i dimensions and which are generated for each of m-number of local areas including each of m-number of feature points in an image of the search object, the program causing a computer to execute the steps of:

extracting n-number of feature points from an image of a video captured by a first communication terminal that searches for the search object and receiving, from the first communication terminal, n-number of second local features respectively constituted by a feature vector of 1 dimension to j dimensions for n-number of local areas including each of the n-number of feature points;

selecting a smaller number of dimensions among the number of dimensions i of the feature vector of the first local feature and the number of dimensions j of the feature vector of the second local feature and recognizing that the search object exists in the image in the video when determining that a prescribed ratio or more of the m-number of first local features constituted by a feature vector up to the selected number of dimensions corresponds to the n-number of second local features constituted by a feature vector up to the selected number of dimensions; and transmitting information indicating the recognized search object to a second communication terminal having requested a search for the search object.

According to the present invention, a search object in an image in a video can be recognized in real time.

DESCRIPTION OF DRAWINGS

FIG. 10 is a diagram showing a configuration of an accuracy adjustment DB according to the second embodiment of the present invention;

FIG. 11B is a diagram illustrating a procedure of local feature generation according to the second embodiment of the present invention;

FIG. 11D is a diagram showing a selection order of sub-areas in a local feature generating unit according to the second embodiment of the present invention;

FIG. 11F is a diagram showing hierarchization of feature vectors in the local feature generating unit according to the second embodiment of the present invention;

FIG. 16 is a flow chart showing a processing procedure of the search requesting communication terminal according to the second embodiment of the present invention;

FIG. 19 is a flow chart showing a processing procedure of the searching communication terminal according to the second embodiment of the present invention;

FIG. 24 is a sequence diagram showing an operational procedure of an information processing system according to a fourth embodiment of the present invention; and FIG. 25 is a block diagram showing a functional configuration of a communication terminal according to a fifth embodiment of the present invention.

FIG. 26 is a block diagram showing a configuration of an information processing system according to a sixth embodiment of the present invention;

FIG. 27 is a sequence diagram showing an operational procedure of the information processing system according to the sixth embodiment of the present invention.

DETAILED DESCRIPTION

Hereinafter, embodiments of the present invention will be illustratively described in detail with reference to the drawings. However, the components described in the following embodiments are merely exemplary and are not intended to limit the technical scope of the present invention thereto.

First Embodiment

An information processing system 100 as a first embodiment of the present invention will be described with reference to FIG. 1. The information processing system 100 is a system for finding a search object from a video captured using a local feature.

Figure 1:
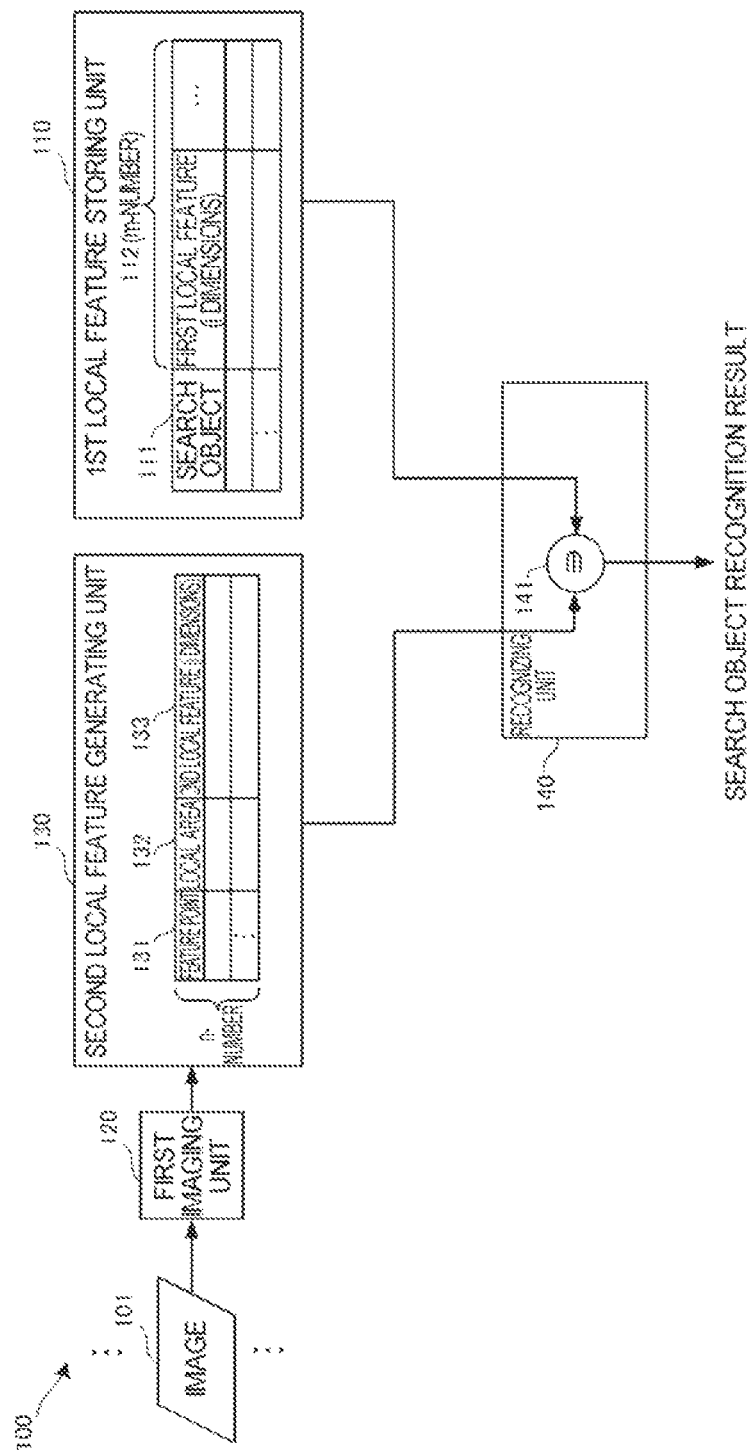
FIG. 1 is a block diagram showing a configuration of an information processing system according to a first embodiment of the present invention.

As shown in FIG. 1, the information processing system 100 includes a first local feature storing unit 110, a first imaging unit 120, a second local feature generating unit 130, and a recognizing unit 140. The first local feature storing unit 110 stores, in association with each other, a search object 111 and m-number of first local features 112 which are respectively constituted by a feature vector of 1 dimension to i dimensions and which are generated for each of m-number of local areas including each of m-number of feature points in an image of the search object 111. The second local feature generating unit 130 extracts n-number of feature points 131 from an image 101 in a video captured by the first imaging unit 120. In addition, the second local feature generating unit 130 generates n-number of second local features 133 respectively constituted by a feature vector of 1 dimension to j dimensions for n-number of local areas 132 including each of the n-number of feature points. The recognizing unit 140 selects a smaller number of dimensions among the number of dimensions i of the feature vector of the first local feature 112 and the number of dimensions j of the feature vector of the second local feature 133. In addition, the recognizing unit 140 recognizes that the search object 111 exists in the image 101 in the video when determining (141) that a prescribed ratio or more of the m-number of first local features 112 constituted by feature vectors up to the selected number of dimensions corresponds to the n-number of second local features 133 constituted by feature vectors up to the selected number of dimensions.

According to the present embodiment, a search object in an image in a video can be recognized in real time.

Second Embodiment

Next, an information processing system according to a second embodiment of the present invention will be described. In the present embodiment, a request for a search object including a stolen article and a lost article is received together with a local feature of an image of the search object. Subsequently, based on a collation with local features received from various communication terminals, the search object is found and informed to a searcher. Moreover, while the present embodiment will be described using an example where a search object is a stolen article or a lost article, the search object may alternatively be a person.

According to the present embodiment, a search object in an image in a video can be found in real time.

Configuration of Information Processing System

Figure 2:
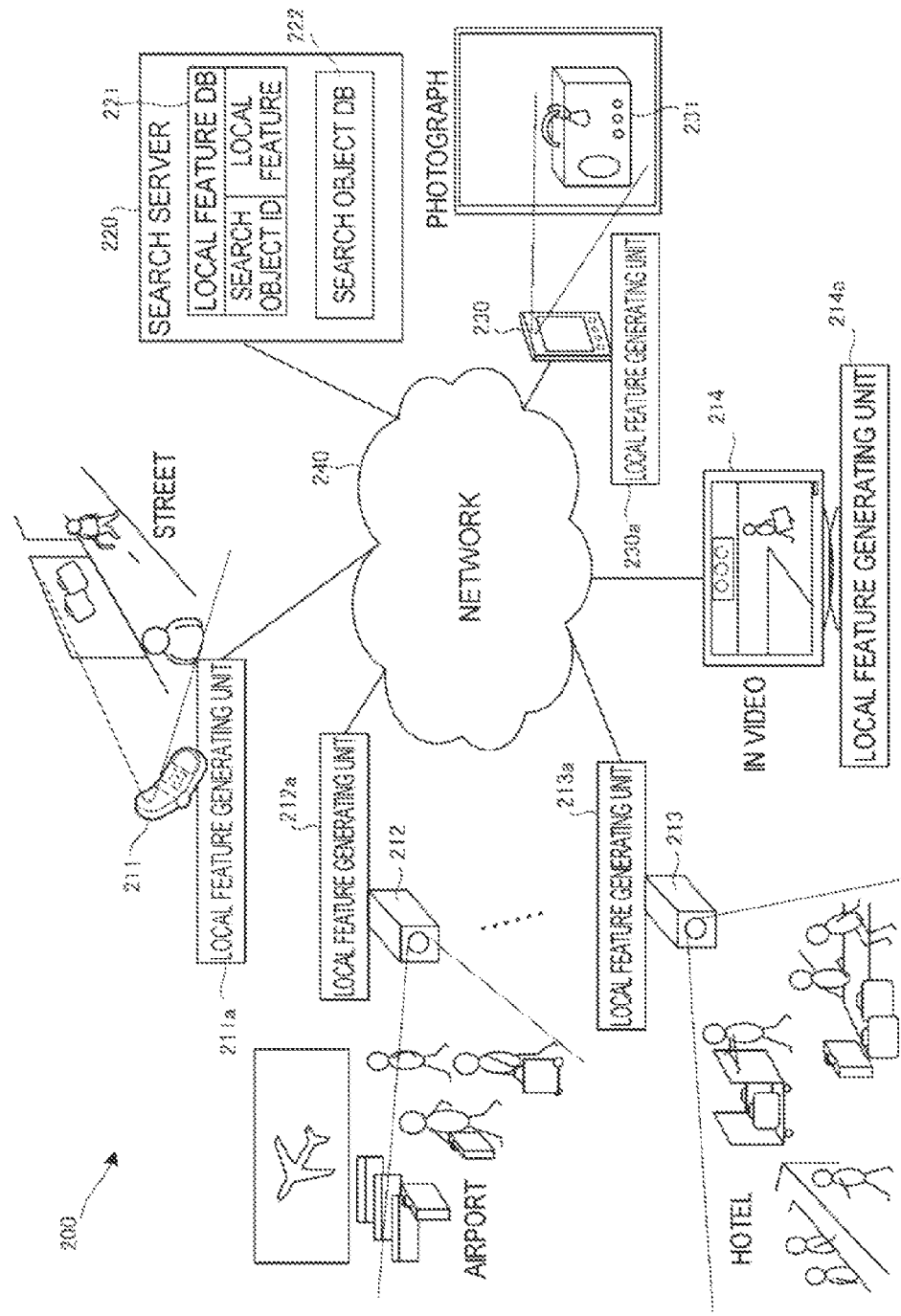
FIG. 2 is a block diagram showing a configuration of an information processing system according to a second embodiment of the present invention.

FIG. 2 is a block diagram showing a configuration of an information processing system 200 according to the present embodiment.

The information processing system 200 shown in FIG. 2 acquires a local feature of a stolen article or a lost article by taking a photograph and finds the stolen article or the lost article from a video taken by surveillance cameras placed at various locations or a camera of a personal mobile terminal, a broadcast video, or a reproduced video. The information processing system 200 includes searching communication terminals 211 to 214, a search server 220 that is an information processing apparatus, and a search requesting communication terminal 230 which are respectively connected via a network 240.

In the information processing system 200 shown in FIG. 2, the searching communication terminals 211 to 214 include a mobile terminal 211 equipped with a camera, surveillance cameras 212 and 213 placed at various locations, and a broadcast reproduction device 214. Moreover, in FIG. 2, the surveillance camera 212 is a surveillance camera at an airport and the surveillance camera 213 is a surveillance camera in a hotel. The searching communication terminals 211 to 214 respectively include local feature generating units 211a and 214a, generate a local feature from a captured video, and transmit the local feature to the search server. Moreover, the searching communication terminals 211 to 214 need not necessarily be used exclusively for searching and, while performing their roles, may transmit a local feature to the search server 220 in parallel on a constant basis or for a period specified by the search server 220.

In addition, the information processing system 200 includes a mobile terminal equipped with a camera as the search requesting communication terminal 230. The search requesting communication terminal 230 includes a local feature generating unit 230a and generates a local feature from a captured video. In FIG. 2, a photograph of a bag 231 that is a stolen article or a lost article is taken by a camera and a local feature of the bag 231 is generated by the local feature generating unit 230a.

In addition, the information processing system 200 includes the search server 220 which collates the local feature of the bag 231 for which a search is requested by the search requesting communication terminal 230 with local features received from the searching communication terminals 211 to 214 and which searches for the bag 231 from a video. The search server 220 includes a local feature DB 221 (refer to FIG. 8) that stores a local feature in association with a search object for which a search is requested by the search requesting communication terminal 230 and a search object DB 222 (refer to FIG. 9) that stores an owner of the search object and the like. The search server 220 collates a local feature stored in the local feature DB 221 with local features received from the searching communication terminals 211 to 214. Subsequently, when the search object is found, a search result thereof is informed to the search requesting communication terminal 230.

Operation of Information Processing System

Figure 3:
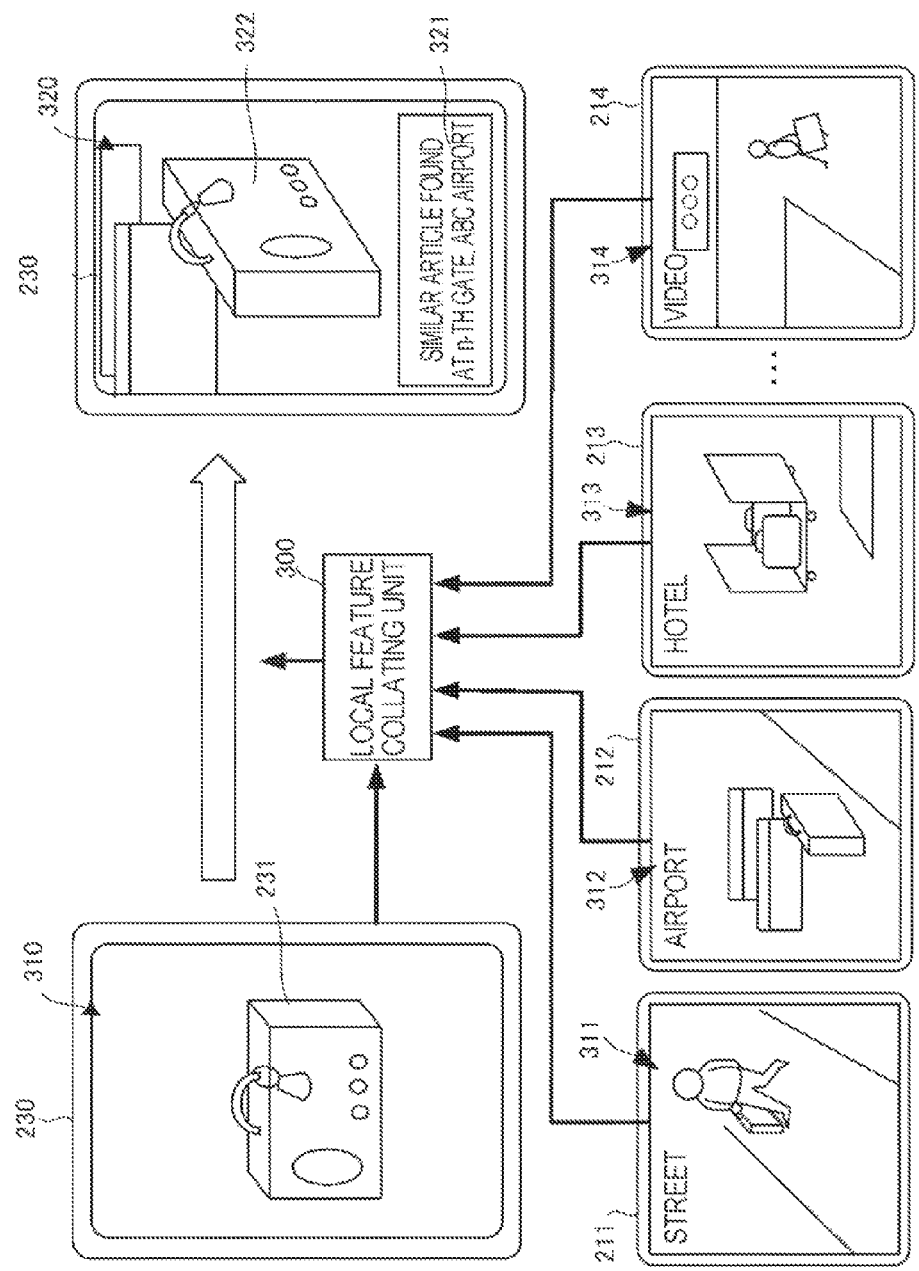
FIG. 3 is a diagram illustrating an operation of an information processing system according to the second embodiment of the present invention.

FIG. 3 is a diagram illustrating an operation of the information processing system 200 according to the present embodiment.

An image 310 taken by the search requesting communication terminal 230 of the photographed bag 231 that is a stolen article or a lost article shows the bag 231.

A local feature is generated from the image 310. Meanwhile, respective local features are generated from videos 311 to 314 captured by the searching communication terminals 211 to 214. The local features are collated by a local feature collating unit 300, and when the local feature generated from the image 310 matches a part of the local features generated from the videos 311 to 314, a determination is made that the bag 231 exists in the videos captured by the searching communication terminals 211 to 214.

For example, when it is determined that the bag 231 exists in the video 312 of an airport captured by the searching communication terminal 212, an image 320 in which a bag 322 that is a search object candidate in the video from the airport and a search result 321 are superimposed is informed to the search requesting communication terminal 230. A comment reading "Similar article found at n-th gate, ABC airport" is informed in the search result 321.

Operational Procedure of Information Processing System

Figure 4:
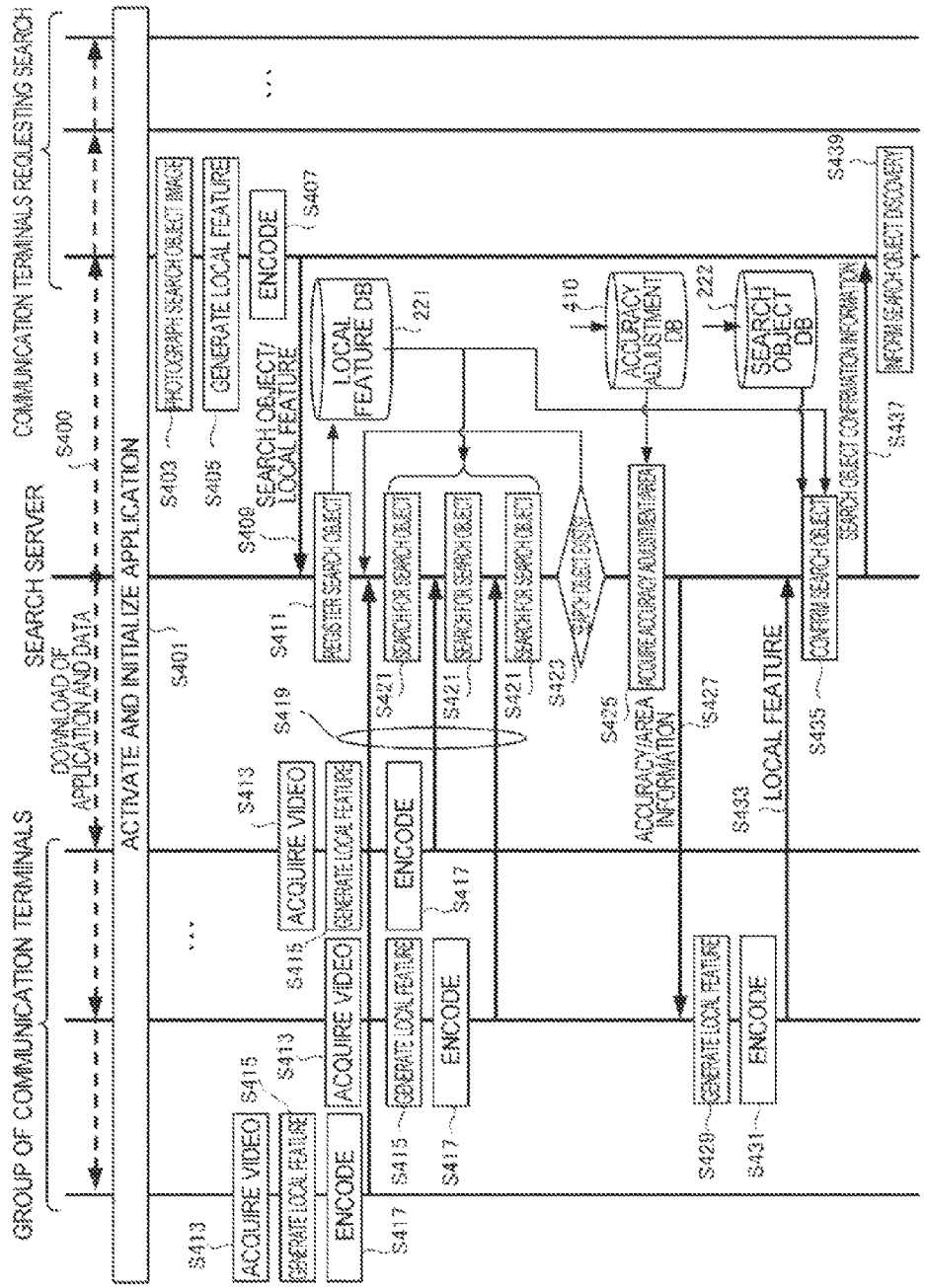
FIG. 4 is a sequence diagram showing an operational procedure of the information processing system according to the second embodiment of the present invention.

FIG. 4 is a sequence diagram showing an operational procedure of the information processing system 200 according to the present embodiment.

First, if necessary, in step S400, an application and/or data is downloaded from the search server 220 to the searching communication terminals 211 to 214 or the search requesting communication terminal 230. In step S401, the application is activated and initialized in order to perform processes of the present embodiment.

In step S403, the search requesting communication terminal 230 photographs an image of the search object. The image of the search object is desirably a photograph, a picture, or the like that includes features of an original object. Alternatively, when there is only a small number of search objects, a photograph of a similar article may be taken. In step S405, a local feature is generated from an image of the search object. Subsequently, in step S407, the local feature and a feature point coordinate are encoded. In step S409, information regarding the search object and the local feature is transmitted from the search requesting communication terminal 230 to the search server 220.

The search server 220 receives the information regarding the search object and the local feature and stores the local feature in association with a search object ID in the local feature DB 221. At the same time, the search server 220 stores the information regarding the search object in association with the search object ID in the search object DB 222. In addition, if there is an accuracy of a local feature that is suitable for expressing a feature of the search object, an accuracy parameter thereof is stored in an accuracy adjustment DB 410.

In step S413, the searching communication terminals photograph respective images. In step S415, local features are generated from the respective videos. Subsequently, in step S417, the local features are encoded together with feature point coordinates. The encoded local features are transmitted in step S419 from the searching communication terminals to the search server 220.

In step S421, the search server 220 references the local feature DB 221 and collates local features to search whether the search object exists in the respective videos. If the search object is not found, the search server 220 waits for a local feature to be received and repeats step S421. When it is determined that the search object exists, the procedure advances to step S425. In step S425, the accuracy adjustment DB 410 is referenced and an accuracy parameter of accuracy adjustment of a local feature that is suitable for confirming a search object in detail and an area in which the search object exists in the video are acquired. Subsequently, in step S427, the accuracy parameter and the area information are specified to a transmission source that had transmitted the local feature including the search object.

In FIG. 4, it is assumed that the local feature of the search object is included in a local feature of a video from a center searching communication terminal. In step S429, the searching communication terminal that is the transmission source generates a highly accurate local feature of the selected area in the video using the specified accuracy parameter. Subsequently, in step S431, the local feature and a feature point coordinate are encoded. Next, in step S433, the encoded local feature is transmitted to the search server 220.

In step S435, the search server 220 once again performs collation of the search objects using the highly accurate local features and, when the local features match, the search object is confirmed and information regarding a search source and the like is acquired from the search object DB 222. In addition, in step S437, search object confirmation information is informed to the search requesting communication terminal that is the search source.

The search requesting communication terminal that is the search source receives a search result and, in step S439, informs discovery of the search object.

In FIG. 4, a local feature is generated once again by performing accuracy adjustment and area selection. However, if a process of generating and transmitting a highly accurate local feature to begin with has only a low impact on communication traffic or a processing load on a searching communication terminal or the search server, a highly accurate local feature may simply be generated and transmitted.

Functional Configuration of Search Requesting Communication Terminal

Figure 5:
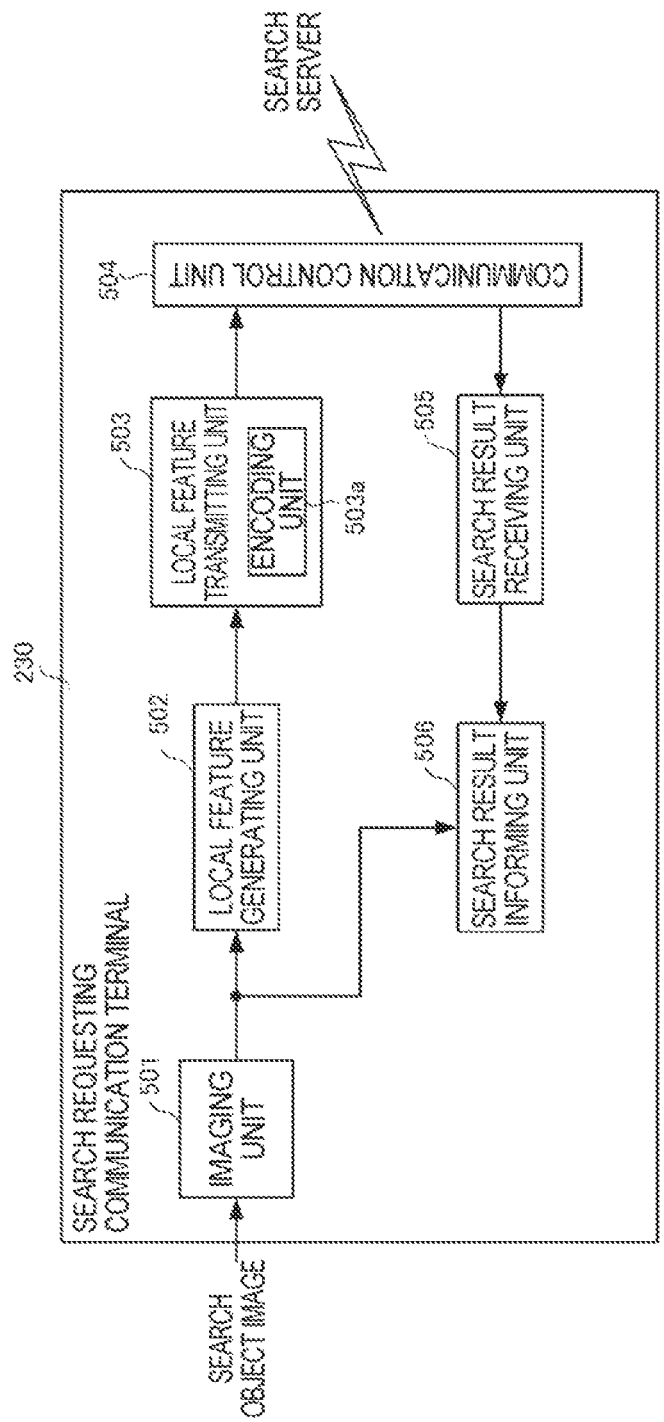
FIG. 5 is a block diagram showing a functional configuration of a search requesting communication terminal according to the second embodiment of the present invention.

FIG. 5 is a block diagram showing a functional configuration of the search requesting communication terminal 230 according to the present embodiment.

In FIG. 5, an imaging unit 501 inputs an image of the search object. A local feature generating unit 502 generates a local feature from a video from the imaging unit 501. The generated local feature is encoded together with a feature point coordinate by an encoding unit 503a of a local feature transmitting unit 503. In addition, the local feature transmitting unit 503 transmits the search object information and the local feature to the search server via a communication control unit 504.

A search result receiving unit 505 receives a search result via the communication control unit 504. In addition, a search result informing unit 506 informs the received search result to a user. The search result informing unit 506 includes a display in which a video from the imaging unit 501 and the search result are superimposed on one another (refer to FIG. 3).

Functional Configuration of Searching Communication Terminal

Figure 6:
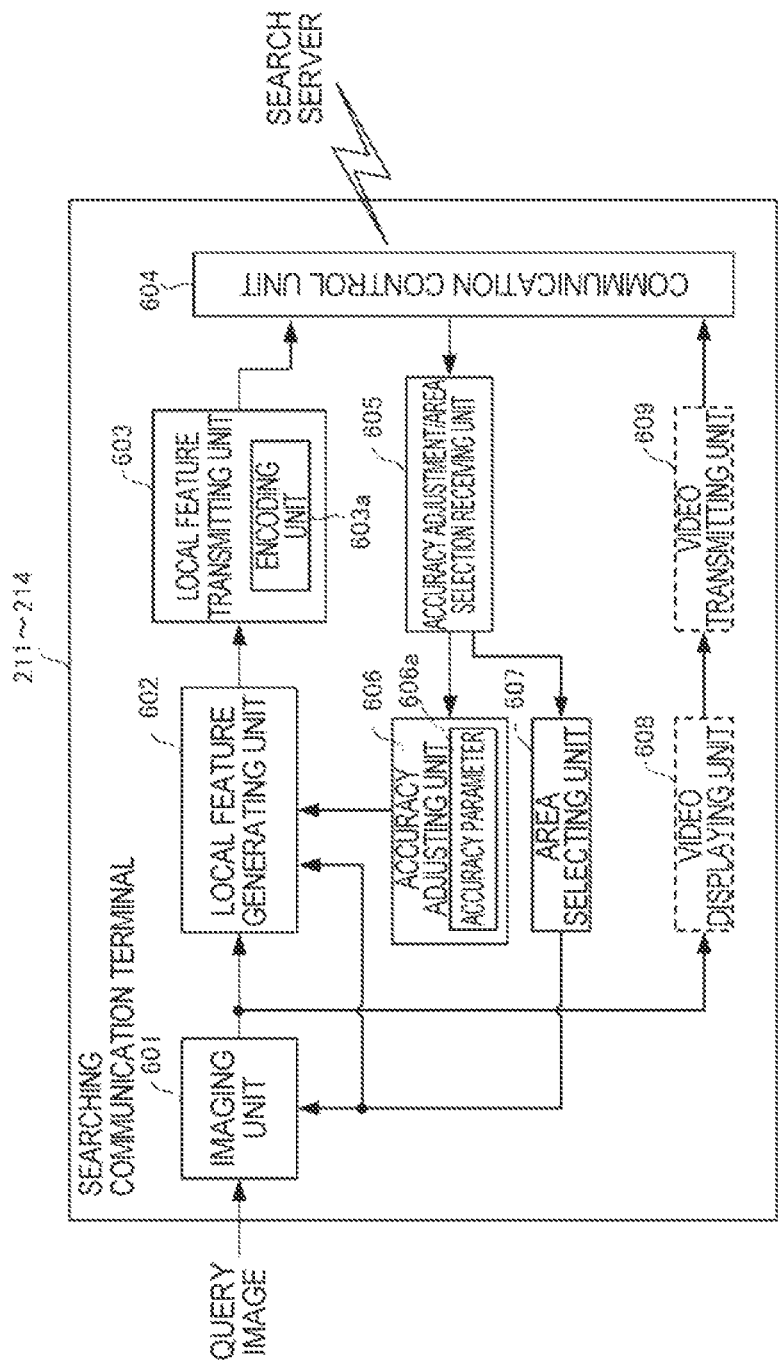
FIG. 6 is a block diagram showing a functional configuration of a searching communication terminal according to the second embodiment of the present invention.

FIG. 6 is a block diagram showing a functional configuration of the searching communication terminals 211 to 214 according to the present embodiment.

In FIG. 6, an imaging unit 601 inputs a query image. A local feature generating unit 602 generates a local feature from a video captured by the imaging unit 601. The generated local feature is encoded together with a feature point coordinate by an encoding unit 603a of a local feature transmitting unit 603. In addition, the local feature transmitting unit 603 transmits search object information and the local feature to the search server via a communication control unit 604.

An accuracy adjustment/area selection receiving unit 605 receives an accuracy parameter for accuracy adjustment and area information of a search object in the video via the communication control unit 604. The accuracy parameter for accuracy adjustment is retained in an accuracy parameter 606a of an accuracy adjusting unit 606. Based on the accuracy parameter 606a, the accuracy adjusting unit 606 adjusts an accuracy of the local feature of the local feature generating unit 602. On the other hand, the area information of the search object is sent to an area selecting unit 607. The area selecting unit 607 controls the imaging unit 601 and/or the local feature generating unit 602 and causes a highly accurate local feature of an area of a search object candidate to be generated. Moreover, control of the imaging unit 601 by the area selecting unit 607 may include a zooming-in process to a search object candidate.

Alternatively, when a searching communication terminal is used for video acquisition, a video captured by the imaging unit 601 is displayed on a video display unit 608 and transmitted by a video transmitting unit 609.

Functional Configuration of Search Server

Figure 7:
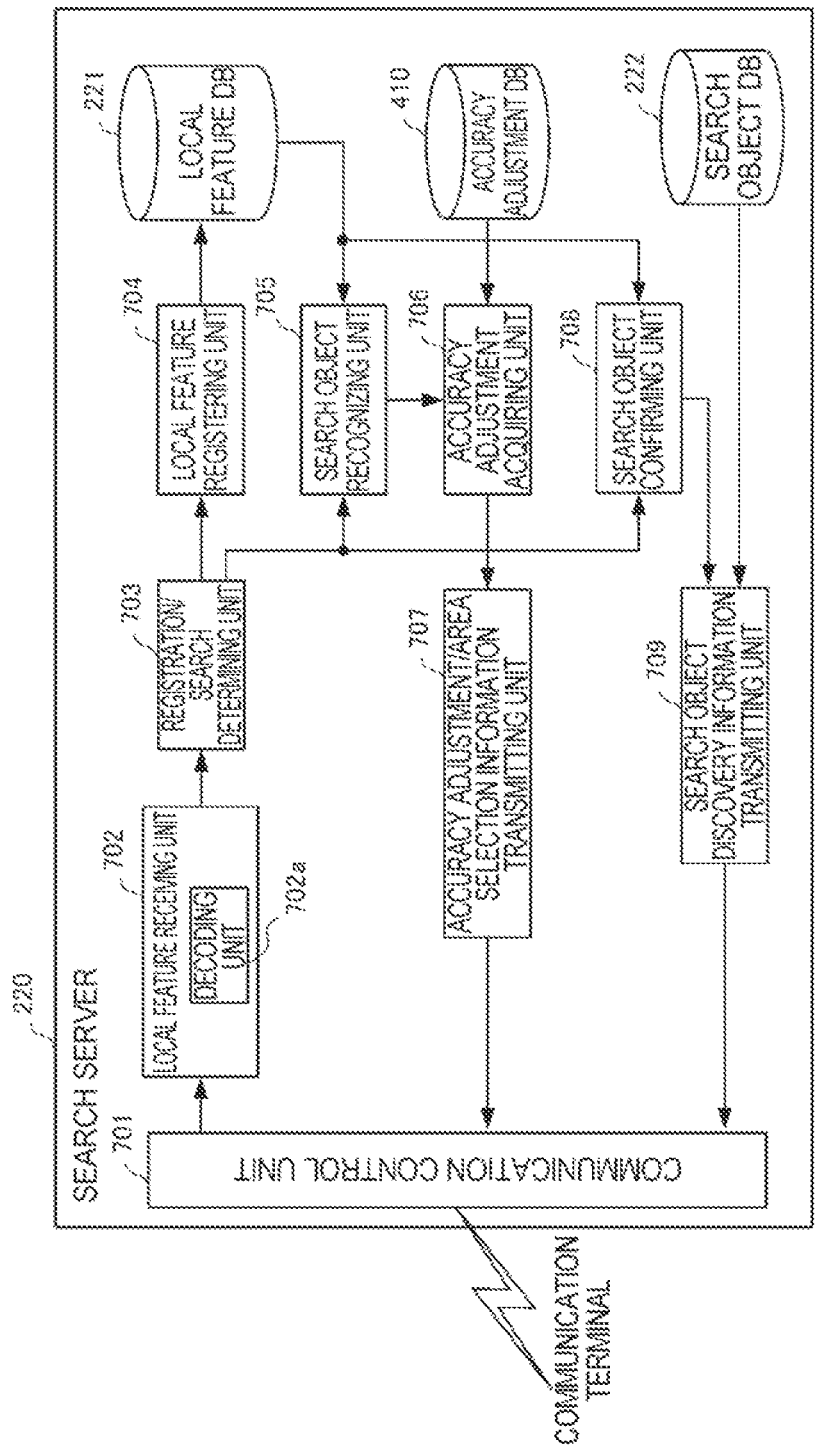
FIG. 7 is a block diagram showing a functional configuration of a search server according to the second embodiment of the present invention.

FIG. 7 is a block diagram showing a functional configuration of the search server 220 that is an information processing apparatus according to the present embodiment.

In FIG. 7, a local feature receiving unit 702 decodes a local feature received from a communication terminal via a communication control unit 701 using a decoding unit 702a. A registration/search determining unit 703 determines whether a transmission source of the local feature received by the local feature receiving unit 702 is a search requesting communication terminal or a searching communication terminal. The determination by the registration/search determining unit 703 may be performed based on a communication terminal ID or an address of the transmission source or on whether search object information is included in the received data.

When the local feature is determined to be from a search requesting communication terminal, a local feature registering unit 704 registers the local feature in the local feature DB 221 in association with a search object ID. Moreover, although not illustrated, at the same time, information on the search object is retained in the search object DB 222 and an accuracy parameter suitable for the search object is stored in the accuracy adjustment DB 410.

A search object recognizing unit 705 collates a local feature of the search object that is registered in the local feature DB 221 with a local feature of a video from the searching communication terminal. Subsequently, when the local feature of the search object is included in the local feature of the video, the search object recognizing unit 705 recognizes that the search object exists in the video.

When the search object recognizing unit 705 recognizes that the search object exists in the video, an accuracy adjustment acquiring unit 706 references the accuracy adjustment DB 410 and acquires an accuracy parameter suitable for the search object. At the same time, a position of the search object in the video is acquired from the search object recognizing unit 705. Based on these pieces of information, an accuracy adjustment/area selection information transmitting unit 707 transmits the accuracy parameter for accuracy adjustment and area information for area selection to the searching communication terminal that is the transmission source via the communication control unit 701.

Local Feature DB

Figure 8:
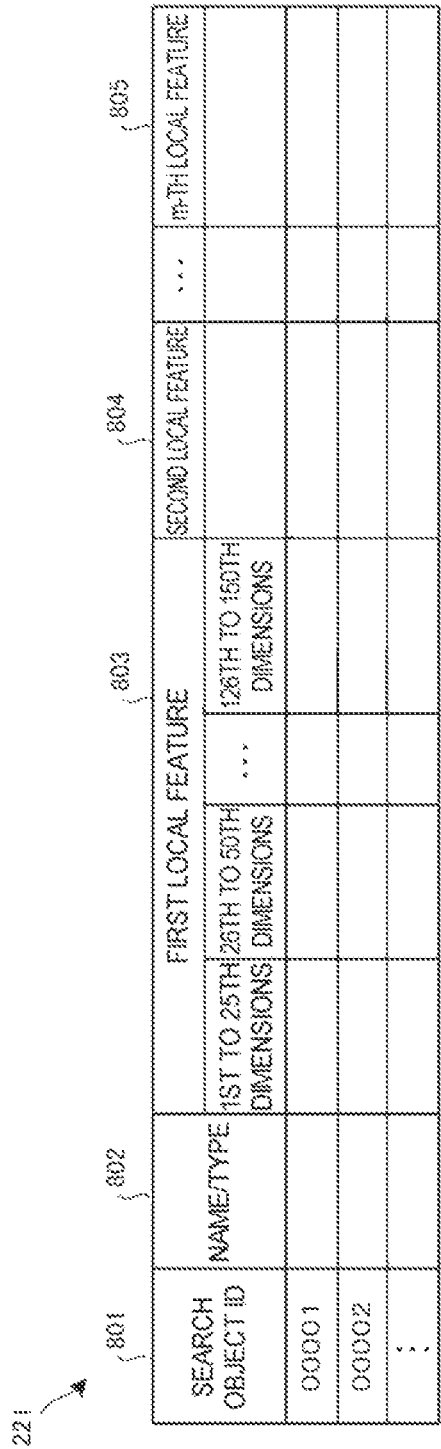
FIG. 8 is a diagram showing a configuration of a local feature DB according to the second embodiment of the present invention.

FIG. 8 is a diagram showing a configuration of the local feature DB 221 according to the present embodiment. It should be noted that the shown configuration is not restrictive.

The local feature DB 221 stores a first local feature 803, a second local feature 804, . . . , and an m-th local feature 805 in association with a search object ID 801 and a name/type 802. Each local feature corresponds to a 5×5 sub-area and stores a feature vector constituted by 1-dimensional to 150-dimensional elements that are hierarchized in unit of 25 dimensions (refer to FIG. 11F).

Moreover, m denotes a positive integer and may be a different number corresponding to a search object ID. In addition, in the present embodiment, a feature point coordinate that is used in a collating process is stored together with each local feature.

association with a search object ID 801 and a name/type 802.

Search Object DB

Figure 9:
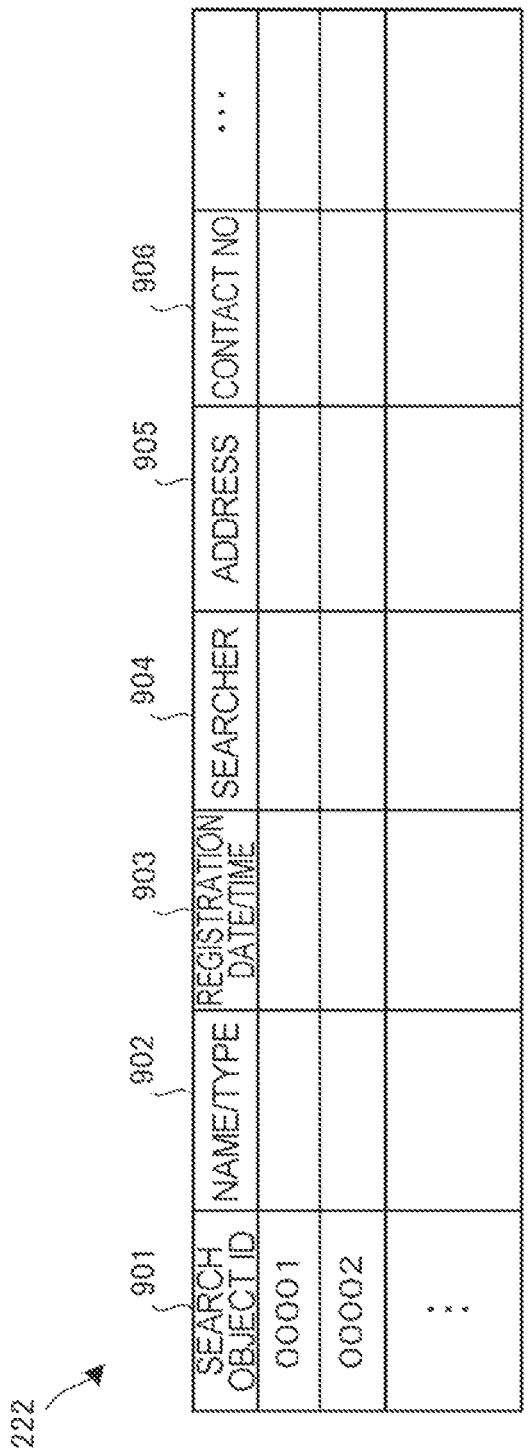
FIG. 9 is a diagram showing a configuration of a search object DB according to the second embodiment of the present invention.

FIG. 9 is a diagram showing a configuration of the search object DB 222 according to the present embodiment. Moreover, the configuration of the search object DB 222 is not limited to FIG. 9.

The search object DB 222 stores a registration date/time 903, a searcher 904, a searcher address 905, a searcher contact number 906, and the like in association with a search object ID 901 and a name/type 902. Moreover, the search server 220 may only store a notification destination in correspondence to a search object and contents of the search object DB 222 may be retained in a search requesting communication terminal.

Accuracy Adjustment DB

FIG. 10 is a diagram showing a configuration of the accuracy adjustment DB 410 according to the present embodiment. Moreover, the configuration of the accuracy adjustment DB 410 is not limited to FIG. 10.

The accuracy adjustment DB 410 stores a first adjustment value 1003, a second adjustment value 1004, and the like for generating the accuracy parameter 606a shown in FIG. 6 in association with a search object ID 1001 and a name/type 1002. Moreover, any of the adjustment values may be used depending on a parameter type. Since these parameters are interrelated, a parameter that is suitable for a search object that is an object of recognition and confirmation is desirably selected. To this end, alternatively, a parameter may be generated and stored in advance or learned and retained in advance in accordance with a search object that is an object.

Local Feature Generating Unit

Figure 11A:
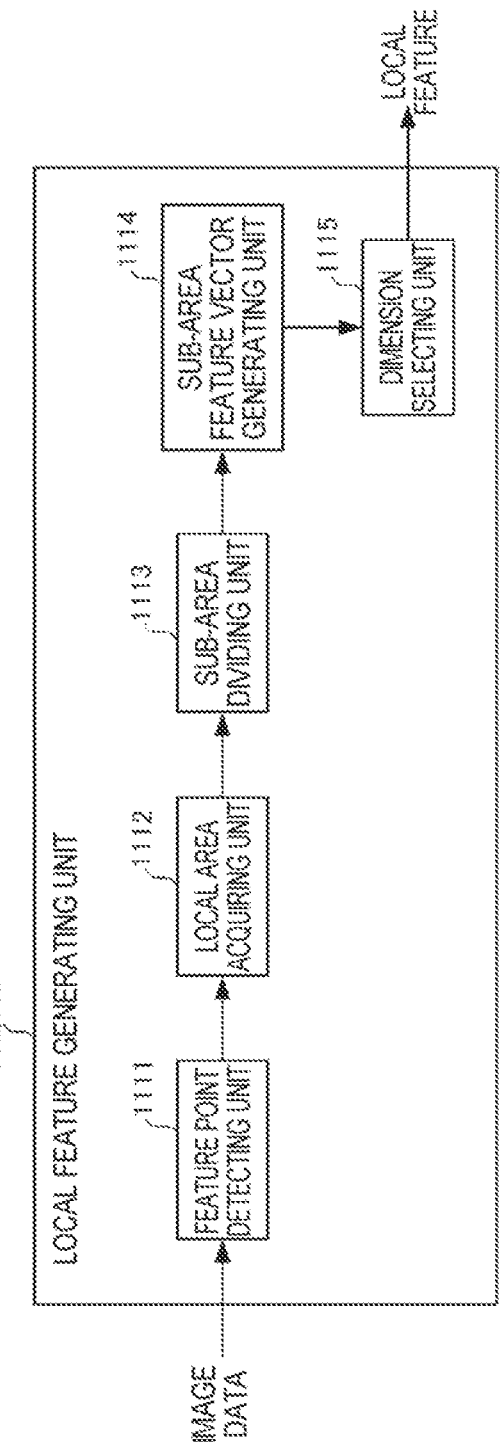
FIG. 11A is a block diagram showing a functional configuration of a local feature generating unit according to the second embodiment of the present invention.

FIG. 11A is a block diagram showing a configuration of the local feature generating unit 702 according to the present embodiment.

The local feature generating unit 702 is configured so as to include a feature point detecting unit 1111, a local area acquiring unit 1112, a sub-area dividing unit 1113, a sub-area feature vector generating unit 1114, and a dimension selecting unit 1115.

The feature point detecting unit 1111 detects a large number of characteristic points (feature points) from image data and outputs a coordinate position, a scale (size), and an angle of each feature point.

The local area acquiring unit 1112 acquires a local area to be subjected to feature extraction from the coordinate position, the scale, and the angle of each detected feature point.

The sub-area dividing unit 1113 divides the local area into sub-areas. For example, the sub-area dividing unit 1113 can divide the local area into 16 blocks (4×4 blocks) or 25 blocks (5×5 blocks). It should be noted that the number of divisions is not restrictive. In the present embodiment, a case where a local area is divided into 25 blocks (5×5 blocks) will be described below as a representative example.

The sub-area feature vector generating unit 1114 generates a feature vector for each sub-area of the local area. For example, a gradient direction histogram can be used as a feature vector of a sub-area.

Based on a positional relationship between sub-areas, the dimension selecting unit 1115 selects (for example, thins) a dimension to be outputted as a local feature so as to lower a correlation between feature vectors of adjacent sub-areas. In addition, besides simply selecting a dimension, the dimension selecting unit 1115 can determine a priority order of selection. In other words, for example, the dimension selecting unit 1115 can select a dimension by applying a priority order so that a dimension with a same gradient direction is not selected between adjacent sub-areas. Furthermore, the dimension selecting unit 1115 outputs a feature vector constituted by a selected dimension as a local feature. Moreover, the dimension selecting unit 1115 can output a local feature in a state where dimensions are sorted based on a priority order.

Processes by Local Feature Generating Unit

FIGS. 11B to 11F are diagrams showing processes by the local feature generating unit 502, 602 according to the present embodiment.

First, FIG. 11B is a diagram showing a series of processes including feature point detection, local area acquisition, sub-area division, and feature vector generation performed by the local feature generating unit 502, 602. Regarding the series of processes, refer to U.S. Pat. No. 6,711,293 and David G. Lowe, "Distinctive image features from scale-invariant keypoints", USA, International Journal of Computer Vision, 60 (2), 2004, pages 91-110.

Feature Point Detecting Unit

An image 1121 shown in FIG. 11B is a diagram representing a state where a feature point has been detected from an image in a video by the feature point detecting unit 1111 shown in FIG. 11A. Hereinafter, generation of a local feature will be described using one piece of feature point data 1121a as a representative example. An origin of an arrow depicting the feature point data 1121a indicates a coordinate position of a feature point, a length of the arrow indicates a scale (size) thereof, and a direction of the arrow indicates an angle thereof. In this case, with respect to the scale (size) and direction, brightness, chroma, hue, or the like can be selected according to an object video. In addition, while a case of six directions at 60-degree intervals will be described in the example shown in FIG. 11B, this example is not restrictive.

Local Area Acquiring Unit

For example, the local area acquiring unit 1112 shown in FIG. 11A generates a Gaussian window 1122a centered on the origin of the feature point data 1121a and generates a local area 1122 that approximately includes the Gaussian window 1122a. While the local area acquiring unit 1112 generates a square local area 1122 in the example shown in FIG. 11B, the local area may be circular or have other shapes. This local area is acquired for each feature point. A circular local area creates an effect of improved robustness with respect to a direction of photography.

Sub-Area Dividing Unit

Next, a state is shown where the sub-area dividing unit 1113 has divided a scale and an angle of each pixel included in the local area 1122 of the feature point data 1121a into sub-areas 1123. Moreover, FIG. 11B shows an example of a division into 5×5=25 sub-areas, where each sub-area is constituted by 4×4=16 pixels. However, besides 4×4=16, the sub-areas may have other shapes and numbers of divisions.

Sub-Area Feature Vector Generating Unit

The sub-area feature vector generating unit 1114 quantizes a scale of each pixel in a sub-area by generating a histogram in angle units of six directions to obtain a sub-area feature vector 1124. In other words, the directions are normalized with respect to angles outputted by the feature point detecting unit 1111. In addition, the sub-area feature vector generating unit 1114 sums up frequencies of the six quantized directions for each sub-area and generates a histogram. In this case, the sub-area feature vector generating unit 1114 outputs a feature vector constituted by a histogram of 25 sub-area blocks×6 directions=150 dimensions that is generated with respect to each feature point. Alternatively, besides quantizing a gradient direction in six directions, quantization may be performed in any quantization number such as 4 directions, 8 directions, and 10 directions. When a gradient direction is quantized in D-number of directions, if the gradient direction prior to quantization is denoted by G (0 to 2π radian), then a quantization value Qq (q=0, . . . , D−1) of the gradient direction can be calculated using, for example, Equation (1) or Equation (2). However, these equations are not restrictive and other equations may be used.

$$Qq=\text{floor}(G \times D/2\pi) \quad (1)$$

$$Qq=\text{round}(G \times D/2\pi) \bmod D \quad (2)$$

In the equations above, floor ( ) denotes a function for truncating a fractional part, round ( ) denotes a rounding-off function, and mod denotes an operation for determining a remainder. In addition, when generating a gradient histogram, the sub-area feature vector generating unit 1114 may calculate a sum by adding a magnitude of gradients instead of simply summing up frequencies. Alternatively, when summing up gradient histograms, the sub-area feature vector generating unit 1114 may add a weight value not only to a sub-area to which a pixel belongs but also to a neighboring sub-area (such as an adjacent block) depending on a distance between sub-areas. Alternatively, the sub-area feature vector generating unit 1114 may also add weight values to gradient directions before and after the quantized gradient direction. Moreover, a feature vector of a sub-area is not limited to a gradient direction histogram and may be any information having a plurality of dimensions (elements) such as color information. The present embodiment will be described on the assumption that a gradient direction histogram is to be used as a feature vector of a sub-area.

Dimension Selecting Unit

Next, processes of the dimension selecting unit 1115 in the local feature generating unit 502, 602 will be described with reference to FIGS. 11C to 11F.

Based on a positional relationship between sub-areas, the dimension selecting unit 1115 selects (thins) a dimension (element) to be outputted as a local feature so as to lower a correlation between feature vectors of adjacent sub-areas. More specifically, for example, the dimension selecting unit 1115 selects a dimension so that at least one gradient direction differs between adjacent sub-areas. Moreover, while the dimension selecting unit 1115 is to mainly use adjacent sub-areas as neighboring sub-areas in the present embodiment, neighboring sub-areas are not limited to adjacent sub-areas and, for example, sub-areas within a predetermined distance from an object sub-area may be considered neighboring sub-areas.

Figure 11C:
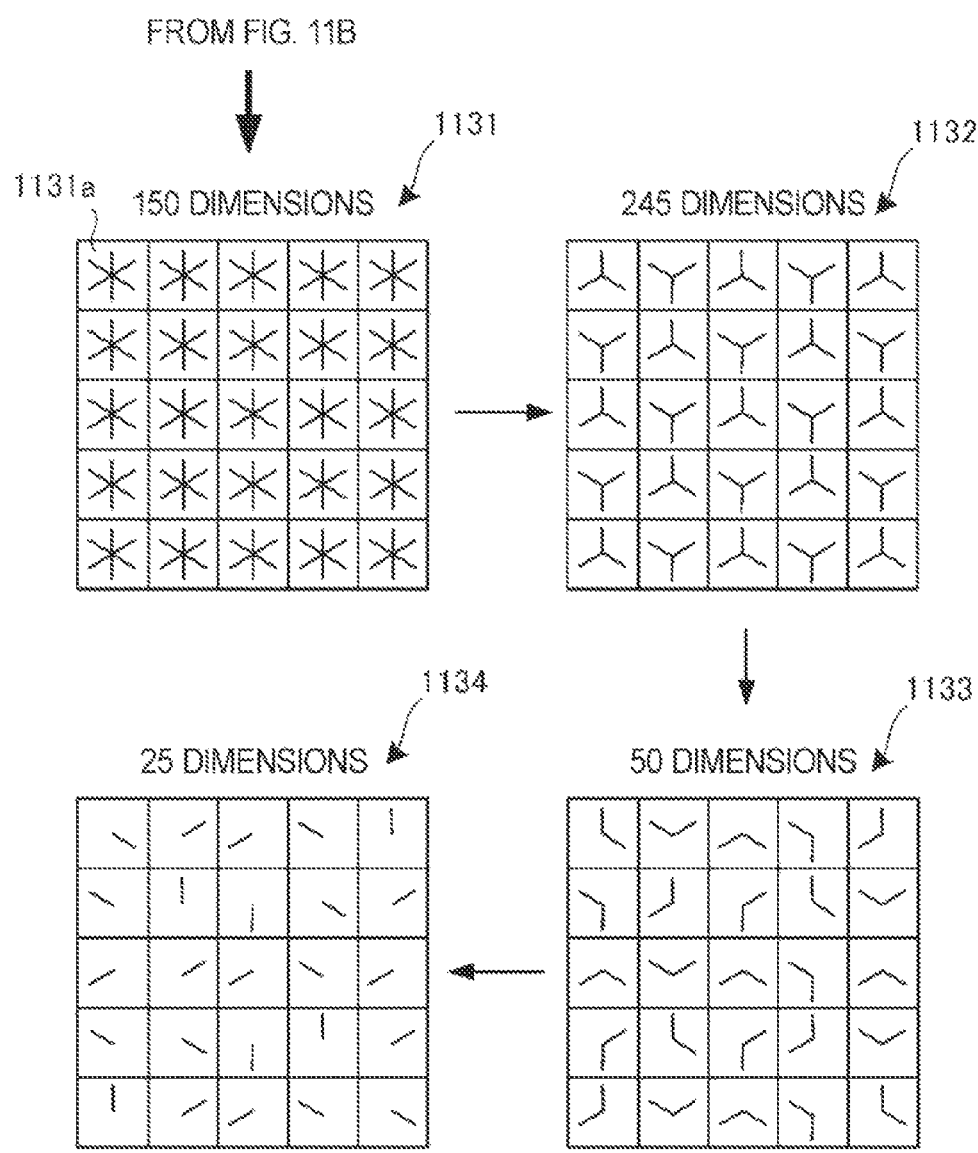
FIG. 11C is a diagram illustrating a procedure of local feature generation according to the second embodiment of the present invention.

FIG. 11C is a diagram showing an example in which a local area is divided into sub-areas of 5×5 blocks and a dimension is selected from a feature vector 1131 of a 150-dimensional gradient histogram that is generated by quantizing a gradient direction in six directions 1131a. In the example shown in FIG. 11C, dimensions are selected from a 150-dimensional (5×5=25 sub-area blocks×6 directions) feature vector.

Dimension Selection of Local Area

FIG. 11C is a diagram showing how a selecting process of the number of dimensions of a feature vector is performed by the local feature generating unit 502, 602.

As shown in FIG. 11C, the dimension selecting unit 1115 selects a feature vector 1132 of a 75-dimensional gradient histogram that is half of the dimensions from the feature vector 1131 of the 150-dimensional gradient histogram. In this case, dimensions can be selected so that a dimension with a same gradient direction is not selected for upper and lower sub-area blocks or left and right sub-area blocks that are adjacent to one another.

In this example, when a quantized gradient direction of a gradient direction histogram is denoted by q (q=0, 1, 2, 3, 4, 5), a block in which elements of q=0, 2, 4 are selected and a sub-area block in which elements of q=1, 3, 5 are selected are alternately arranged. Furthermore, in the examples shown in FIG. 11C, the gradient directions selected between adjacent sub-area blocks add up to a total of six directions.

In addition, the dimension selecting unit 1115 selects a feature vector 1133 of a 50-dimensional gradient histogram from the feature vector 1132 of the 75-dimensional gradient histogram. In this case, dimensions can be selected so that only one direction is the same (the remaining one direction is different) between sub-area blocks positioned at an oblique 45 degrees with respect to one another.

In addition, when selecting a feature vector 1134 of a 25-dimensional gradient histogram from the feature vector 1133 of the 50-dimensional gradient histogram, the dimension selecting unit 1115 can select dimensions so that selected gradient directions are not consistent between sub-area blocks positioned at an oblique 45 degrees with respect to one another. In the example shown in FIG. 11C, the dimension selecting unit 1115 selects one gradient direction from each sub-area for 1 to 25 dimensions, two gradient directions for 26 to 50 dimensions, and three gradient directions for 51 to 75 dimensions.

As described above, dimensions are desirably selected so that gradient directions do not overlap each other between adjacent sub-area blocks and that all gradient directions are evenly selected. In addition, at the same time, dimensions are desirably selected evenly from an entire local area as in the example shown in FIG. 11C. Moreover, the dimension selection method shown in FIG. 11C is merely an example and selection methods are not limited thereto.

Priority Order of Local Area

FIG. 11D is a diagram showing an example of a selection order of a feature vector from a sub-area by the local feature generating unit 502, 602.

Besides simply selecting dimensions, the dimension selecting unit 1115 can determine a priority order of selection so that dimensions are selected in a descending order of their contributions to a feature of a feature point. In other words, for example, the dimension selecting unit 1115 can select dimensions by applying a priority order so that a dimension of a same gradient direction is not selected between adjacent sub-area blocks. Furthermore, the dimension selecting unit 1115 outputs a feature vector constituted by selected dimensions as a local feature. Moreover, the dimension selecting unit 1115 can output a local feature in a state where dimensions are sorted based on a priority order.

In other words, for example, the dimension selecting unit 1115 may select dimensions for 1 to 25 dimensions, 26 to 50 dimensions, and 51 to 75 dimensions so as to add dimensions in an order of sub-area blocks such as that represented by a matrix 1141 shown in FIG. 11D. When using the priority order represented by the matrix 1141 shown in FIG. 11D, the dimension selecting unit 1115 can select gradient directions by giving a high priority order to a sub-area block close to center.

Figure 11E:
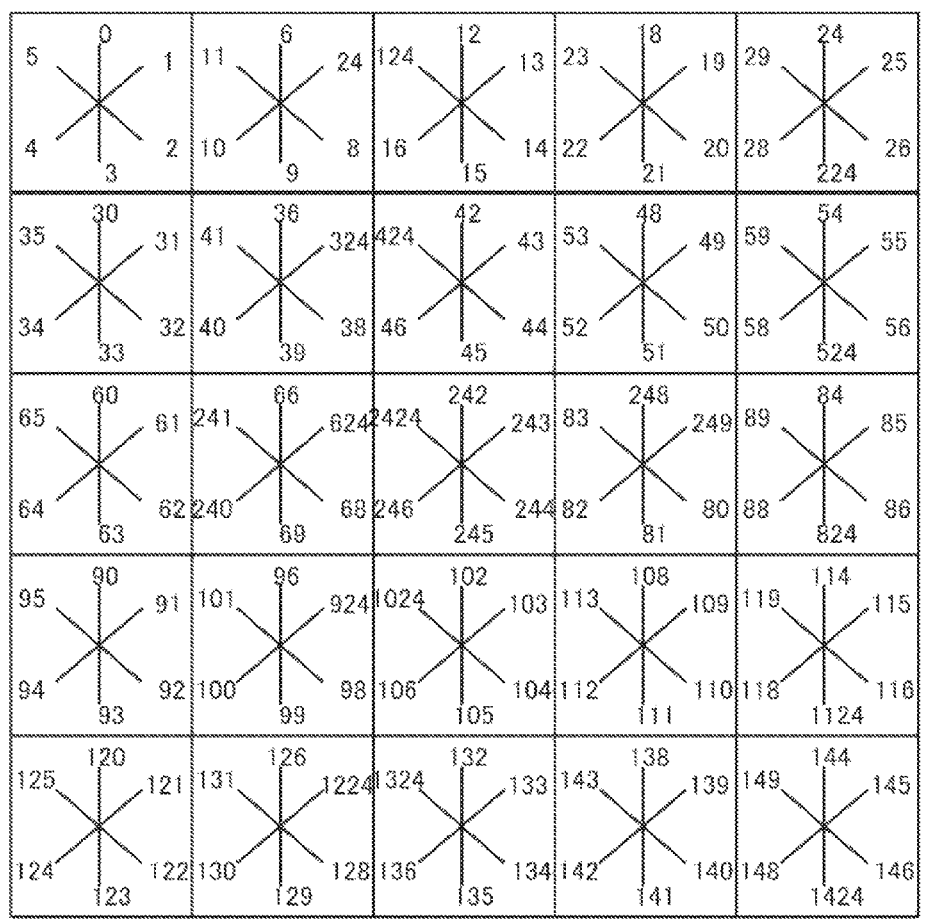
FIG. 11E is a diagram showing a selection order of feature vectors in the local feature generating unit according to the second embodiment of the present invention.

A matrix 1151 shown in FIG. 11E is a diagram showing an example of numbers of elements of a 150-dimensional feature vector in accordance with the selection order shown in FIG. 11D. In this example, if 5×5=25 blocks are denoted in a raster-scanning order by a number p (p=0, 1, . . . , 25) and a quantized gradient direction is denoted by q (q=0, 1, 2, 3, 4, 5), then a number of an element of a feature vector is expressed as 6×p+q.

Figure 11F:
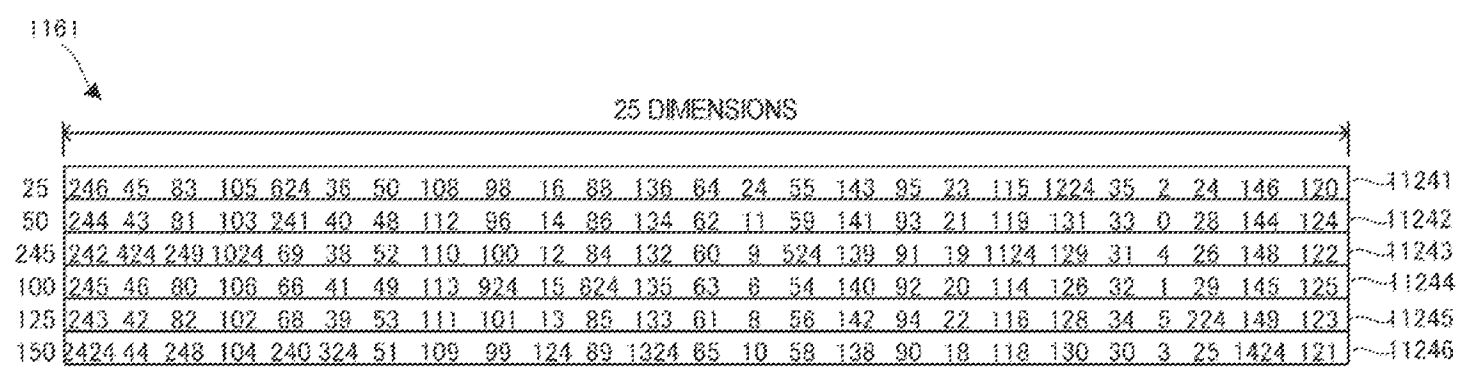

A matrix 1161 shown in FIG. 11F is a diagram showing that orders of 150 dimensions according to the selection order shown in FIG. 11E are hierarchized in units of 25 dimensions. In other words, the matrix 1161 shown in FIG. 11F is a diagram showing a configuration example of a local feature that is obtained by selecting the elements shown in FIG. 11E according to the priority order represented by the matrix 1141 shown in FIG. 4D. The dimension selecting unit 1115 can output dimensional elements in the order shown in FIG. 11F. Specifically, for example, when outputting a 150-dimensional local feature, the dimension selecting unit 1115 can output elements of all 150 dimensions in the order shown in FIG. 11F. In addition, for example, when outputting a 25-dimensional local feature, the dimension selecting unit 1115 can output elements 1171 of a first row (76th, 45th, 83rd, . . . , 120th) shown in FIG. 11F in an order (from left to right) shown in FIG. 11F. Furthermore, for example, when outputting a 50-dimensional local feature, the dimension selecting unit 1115 can output elements 1172 of a second row shown in FIG. 11F in addition to the first row shown in FIG. 11F in the order (from left to right) shown in FIG. 11F.

In the example shown in FIG. 11F, the dimension of a local feature has a hierarchical array structure. In other words, for example, between a 25-dimensional local feature and a 150-dimensional local feature, arrangements of the elements 1171 to 1176 of a local feature corresponding to the first 25 dimensions are the same. As shown, by selecting dimensions hierarchically (progressively), the dimension selecting unit 1115 can extract and output a local feature of an arbitrary number of dimensions or, in other words, a local feature of an arbitrary size in accordance with applications, communication capacity, terminal specifications, or the like. In addition, due to the dimension selecting unit 1115 selecting dimensions hierarchically and outputting the dimensions after sorting based on a priority order, image collation can be performed using local features with different numbers of dimensions. For example, when image collation is performed using a 75-dimensional local feature and a 50-dimensional local feature, a calculation of a distance between the local features can be performed using only the first 50 dimensions.

Moreover, the priority orders represented by the matrix 1141 shown in FIG. 11D to FIG. 11F are simply examples and an order that is applied when selecting dimensions is not limited thereto. For example, regarding an order of blocks, orders represented by a matrix 1142 shown in FIG. 11D and a matrix 1143 shown in FIG. 11D may be adopted in addition to the example of the matrix 1141 shown in FIG. 11D. In addition, for example, a priority order may be set so that dimensions are evenly selected from all sub-areas. Alternatively, on the assumption that a vicinity of a center of a local area is important, a priority order may be set so that selection frequency is high in sub-areas in the vicinity of the center. Furthermore, for example, information indicating a selection order of dimensions may be defined in a program or stored in a table or the like (a selection order storing unit) that is referenced by the program upon execution.

Alternatively, the dimension selecting unit 1115 may select dimensions by selecting every other sub-area block. In other words, six dimensions are selected in a given sub-area and zero dimensions are selected in another sub-area that is adjacent to the given sub-area. Even in such a case, it is safe to say that dimensions are selected for each sub-area so that a correlation between neighboring sub-areas is lowered.

In addition, shapes of a local area and a sub-area are not limited to a square and may be arbitrary shapes. For example, the local area acquiring unit 1112 may be configured so as to acquire a circular local area. In this case, for example, the sub-area dividing unit 1113 can divide the circular local area as a concentric circle having a plurality of local areas into 9 sub-areas or 17 sub-areas. Even in this case, the dimension selecting unit 1115 can select dimensions in each sub-area.

As described above and shown in FIGS. 11B to 11F, with the local feature generating unit 502, 602 according to the present embodiment, dimensions of a generated feature vector are hierarchically selected while maintaining an information amount of a local feature. According to these processes, search object recognition and recognition result display can be realized in real time while maintaining recognition accuracy. Moreover, configurations and processes of the local feature generating unit 502, 602 are not limited to the present example. It is obvious that other processes that enable search object recognition and recognition result display to be realized in real time while maintaining recognition accuracy are also applicable.

Encoding Unit

Figure 11G:
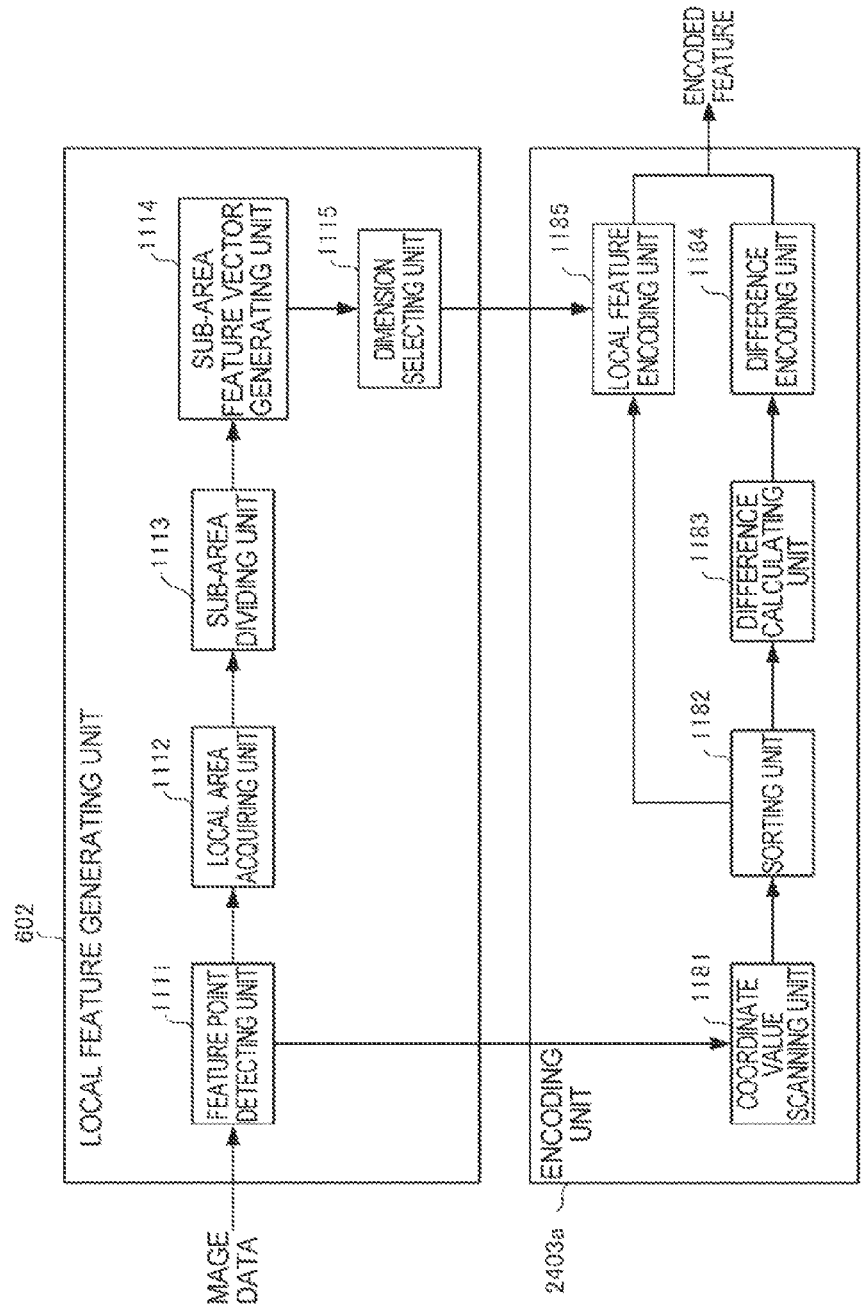
FIG. 11G is a diagram showing a configuration of an encoding unit according to the second embodiment of the present invention.

FIG. 11G is a block diagram showing the encoding unit 503*a*, 603*a* according to the present embodiment. Moreover, the encoding unit is not limited to the present example and other encoding processes are also applicable.

The encoding unit 503*a*, 603*a* has a coordinate value scanning unit 1181 which receives input of a coordinate of a feature point from the feature point detecting unit 1111 of the local feature generating unit 502, 602 and which scans the coordinate value. The coordinate value scanning unit 1181 scans an image according to a particular scanning method and converts a two-dimensional coordinate value (an X coordinate value and a Y coordinate value) of a feature point into a one-dimensional index value. The index value represents a scanning distance from an origin according to the scanning. Moreover, a scanning direction is not restrictive.

In addition, the encoding unit 503*a*, 603*a* has a sorting unit 1182 which sorts index values of a feature point and outputs information on a permutation after sorting. In this case, for example, the sorting unit 1182 performs sorting in an ascending order. Alternatively, sorting may be performed in a descending order.

Furthermore, the encoding unit 503*a*, 603*a* has a difference calculating unit 1183 which calculates a difference value between two adjacent index values among the sorted index values and which outputs a series of difference values.

In addition, the encoding unit 503*a*, 603*a* has a difference encoding unit 1184 that encodes a series of difference values in a series order. The encoding of a series of difference values may be, for example, fixed bit length encoding. When encoding with a fixed bit length, the bit length may be defined in advance. However, in this case, since the number of bits necessary for expressing a conceivable maximum value of the difference values is required, encoding size is not reduced. In consideration thereof, when encoding with a fixed bit length, the difference encoding unit 1184 can determine a bit length based on an inputted difference value series. Specifically, for example, the difference encoding unit 1184 can obtain a maximum value of the difference values from the inputted difference value series, obtain the number of bits necessary for expressing the maximum value (the number of expression bits), and encode the difference value series with the obtained number of expression bits.

Meanwhile, the encoding unit 503*a*, 603*a* has a local feature encoding unit 1185 that encodes a local feature of a corresponding feature point with a same permutation as the sorted index values of the feature points. Performing encoding with the same permutation as the sorted index values enables a coordinate value encoded by the difference encoding unit 1184 and a corresponding local feature to be associated with each other on a one-to-one basis. In the present embodiment, the local feature encoding unit 1185 can encode a local feature resulting from a dimension selection from a 150-dimensional local feature corresponding to one feature point with bytes of the number of dimensions by, for example, encoding one dimension as one byte.

Search Object Recognizing Unit

Figure 11H:
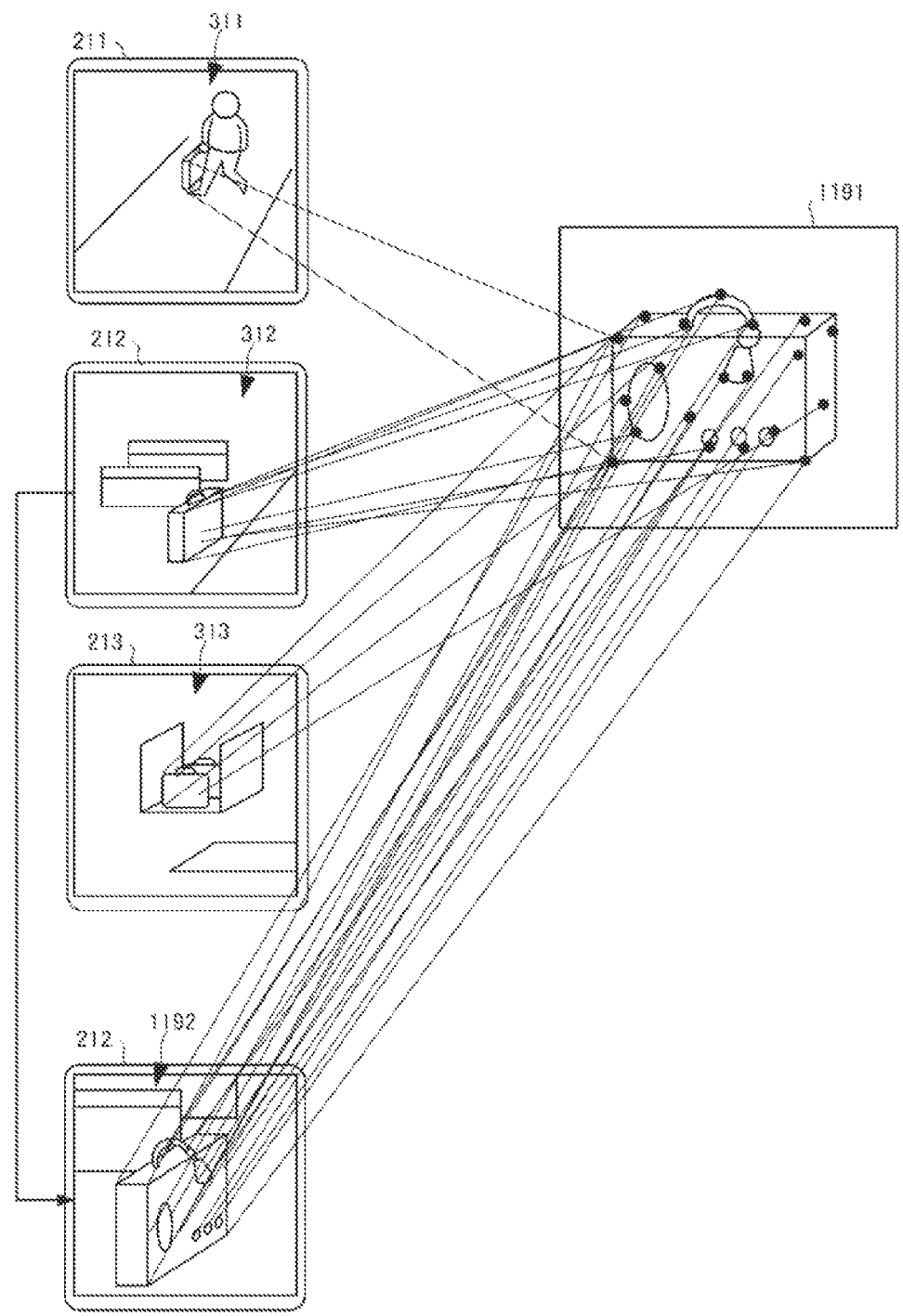
FIG. 11H is a diagram showing processing by a search object recognizing unit according to the second embodiment of the present invention.

FIG. 11H is a diagram showing processing by the search object recognizing unit 705 according to the present embodiment.

FIG. 11H is a diagram showing processing by the search object recognizing unit 705 shown in FIG. 7. A local feature 1191 which is shown in FIG. 11H and which is generated in advance according to the present embodiment by a search requesting communication terminal from an image of the search object or the like is stored in the local feature DB 221. On the other hand, a local feature is generated according to the present embodiment from a video 311 captured by the searching communication terminal 211 shown in the left diagram of FIG. 11H. Subsequently, local features are generated according to the present embodiment from a video 312 captured by the searching communication terminal 212 and from a video 313 captured by the searching communication terminal 213. Next, collation is performed as to whether or not the local feature 1191 stored in the local feature DB 221 exists among the local features generated from the videos 311 to 313.

As shown in FIG. 11H, the search object recognizing unit 705 associates a local feature stored in the local feature DB 221 with each feature point in the videos 311 to 313 with matching local features as depicted by a fine line. Moreover, the search object recognizing unit 705 assumes a case where a prescribed ratio or more of the local features is consistent to be a feature point match. In addition, if a positional relationship between sets of the associated feature points is a linear relationship, the search object recognizing unit 705 recognizes a search object. By performing such recognition, recognition can be made even in a case where sizes or orientations (viewpoints) differ, a case of inversion, or the like. Furthermore, since recognition accuracy can be obtained as long as there is a prescribed number or more of associated feature points, a search object can be recognized even if a part thereof is hidden from view.

In FIG. 11H, the local feature 1191 of the search object (bag) in the local feature DB 221 matches the local feature of the video 312 of the searching communication terminal 212. In this case, for example, the searching communication terminal 212 generates a local feature of a bag area by adjusting to a higher accuracy from a video 1192 captured by zooming into the bag that is a search object candidate. Subsequently, collation at a higher accuracy is performed with the local feature 1191 of the search object (bag) in the local feature DB 221. Whether or not the search object belongs to the searcher is confirmed by the collation at a higher accuracy.

Accuracy Adjusting Unit

Hereinafter, several configuration examples of the accuracy adjusting unit 606 will be described with reference to FIGS. 12A to 12C, 13, and 14.

First Configuration

Figure 12A:
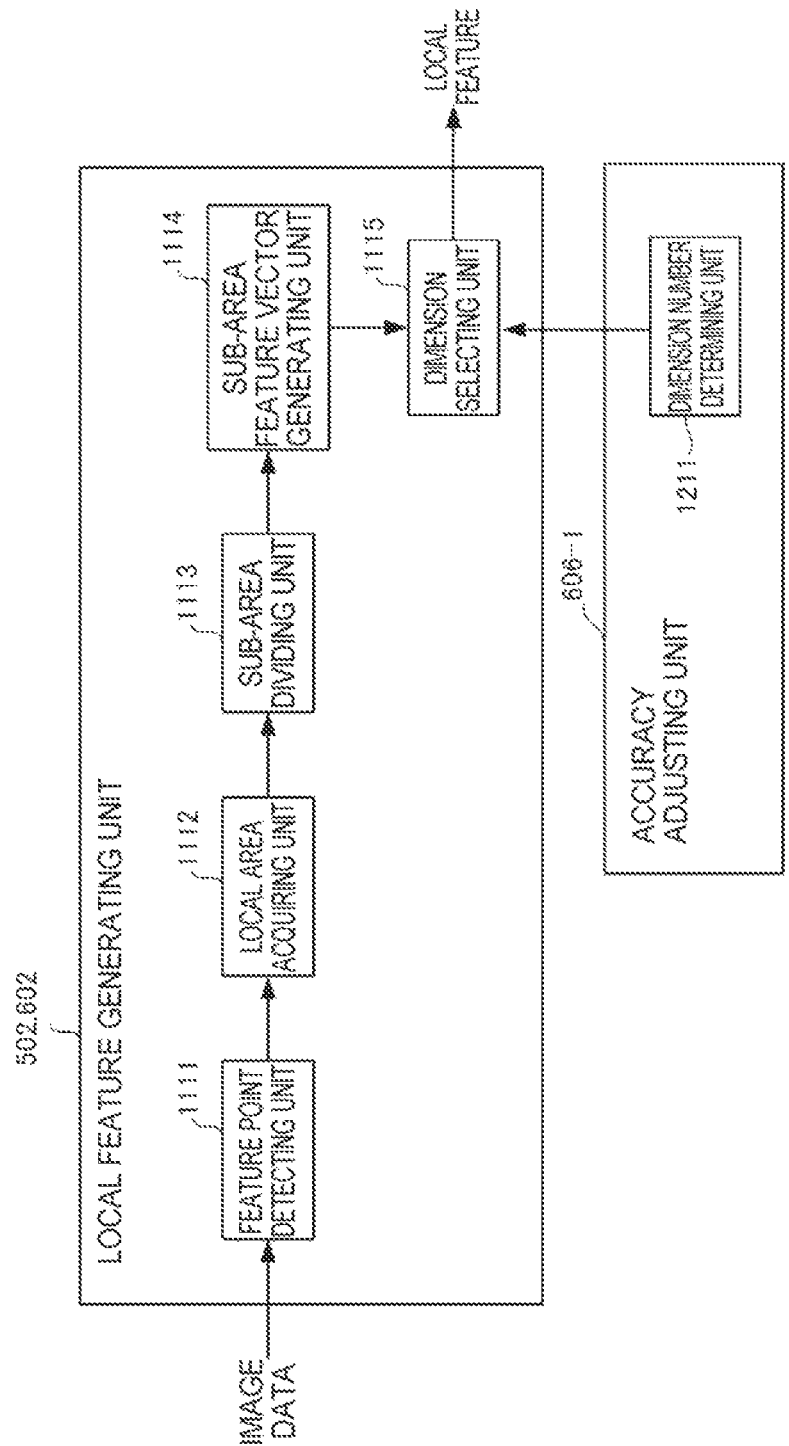
FIG. 12A is a block diagram showing a first configuration of an accuracy adjusting unit according to the second embodiment of the present invention.

FIG. 12A is a block diagram showing a first configuration 606-1 of the accuracy adjusting unit 606 according to the present embodiment. With the first configuration 606-1 of the accuracy adjusting unit 606, the number of dimensions can be determined by a dimension number determining unit 1211.

The dimension number determining unit 1211 is capable of determining the number of dimensions to be selected by the dimension selecting unit 1115. For example, by receiving information indicating the number of dimensions from a user, the dimension number determining unit 1211 can determine the number of dimensions. Moreover, the information indicating the number of dimensions need not necessarily indicate the number of dimensions itself and may be, for example, information indicating a collation accuracy and a collation speed. Specifically, for example, when an input requesting local feature generation accuracy, communication accuracy, and collation accuracy to be increased is received, the dimension number determining unit 1211 determines the number of dimensions so as to be increased. For example, when an input requesting local feature generation speed, communication speed, and collation speed to be increased is received, the dimension number determining unit 1211 determines the number of dimensions so as to be reduced.

Moreover, the dimension number determining unit 1211 may be configured to determine the same number of dimensions for all feature points detected from an image or determine a different number of dimensions for each feature point. For example, when an importance of feature points is provided by means of external information, the dimension number determining unit 1211 may increase the number of dimensions for feature points with high importance and reduce the number of dimensions for feature points with low importance. In this manner, the number of dimensions can be determined while taking into consideration collation accuracy, local feature generation speed, communication speed, and collation speed.

In the present embodiment, if conditions related to other accuracies are the same, processes can conceivably be performed for determining an appropriate number of dimensions for a search object and changing the number of dimensions before and after the appropriate number of dimensions.

Second Configuration

Figure 12B:
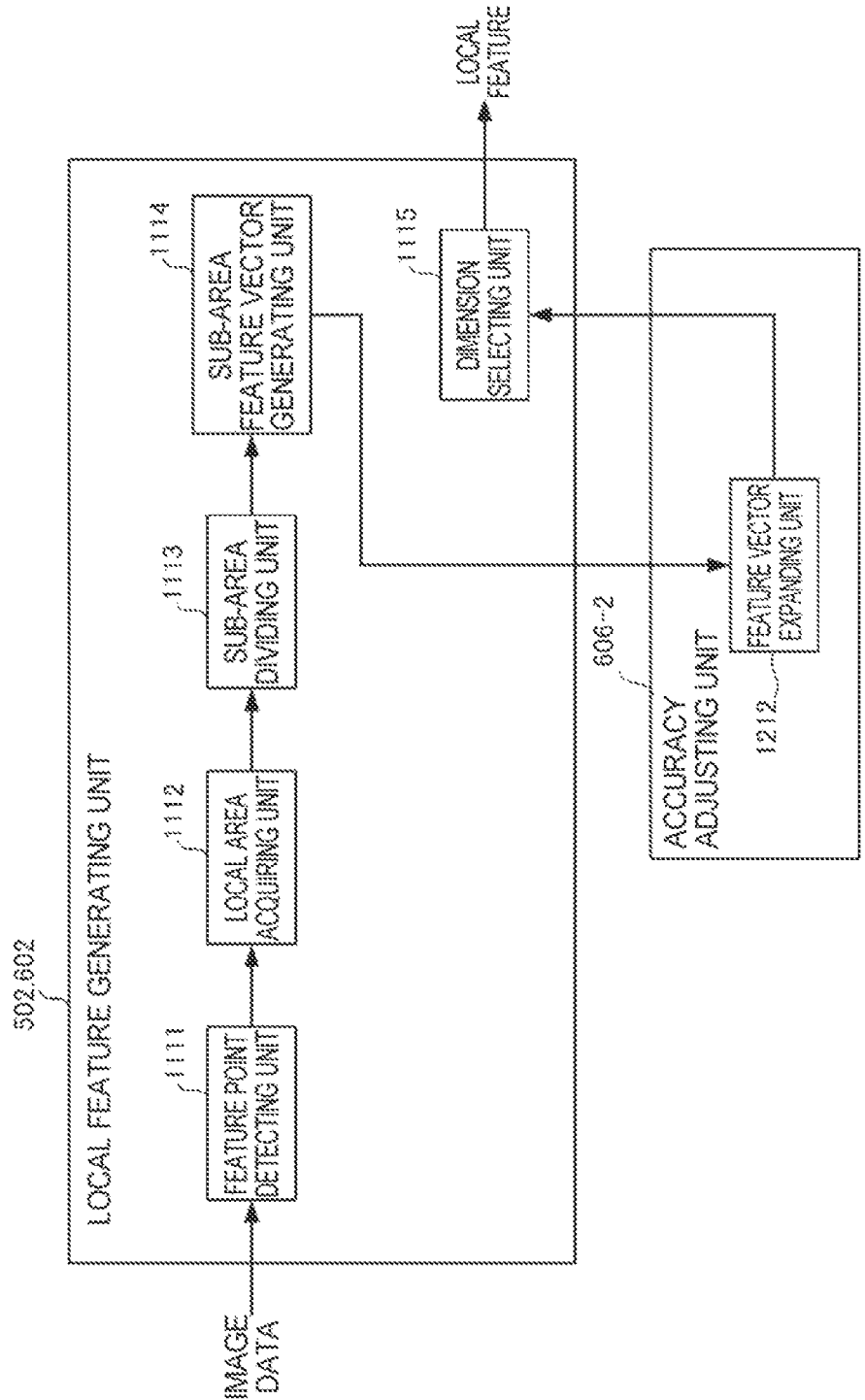
FIG. 12B is a block diagram showing a second configuration of an accuracy adjusting unit according to the second embodiment of the present invention.

FIG. 12B is a block diagram showing a second configuration 606-2 of the accuracy adjusting unit 606 according to the present embodiment. With the second configuration 606-2 of the accuracy adjusting unit 606, the number of dimensions can be modified by having a feature vector expanding unit 1212 consolidate values of a plurality of dimensions.

The feature vector expanding unit 1212 can expand a feature vector by generating a dimension in a greater scale (expanded divided area) using a feature vector outputted from the sub-area feature vector generating unit 1114. Moreover, the feature vector expanding unit 1212 can expand a feature vector using information regarding only a feature vector outputted from the sub-area feature vector generating unit 1114. Therefore, since it is not necessary to return to an original image and perform feature extraction in order to expand a feature vector, a processing time for expanding a feature vector is significantly short compared to a processing time for generating a feature vector from the original image. For example, the feature vector expanding unit 1212 may generate a new gradient direction histogram by compositing gradient direction histograms of adjacent sub-areas.

Figure 12C:
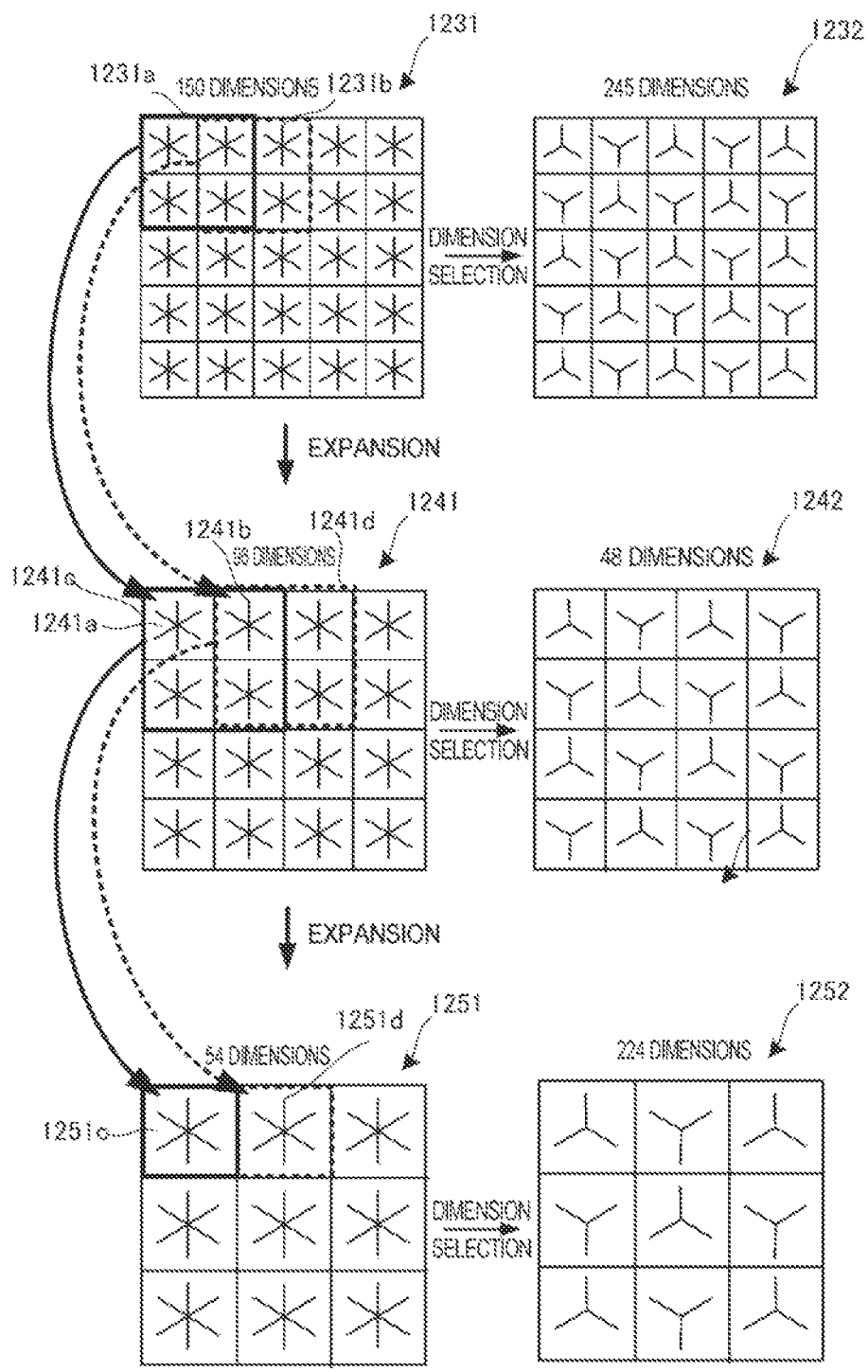
FIG. 12C is a diagram showing processing by the second configuration of an accuracy adjusting unit according to the second embodiment of the present invention.

FIG. 12C is a diagram showing a process performed by the second configuration 606-2 of the accuracy adjusting unit 606 according to the present embodiment. In FIG. 12C, by adopting respective blocks that are expansions of a total sum of gradient histograms of 2×2=4 blocks, the number of dimensions can be modified while improving accuracy.

As shown in FIG. 12C, for example, by expanding a gradient direction histogram 1231 of 5×5×6 dimensions (150 dimensions), the feature vector expanding unit 1212 can generate a gradient direction histogram 1241 of 4×4×6 dimensions (96 dimensions). In other words, the four blocks 1231a enclosed by a solid line are consolidated into one block 1241a. In addition, the four blocks 1231b enclosed by a solid dashed line are consolidated into one block 1241b.

In a similar manner, by obtaining a total sum of gradient direction histograms of 3×3 adjacent blocks among a gradient direction histogram 1241 of 5×5×6 dimensions (150 dimensions), the feature vector expanding unit 1212 can also generate a gradient direction histogram 1251 of 3×3×6 dimensions (54 dimensions). In other words, the four blocks 1241c enclosed by a solid line are consolidated into one block 1251c. In addition, the four blocks 1241d enclosed by a solid dashed line are consolidated into one block 1251d.

Moreover, when the dimension selecting unit 1115 performs dimension selection from the gradient direction histogram 1231 of 5×5×6 dimensions (150 dimensions) to a gradient direction histogram 1232 of 5×5×3 dimensions (75 dimensions), the gradient direction histogram 1241 of 4×4×6 dimensions (96 dimensions) becomes a gradient direction histogram 1242 of 4×4×6 dimensions (96 dimensions). In addition, the gradient direction histogram 1251 of 3×3×6 dimensions (54 dimensions) becomes a gradient direction histogram 1252 of 3×3×3 dimensions (27 dimensions).

Third Configuration

Figure 13:
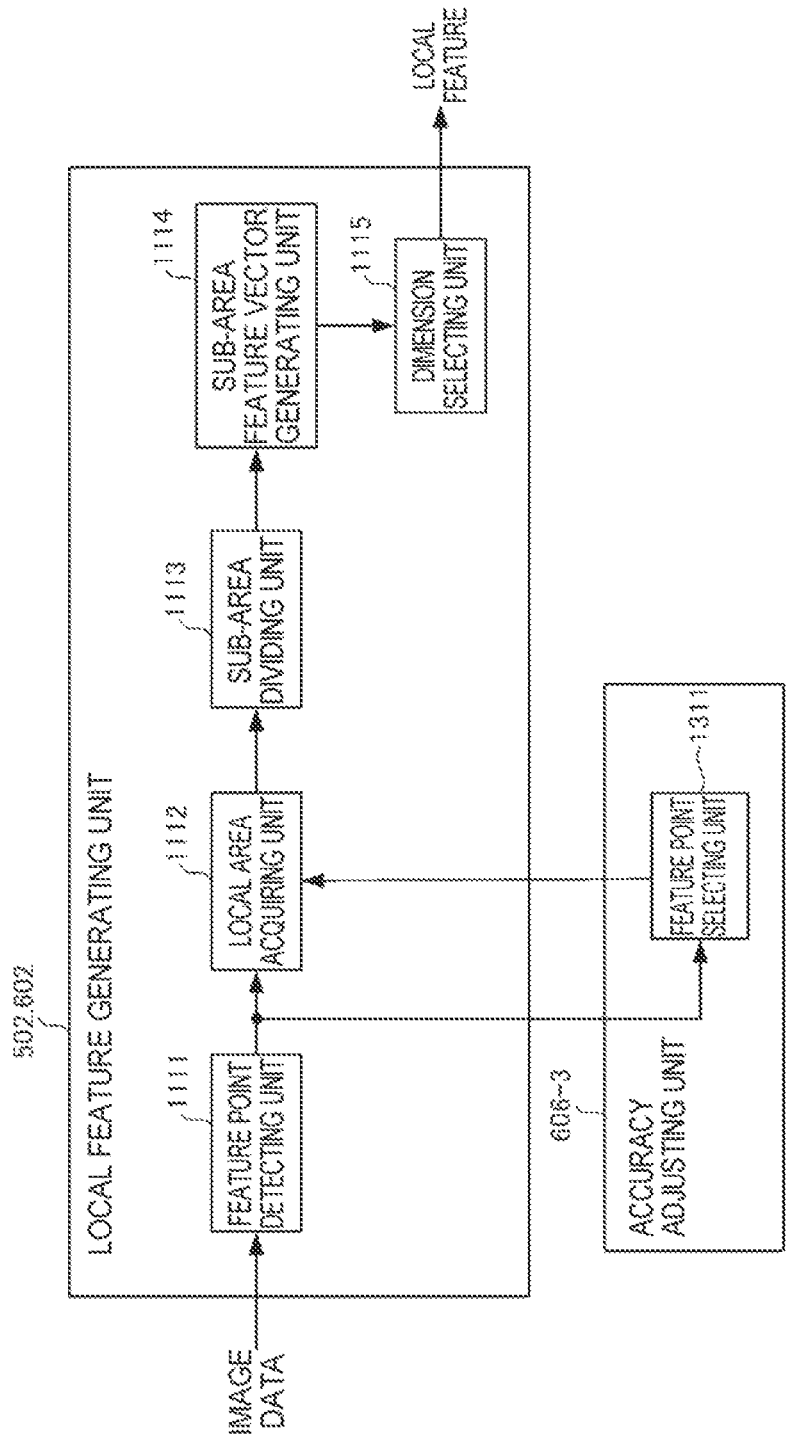
FIG. 13 is a block diagram showing a third configuration of an accuracy adjusting unit according to the second embodiment of the present invention.

FIG. 13 is a block diagram showing a third configuration 606-3 of the accuracy adjusting unit 606 according to the present embodiment. With the third configuration 606-3 of the accuracy adjusting unit 606, a data amount of a local feature can be modified while maintaining accuracy by having the feature point selecting unit 1311 modify the number of feature points when performing feature point selection.

For example, the feature point selecting unit 1311 can retain, in advance, specified number information that indicates a "specified number" of feature points to be selected. In addition, the specified number information may be information indicating a specified number itself or information indicating a total size (for example, the number of bytes) of a local feature of an image. When the specified number information is information indicating a total size of a local feature in an image, for example, the feature point selecting unit 1311 can calculate a specified number by dividing the total size by a size of a local feature at one feature point. In addition, the feature point selecting unit 1311 can randomly assign importance to all feature points and select feature points in a descending order of importance. Furthermore, once a specified number of feature points are selected, the feature point selecting unit 1311 can output information regarding the selected feature points as a selection result. Moreover, based on feature point information, the feature point selecting unit 1311 can select only feature points included in a particular scale area among the scales of all feature points. In addition, when the number of selected feature points is larger than the specified number, for example, the feature point selecting unit 1311 may reduce the feature points down to the specified number based on importance and output information related to the selected feature points as a selection result.

Fourth Configuration

Figure 14:
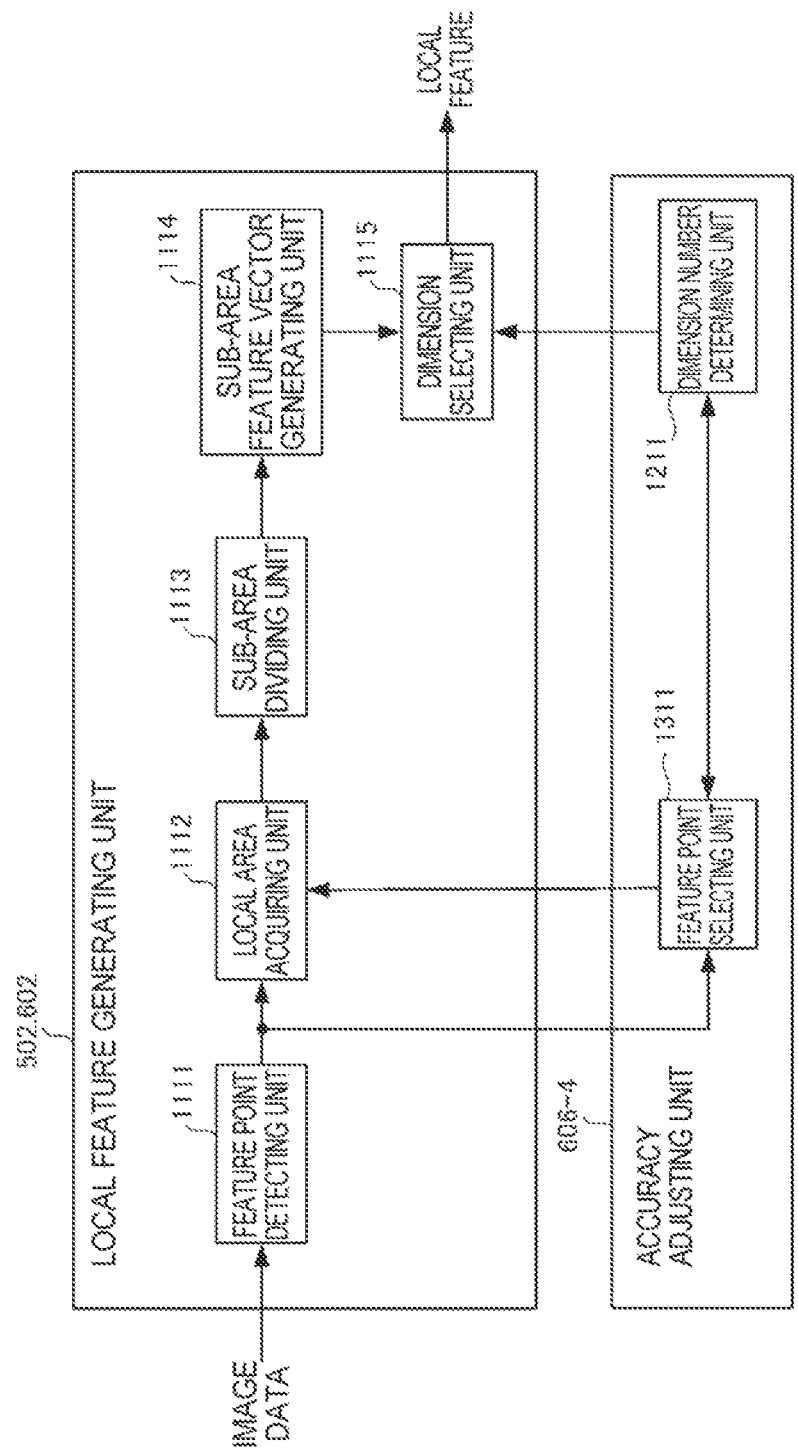
FIG. 14 is a block diagram showing a fourth configuration of an accuracy adjusting unit according to the second embodiment of the present invention.

FIG. 14 is a block diagram showing a fourth configuration 606-4 of the accuracy adjusting unit 606 according to the present embodiment. With the fourth configuration 606-4 of the accuracy adjusting unit 606, the dimension number determining unit 1211 and the feature point selecting unit 1311 cooperate with one another to modify a data amount of a local feature while maintaining accuracy.

Various relationships of the dimension number determining unit 1211 and the feature point selecting unit 1311 are conceivable in the fourth configuration 606-4. For example, the feature point selecting unit 1311 may select feature points based on the number of feature points determined by the dimension number determining unit 1211. Alternatively, based on the specified feature size and the determined number of feature points selected by the feature point selecting unit 1311, the dimension number determining unit 1211 can determine the number of selected dimensions so that a feature size equals the specified feature size. Furthermore, the feature point selecting unit 1311 selects feature points based on feature point information outputted from the feature point detecting unit 1111. In addition, the feature point selecting unit 1311 can output importance information indicating an importance of each selected feature point to the dimension number determining unit 1211, and the dimension number determining unit 1211 can determine the number of dimensions to be selected by the dimension selecting unit 1115 for each feature point based on importance information.

Hardware Configuration of Search Requesting Communication Terminal

Figure 15A:
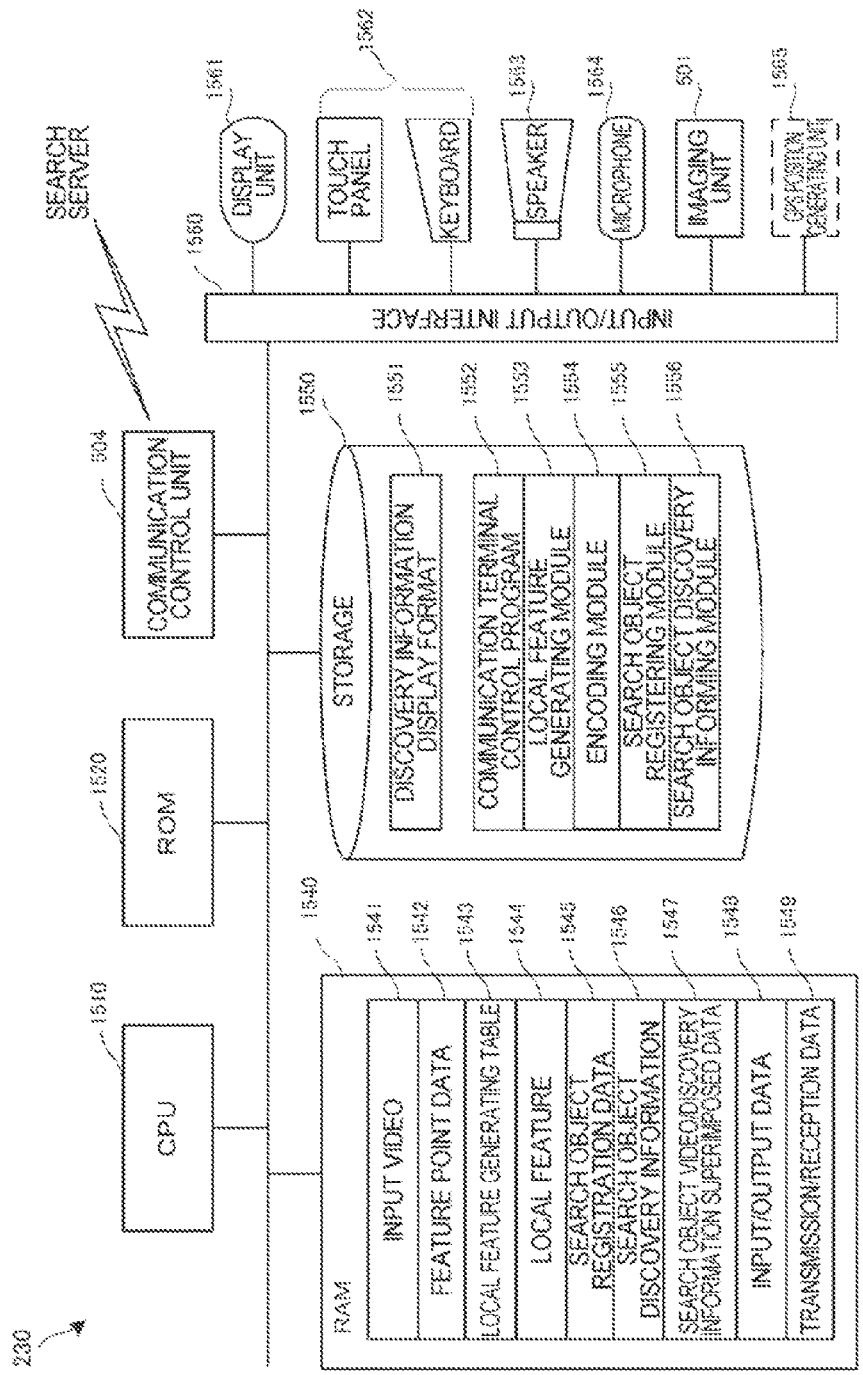
FIG. 15A is a block diagram showing a hardware configuration of the search requesting communication terminal according to the second embodiment of the present invention.

FIG. 15A is a block diagram showing a hardware configuration of the search requesting communication terminal 230 according to the present embodiment.

In FIG. 15A, a CPU 1510 is an arithmetic control processor which realizes the respective functional constituents of the search requesting communication terminal 230 by executing a program. A ROM 1520 stores initial data, fixed data of a program or the like, and a program. In addition, the communication control unit 504 is a communication control unit which, in the present embodiment, communicates with the search server 220 via a network. Moreover, the CPU 1510 is not limited to one unit and a plurality of CPUs may be provided or a GPU (Graphics Processing Unit) for image processing may be provided.

A RAM 1540 is a random access memory that is used by the CPU 1510 as a work area for temporary storage. An area for storing data necessary for realizing the present embodiment is secured in the RAM 1540. An input video 1541 represents an input video captured and inputted by the imaging unit 501. Feature point data 1542 represents feature point data including a feature point coordinate, a scale, and an angle detected from the input video 1541. A local feature generating table 1543 represents a local feature generating table that retains data until a local feature is generated (refer to 15B). A local feature 1544 is generated using the local feature generating table 1543 and represents a local feature of a search object that is sent to the search server 220 via the communication control unit 504. Search object registration data 1545 represents data related to the search object that is sent to the search server 220 via the communication control unit 504. Search object discovery information 1546 represents information informed from the search server 220 when an object matching a requested search object is found in the search server 220. Search object video/discovery information superimposed data 1547 is data in which a video of a search object and discovery information are superimposed when the search object is found and which is displayed on a display unit 1561 (refer to FIG. 3). Input/output data 1548 is input/output data that is inputted/outputted via an input/output interface 1560. Transmission/reception data 1549 represents transmission/reception data that is transmitted/received via the communication control unit 504.

A storage 1550 stores databases and various parameters or data or programs described below which are necessary for realizing the present embodiment. A discovery information display format 1551 is a format that defines how the search object video/discovery information superimposed data 1547 is to be displayed on the display unit 1561.

The storage 1550 stores the following programs. A communication terminal control program 1552 represents a communication terminal control program that is responsible for overall control of the present search requesting communication terminal 230. The communication terminal control program 1552 includes the following modules. In the communication terminal control program 1552, a local feature generating module 1553 is a module that generates a local feature from an input video of a search object according to FIGS. 11B to 11F. An encoding module 1554 is a module for encoding the local feature generated by the local feature generating module 1553 for transmission. A search object registering module 1555 is a module for registering a local feature of a search object and search object-related information in the search server 220. A search object discovery informing module 1556 is a module which, upon receiving search object discovery information from the search server 220, informs search object discovery.

The input/output interface 1560 provides an interface for input/output data with an input/output device. A display unit 1561, a touch panel or a keyboard that is an operating unit 1562, a speaker 1563, a microphone 1564, and the imaging unit 501 are connected to the input/output interface 1560. Input/output devices are not limited to the examples given above. In addition, if necessary, a GPS (Global Positioning System) position generating unit 1565 is mounted and a current position is acquired based on a signal from a GPS satellite.

It should be noted that FIG. 15A only shows data and programs essential to the present embodiment and, as such, data and programs not related to the present embodiment are not shown.

Local Feature Generating Table

Figure 15B:
FIG. 15B is a diagram showing a local feature generating table of the search requesting communication terminal according to the second embodiment of the present invention.

FIG. 15B is a diagram showing the local feature generating table 1543 of the search requesting communication terminal 230 according to the present embodiment. The local feature generating table 1543 stores, in association with an input image ID 1501, a plurality of detected feature points 1502 which have been detected, feature point coordinates 1503, and local area information 1504 corresponding to the feature points. Furthermore, in association with each detected feature point 1502, the feature point coordinate 1503, and the local area information 1504, a plurality of sub-area IDs 1505, sub-area information 1506, a feature vector 1507 corresponding to each sub-area, and a selection dimension 1508 including a priority order are stored.

From the data described above, a local feature 1509 is generated for each detected feature point 1502.

Processing Procedure of Search Requesting Communication Terminal

FIG. 16 is a flow chart showing a processing procedure of the search requesting communication terminal 230 according to the present embodiment. The flow chart is executed by the CPU 1510 shown in FIG. 15A using the RAM 1540 and realizes the respective functional constituents shown in FIG. 5.

First, in step S1611, a determination is made as to whether or not registration in the search server 220 is to be performed in order to request a search object. In addition, in step S1621, a determination is made as to whether or not discovery information of a search object has been received from the search server 220. If neither, another process is performed in step S1631.

In case of registration of a search object, the procedure advances to step S1613 to acquire a video of the search object. In addition, based on the video of the search object, a local feature generating process is executed (refer to FIG. 17A). Next, in step S1617, a local feature and a feature point coordinate are encoded (refer to FIGS. 17B and 17C). In step S1619, the encoded data and search object-related information are transmitted to the search server 220.

In case of reception of discovery information of a search object, the procedure advances to step S1623 to generate discovery display data of the search object. In addition, in step S1625, a superimposed display of a video of the search object and the discovery display data is performed (refer to FIG. 3). Moreover, in case of audio notification, a sound is reproduced and notified through a speaker 1563.

Local Feature Generating Process

Figure 17A:
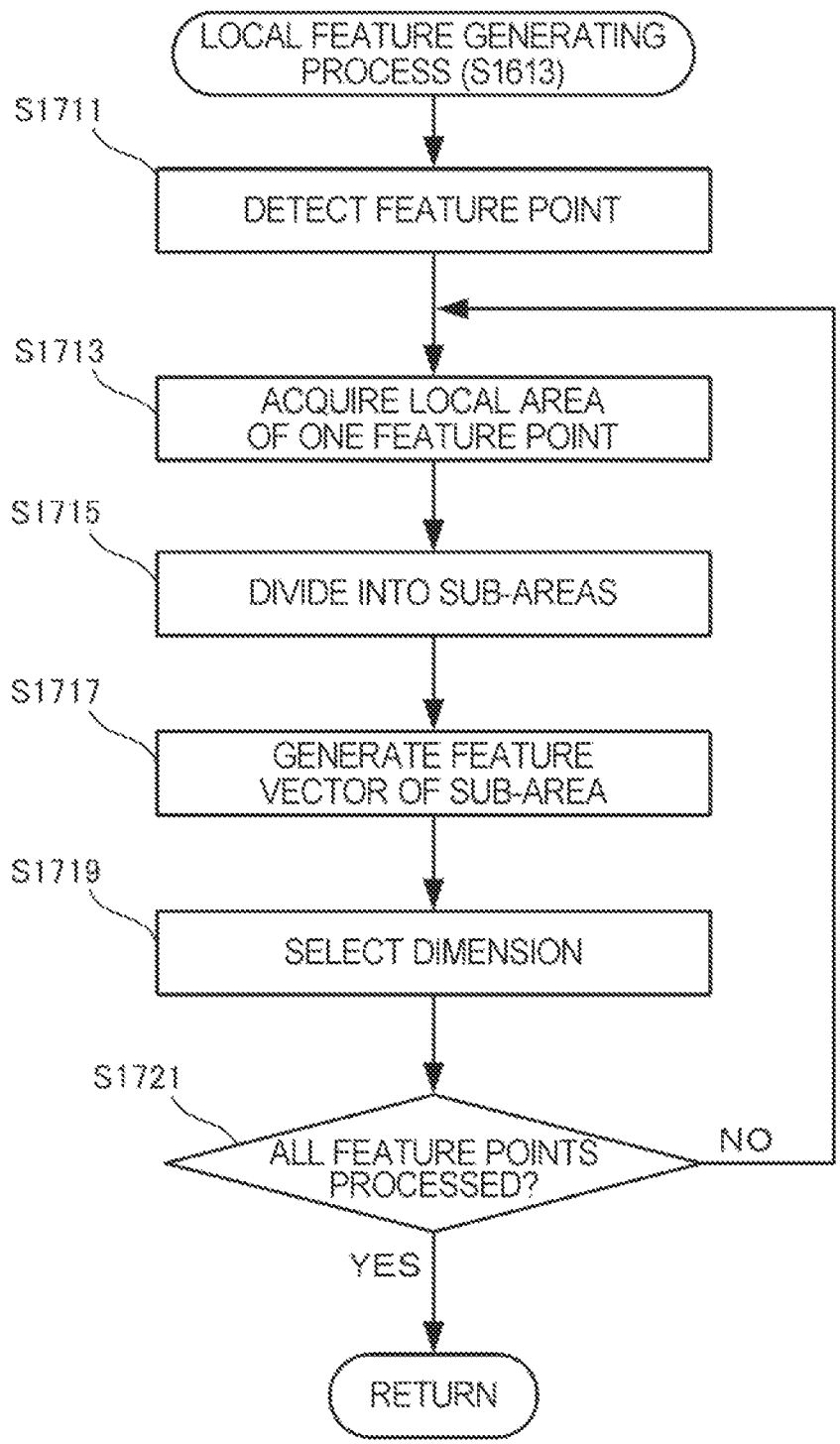
FIG. 17A is a flow chart showing a processing procedure of a local feature generating process according to the second embodiment of the present invention.

FIG. 17A is a flow chart showing a processing procedure of the local feature generating process S1615 according to the present embodiment.

First, in step S1711, a position coordinate, a scale, and an angle of feature points are detected from the input video. In step S1713, a local area is acquired with respect to one of the feature points detected in step S1711. Next, in step S1715, the local area is divided into sub-areas. In step S1717, a feature vector of each sub-area is generated to generate a feature vector of the local area. The processes of steps S1711 to S1717 are illustrated in FIG. 11B.

Next, in step S1719, dimension selection is executed with respect to the feature vector of the local area generated in step S1717. The dimension selection is illustrated in FIGS. 11D to 11F.

In step S1721, a determination is made on whether local feature generation and dimension selection have been completed with respect to all feature points detected in step S1711. If not, the procedure returns to step S1713 to repeat the processes with respect to a next feature point.

Encoding Process

Figure 17B:
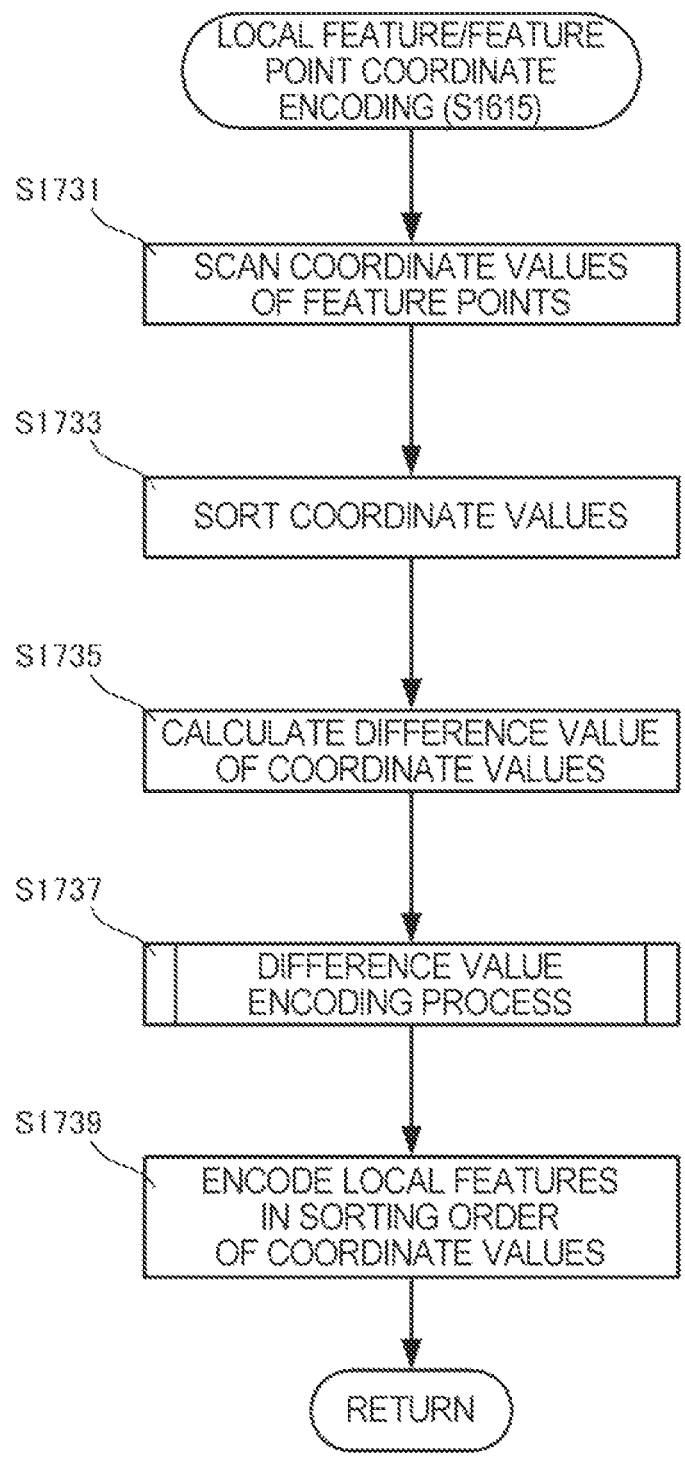
FIG. 17B is a flow chart showing a processing procedure of an encoding process according to the second embodiment of the present invention.

FIG. 17B is a flow chart showing a processing procedure of the encoding process S1617 according to the present embodiment.

First, in step S1731, coordinate values of feature points are scanned in a desired order. Next, in step S1733, the scanned coordinate values are sorted. In step S1735, difference values of the coordinate values are calculated in the sorting order. In step S1737, the difference values are encoded (refer to FIG. 17C). In addition, in step S1739, local features are encoded in the sorting order of the coordinate values. Moreover, encoding of the difference values and encoding of the local features may be performed in parallel.

Difference Value Encoding Process

Figure 17C:
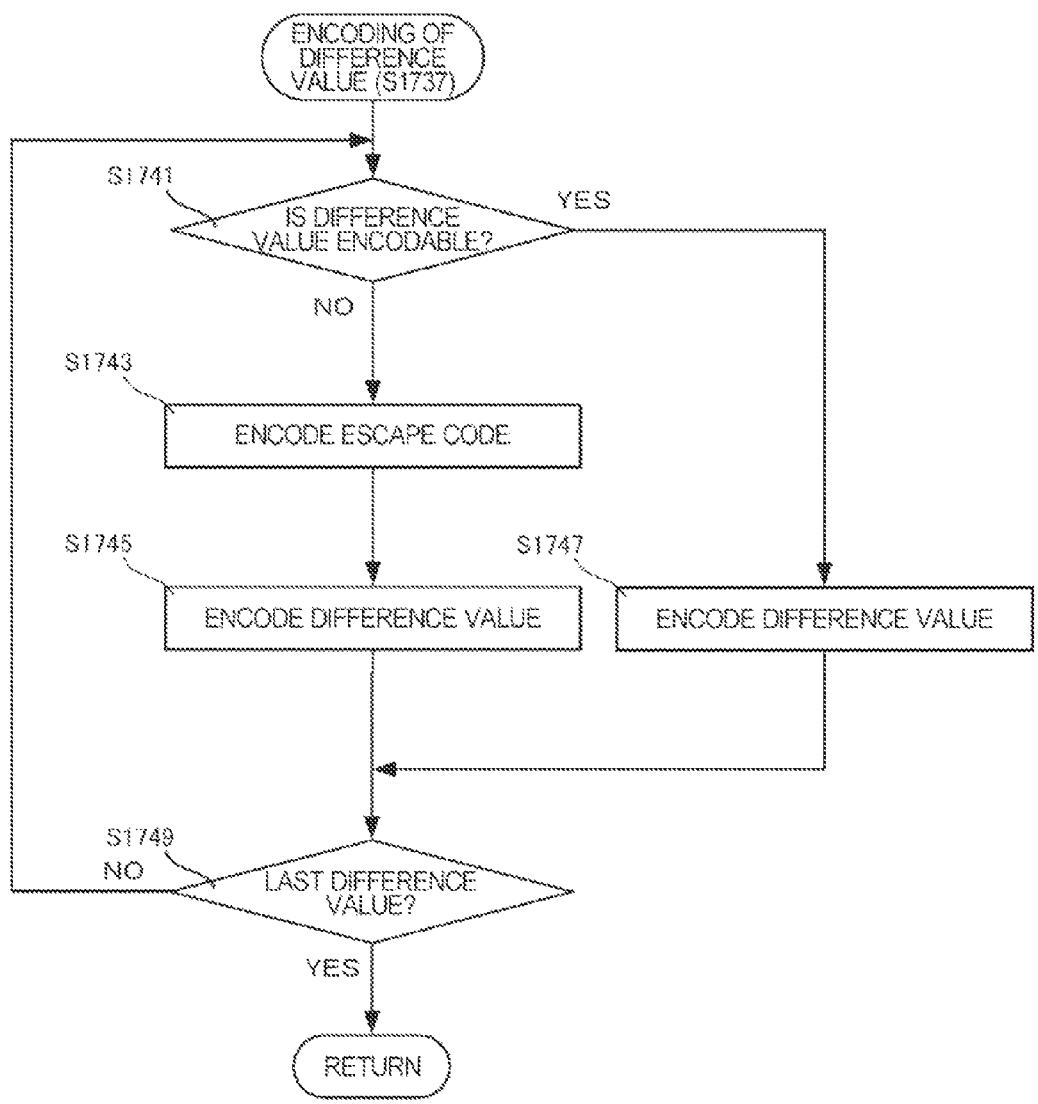
FIG. 17C is a flow chart showing a processing procedure of an encoding process of a difference value according to the second embodiment of the present invention.

FIG. 17C is a flow chart showing a processing procedure of the difference value encoding process S1737 according to the present embodiment.

First, in step S1741, a determination is made on whether or not a difference value is within an encodable range. If the difference value is within an encodable range, the procedure advances to step S1747 to encode the difference value.

Subsequently, a transition is made to step Si 1749. If the difference value is not within an encodable range (out of range), the procedure advances to step S1743 to encode an escape code. In addition, in step S1745, the difference value is encoded using a different encoding method from the encoding in step S1747. Subsequently, a transition is made to step S1749. In step S1749, a determination is made on whether or not the processed difference value is a last element in a series of difference values. If so, the process is completed. If not, the procedure returns to step S1741 to execute the process on a next difference value in the series of difference values.

Hardware Configuration of Searching Communication Terminal

Figure 18A:
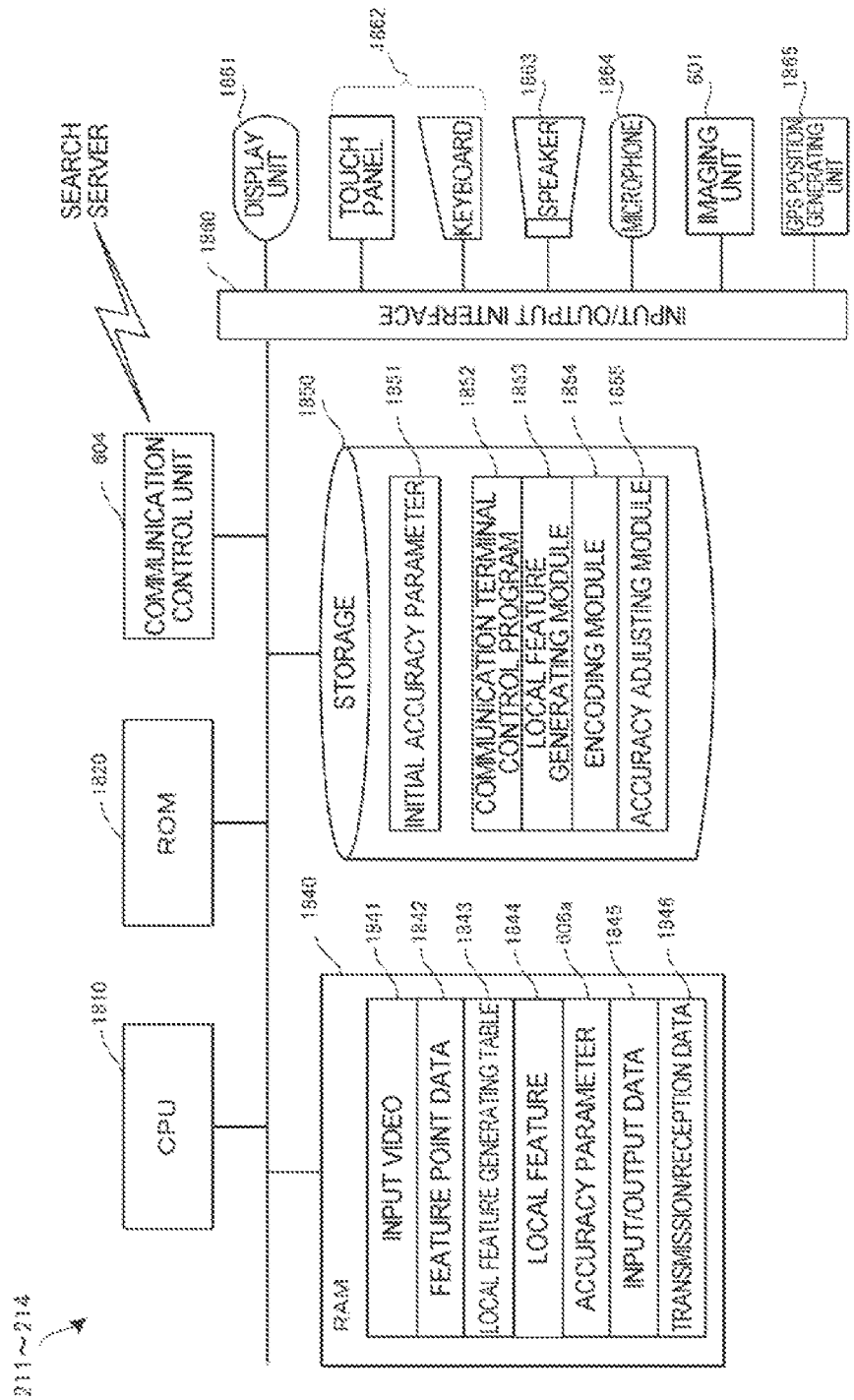
FIG. 18A is a block diagram showing a hardware configuration of the searching communication terminal according to the second embodiment of the present invention.

FIG. 18A is a block diagram showing a hardware configuration of the searching communication terminals 211 to 214 according to the present embodiment.

In FIG. 18A, a CPU 1810 is an arithmetic control processor which realizes the respective functional constituents of the searching communication terminals 211 to 214 by executing a program. A ROM 1820 stores initial data, fixed data of a program or the like, and a program. In addition, the communication control unit 604 is a communication control unit which, in the present embodiment, communicates with the search server 220 via a network. Moreover, the CPU 1810 is not limited to one unit and a plurality of CPUs may be provided or a GPU (Graphics Processing Unit) for image processing may be provided.

A RAM 1840 is a random access memory that is used by the CPU 1810 as a work area for temporary storage. An area for storing data necessary for realizing the present embodiment is secured in the RAM 1840. An input video 1841 represents an input video captured and inputted by the imaging unit 601. Feature point data 1842 represents feature point data including a feature point coordinate, a scale, and an angle detected from the input video 1841. A local feature generating table 1843 represents a local feature generating table that retains data until a local feature is generated (refer to 15B). A local feature 1844 represents a local feature which is generated using the local feature generating table 1843 and which is sent to the search server 220 via the communication control unit 604. An accuracy parameter 606a is an accuracy parameter for accuracy adjustment of a local feature that is specified by the search server 220. Input/output data 1845 is input/output data that is inputted/outputted via an input/output interface 1860. Transmission/reception data 1846 represents transmission/reception data that is transmitted/received via the communication control unit 604.

A storage 1850 stores databases and various parameters or data or programs described below which are necessary for realizing the present embodiment. An initial accuracy parameter 1851 represents an accuracy parameter that is initially set by the searching communication terminals 211 to 214.

The storage 1550 stores the following programs. A communication terminal control program 1852 represents a communication terminal control program that is responsible for overall control of the present searching communication terminals 211 to 214. The communication terminal control program 1852 includes the following modules. In the communication terminal control program 1852, a local feature generating module 1853 is a module that generates a local feature from an input video of a search object according to FIGS. 11B to 11F. An encoding module 1854 is a module for encoding the local feature generated by the local feature generating module 1853 for transmission. An accuracy adjusting module 1855 is a module for adjusting accuracy of a local feature according to the accuracy parameter 606a.

The input/output interface 1860 provides an interface for input/output data with an input/output device. Since the input/output device to be connected to the input/output interface 1860 is similar to the input/output device connected to the input/output interface 1560 of the search requesting communication terminal 230, a description thereof will be omitted.

It should be noted that FIG. 12A only shows data and programs essential to the present embodiment and, as such, data and programs not related to the present embodiment are not shown.

Accuracy Parameter

Figure 18B:
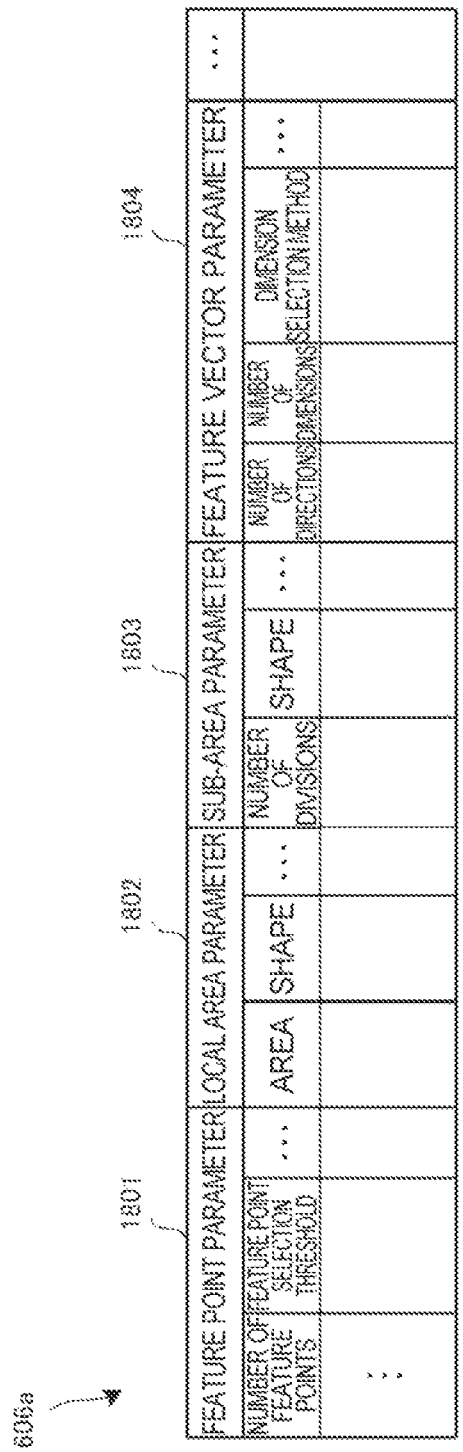
FIG. 18B is a diagram showing a configuration of an accuracy parameter according to the second embodiment of the present invention.

FIG. 18B is a diagram showing a configuration of the accuracy parameter 606a according to the present embodiment.

As a feature point parameter 1801, the accuracy parameter 606a stores the number of feature points, a feature point selection threshold with respect to selection as a feature point or not, and the like. In addition, as a local area parameter 1802, the accuracy parameter 606a stores an area (size) corresponding to a Gaussian window, a shape representing a rectangle, a circle, or the like, and the like. Furthermore, as a sub-area parameter 1803, the accuracy parameter 606a stores the number of divisions, a shape, and the like of a local area. In addition, as a feature vector parameter 1804, the accuracy parameter 606a stores the number of directions (for example, eight directions or six directions), the number of dimensions, a dimension selection method, and the like.

Moreover, the accuracy parameter shown in FIG. 18B is simply an example and is not restrictive.

Processing Procedure of Searching Communication Terminal

FIG. 19 is a flow chart showing a processing procedure of the searching communication terminals 211 to 214 according to the present embodiment. The flow chart is executed by the CPU 1810 shown in FIG. 18A using the RAM 1840 and realizes the respective functional constituents shown in FIG. 6.

First, in step S1911, a determination is made as to whether or not there has been a video input from the imaging unit 601. In addition, in step S1921, a determination is made as to whether or not accuracy adjustment information has been received from the search server 220. If neither, another process is performed in step S1931.

If there has been a video input, the procedure advances to step S1913 to execute a local feature generating process from the input video (refer to FIG. 17A). Next, in step S1915, a local feature and a feature point coordinate are encoded (refer to FIGS. 17B and 17C). In step S1917, the encoded data is transmitted to the search server 220.

If accuracy adjustment information has been received, the procedure advances to step S1923 to set the accuracy parameter 606a. Subsequently, in step S1925, an area is selected.

Moreover, since the local feature generating process in step S1913 and the encoding process in step S1915 are similar to the processes shown in FIGS. 17A to 17C of the search requesting communication terminal 230, illustration and description thereof will be omitted.

Hardware Configuration of Search Server

Figure 20:
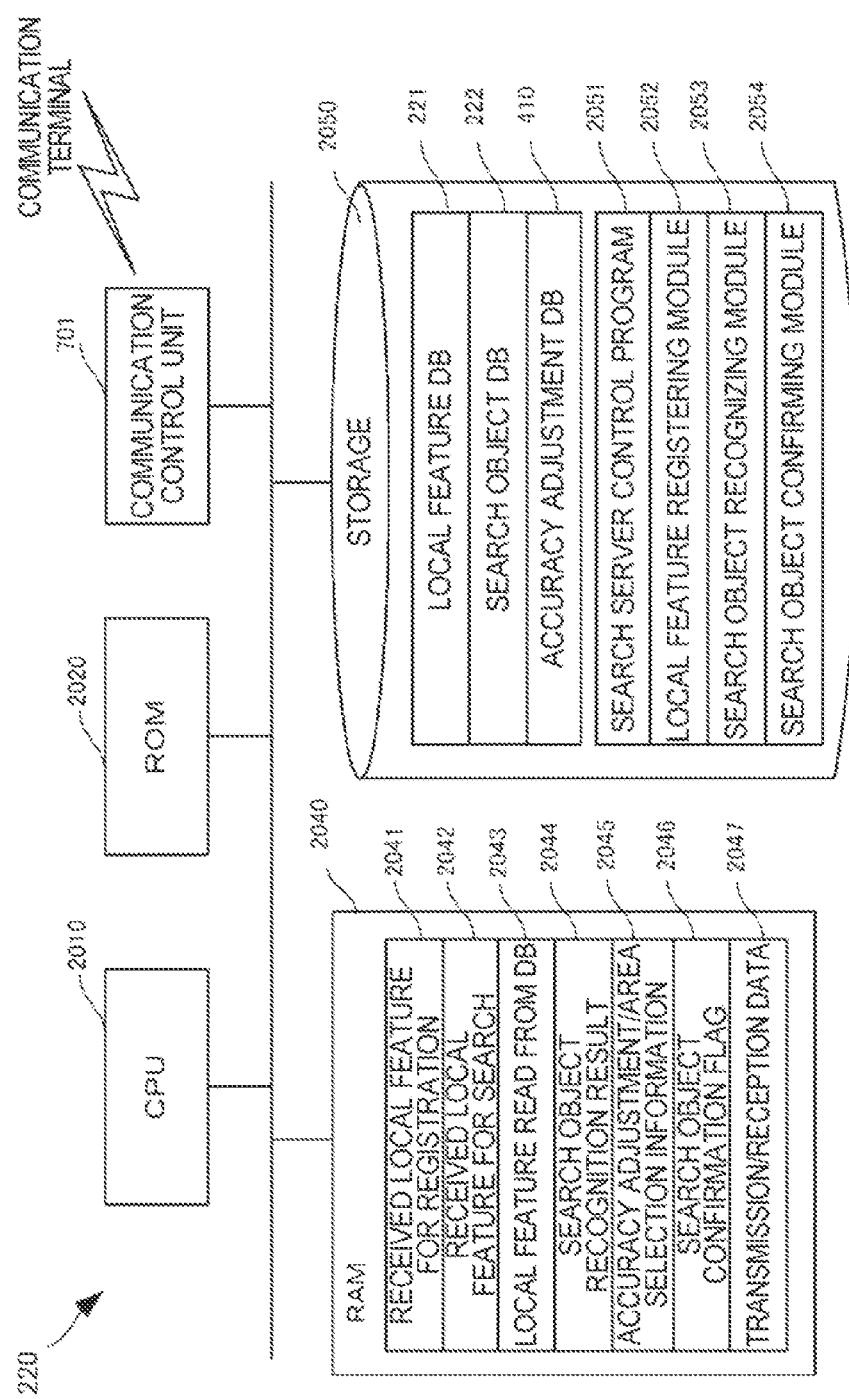
FIG. 20 is a block diagram showing a hardware configuration of a search server according to the second embodiment of the present invention.

FIG. 20 is a block diagram showing a hardware configuration of the search server 220 that is an information processing apparatus according to the present embodiment.

In FIG. 20, a CPU 2010 is an arithmetic control processor which realizes the respective functional constituents of the search server 220 by executing a program. A ROM 2020 stores initial data, fixed data of a program or the like, and a program. In addition, the communication control unit 701 is a communication control unit which, in the present embodiment, communicates with a search requesting communication terminal and searching communication terminals via a network. Moreover, the CPU 2010 is not limited to one unit and a plurality of CPUs may be provided or a GPU for image processing may be provided.

A RAM 2040 is a random access memory that is used by the CPU 2010 as a work area for temporary storage. An area for storing data necessary for realizing the present embodiment is secured in the RAM 2040. A received local feature for registration 2041 represents a local feature including a feature point coordinate received from the search requesting communication terminal 230. A received local feature for search 2042 represents a local feature including a feature point coordinate received from the searching communication terminals 211 to 214. A local feature read from a DB 2043 represents a local feature including a feature point coordinate read from the local feature DB 221. A search object recognition result 2044 represents a search object recognition result that is recognized from a collation between a local feature received from a searching communication terminal and a local feature which is stored in the local feature DB 221 and which has been received from a search requesting communication terminal. Accuracy adjustment/area selection information 2045 represents an accuracy parameter for accuracy adjustment of the searching communication terminals 211 to 214 according to the accuracy adjustment DB 410 and area information of a search object candidate in a video. A search object confirmation flag 2046 is a flag indicating that a search object candidate has been confirmed by collation at high accuracy. Transmission/reception data 2047 represents transmission/reception data that is transmitted/received via the communication control unit 701.

A storage 2050 stores databases and various parameters or data or programs described below which are necessary for realizing the present embodiment. The local feature DB 221 represents a local feature DB similar to that shown in FIG. 8. The search object DB 222 represents a search object DB similar to that shown in FIG. 9. The accuracy adjustment DB 410 represents an accuracy adjustment DB similar to that shown in FIG. 10.

The storage 1550 stores the following programs. A search server control program 2051 represents a search server control program that controls the entire search server. In the search server control program 2051, a local feature registering module 2052 is a module that registers a local feature of a search object received from the search requesting communication terminal 230 in the local feature DB 221. A search object recognition control module 2053 is a module in the search server control program 2051 which collates a received local feature with a local feature stored in the local feature DB 221 to recognize a search object. A search object confirmation control module 2054 is a module in the search server control program 2051 which transmits accuracy adjustment/area selection information to a searching communication terminal and which collates a local feature received from the searching communication terminal with a local feature stored in the local feature DB 221 to confirm a search object.

It should be noted that FIG. 20 only shows data and programs essential to the present embodiment and, as such, data and programs not related to the present embodiment are not shown.

Processing Procedure of Search Server

Figure 21:
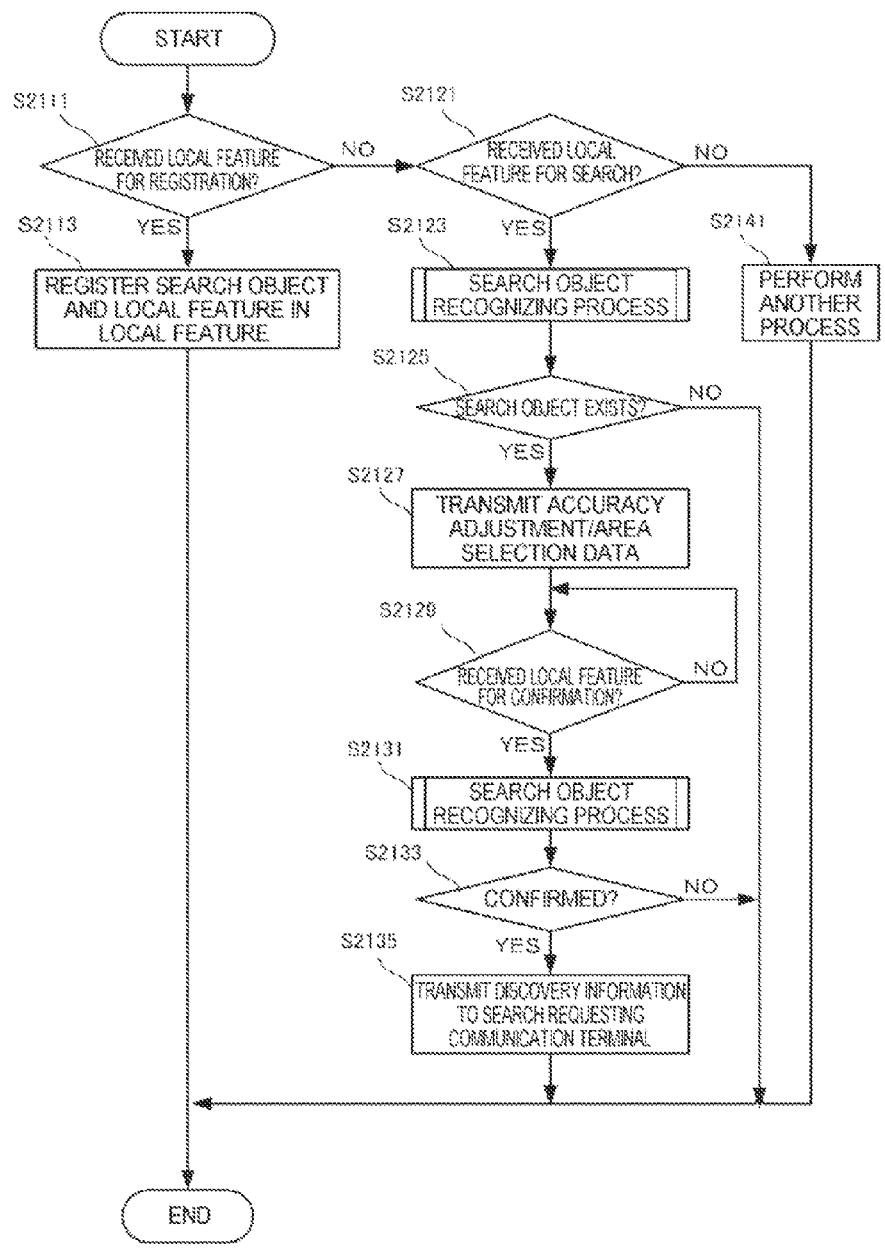
FIG. 21 is a flow chart showing a processing procedure of the search server according to the second embodiment of the present invention.

FIG. 21 is a flow chart showing a processing procedure of the search server 220 according to the present embodiment.

First, in step S2111, a determination is made as to whether or not a local feature for registration has been received from the search requesting communication terminal 230. In addition, in step S2121, a determination is made as to whether or not a local feature for search has been received from a searching communication terminal. If neither, another process is performed in step S2141.

In case of reception of a local feature for registration, the procedure advances to step S2113 to register a local feature in association with a search object in the local feature DB 221. Moreover, at the same time, information related to the search object is stored in the search object DB 222 and, if necessary, an accuracy parameter suitable for the search object is retained in the accuracy adjustment DB 410.

Figure 22A:
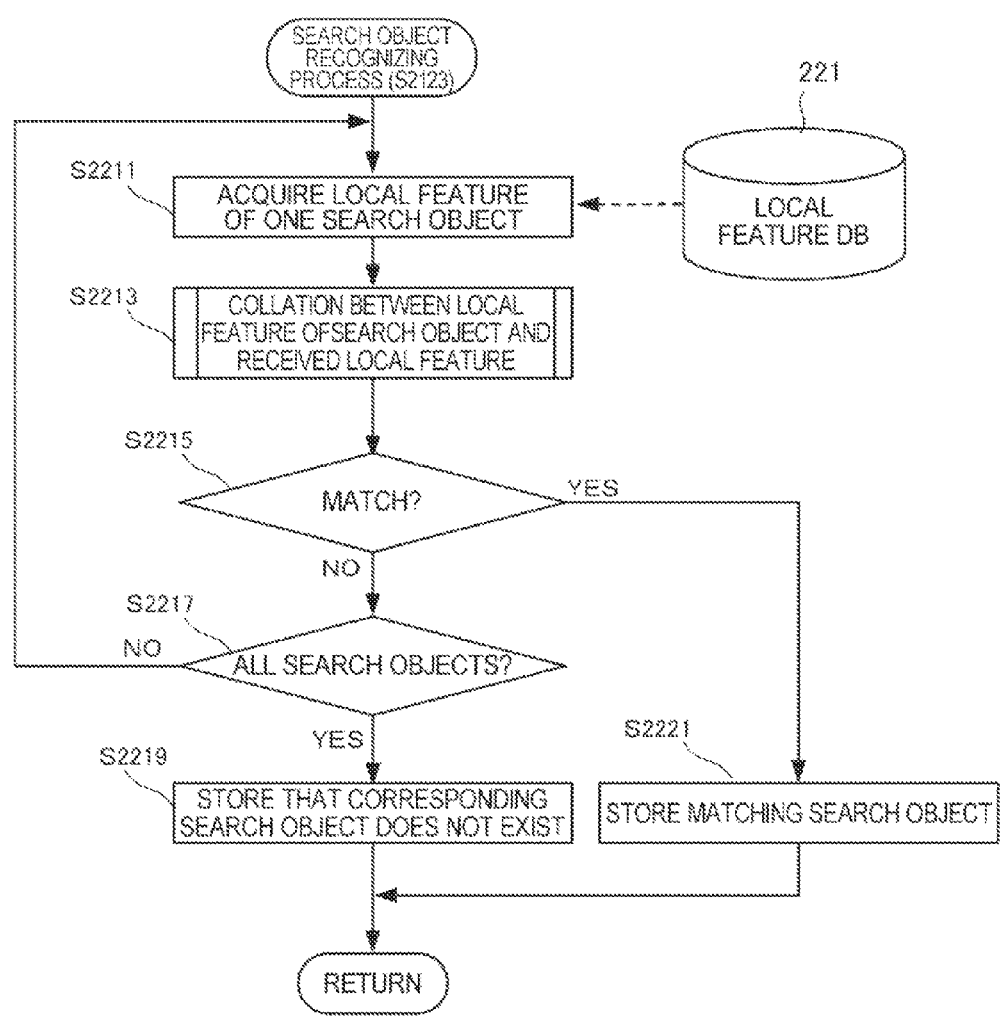
FIG. 22A is a flow chart showing a processing procedure of a search object recognizing process according to the second embodiment of the present invention.
Figure 22B:
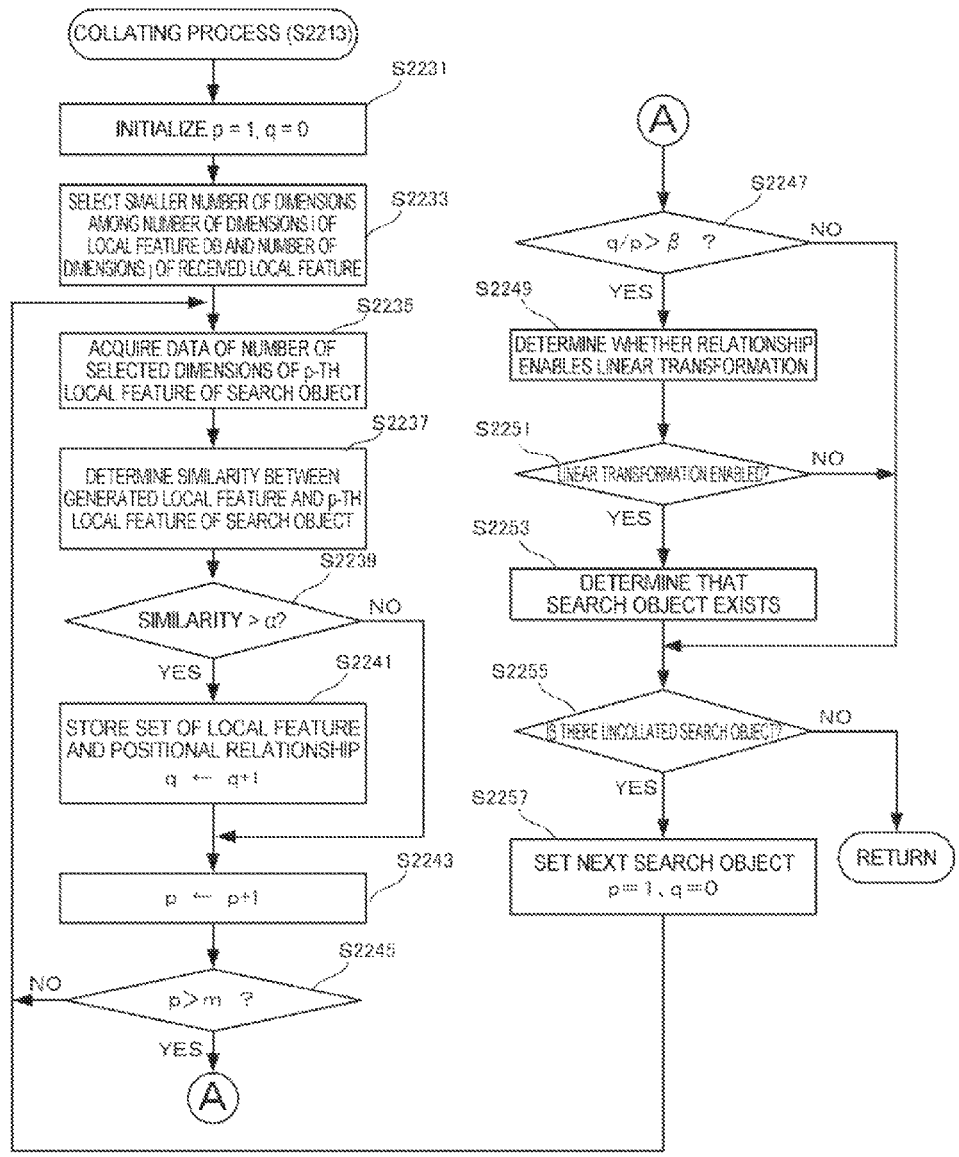
FIG. 22B is a flow chart showing a processing procedure of a collating process according to the second embodiment of the present invention.

In case of reception of a local feature for search, the procedure advances to step S2123 to perform a search object recognizing process (refer to FIGS. 22A and 22B). Next, in step S2125, a determination is made as to whether or not the search object is in the local feature for search. When it is determined that the search object exists, the procedure advances to step S2127 to acquire and transmit accuracy adjustment/area selection data to the searching communication terminal that is the transmission source.

In step S2129, the procedure awaits reception of a local feature for confirmation with respect to a search object candidate with higher accuracy from the searching communication terminal that is the transmission source. In case of reception of a local feature for confirmation, the procedure advances to step S2131 to perform a search object confirming process (refer to FIGS. 22C and 22B).

In step S2133, a determination is made as to whether a match with the search object has been confirmed. Once a match with the search object is confirmed, the procedure advances to step S2135 and transmits discovery information of the search object to the search requesting communication terminal that is the search request source.

Search Object Recognizing Process

FIG. 22A is a flow chart showing a processing procedure of the search object recognizing process S2123 according to the present embodiment.

First, in step S2211, a local feature of one search object is acquired from the local feature DB 221. Subsequently, in step S2213, collation is performed between the local feature of the search object and a local feature received from a communication terminal (refer to FIG. 22B).

In step S2215, a determination is made on whether or not the local features match. In case of a match, the procedure advances to step S2221 and stores the matching search object on the assumption that the search object exists in a video.

In step S2217, a determination is made on whether all search objects registered in the local feature DB 221 have been collated and, if not, the procedure returns to step S2211 to repeat collation of a next search object. Moreover, in performing the collation, a limit may be imposed in advance on search objects or on a search range in order to realize real-time processing by improving processing speed or to reduce processing load on the search server.

Collating Process

FIG. 22B is a flow chart showing a processing procedure of the collating process S2213 according to the present embodiment.

First, in step S2231, parameters p=1 and q=0 are set as initialization. Next, in step S2233, whichever is smaller between the number of dimensions i of a local feature in the local feature DB 221 and the number of dimensions j of a received local feature is selected.

In a loop constituted by steps S2235 to S2245, collation of each local feature is repeated until p>m (m=the number of feature points of a search object). First, in step S2235, data of the number of selected dimensions of a p-th local feature of a search object stored in the local feature DB 221 is acquired. In other words, the number of selected dimensions is acquired starting from the 1st dimension. Next, in step S2237, the p-th local feature acquired in step S2235 and local features of all feature points generated from an input video are sequentially collated with each other to determine whether or not the local features are similar. In step S2239, a determination is made on whether or not a result of collation between local features exceeds a threshold $\alpha$ and, if so, in step S2241, a set of the local feature and a positional relationship of feature points that match between the input video and the search object is stored. Subsequently, q that is a parameter representing the number of matched feature points is counted up by one. In step S2243, the feature point of the search object is advanced to a next feature point (p←p+1), and when collation of all feature points of the search object is not completed (p≤m), the procedure returns to step S2235 to repeat collation of matching local features. Moreover, the threshold $\alpha$ can be modified in accordance with a recognition accuracy that is required by the search object. In a case of a search object with a low correlation with another search object, accurate recognition can be realized even when recognition accuracy is lowered.

Once collation with all feature points of the search object is completed, the procedure advances from step S2245 to S2247. In steps S2247 to S2253, a determination is made on whether or not the search object exists in the input video. First, in step S2247, a determination is made on whether or not a ratio of the number of feature points q matching a local feature of a feature point of the input image among the number of feature points p of the search object exceeds a threshold $\beta$. If so, the procedure advances to step S2249 to further determine, as a search object candidate, whether the positional relationship between a feature point of the input video and a feature point of the search object is a relationship that enables linear transformation. In other words, a determination is made on whether or not the positional relationship between a feature point of the input video and a feature point of the search object which has been stored in step S2241 as having matching local features is a positional relationship that remains intact even after a change such as rotation, inversion, or modification of a viewpoint position or a positional relationship that cannot be modified. Since such a determination method is geometrically known, a detailed description thereof will be omitted. In step S2251, as a result of the determination on whether or not linear transformation is enabled, when it is found that linear transformation is enabled, the procedure advances to step S2253 and a determination is made that the collated search object exists in the input video. Moreover, the threshold $\beta$ can be modified in accordance with a recognition accuracy that is required by the search object. In a case of a search object with a low correlation with another search object or a search object that enables a feature thereof to be determined from a part of the search object, accurate recognition can be performed even when the number of matching feature points is low. In other words, recognition of a search object can be realized even if a part of the search object is hidden from view or as long as a characteristic part of the search object is visible.

In step S2255, a determination is made on whether or not an uncollated search object remains in the local feature DB 221. If an uncollated search object remains, a next search object is set in step S2257, the parameters are initialized to p=1 and q=0, and the procedure returns to step S935 to repeat collation.

Moreover, as is apparent from the description of the collating process given above, a process involving storing all search objects in the local feature DB 221 and collating all search objects significantly increases processing load. Therefore, for example, a user may conceivably select a range of search objects from a menu prior to search object recognition from an input video, in which case collation is performed by searching the range from the local feature DB 221. Alternatively, processing load can also be reduced by storing only local features of a range used by a user in the local feature DB 221.

Search Object Confirming Process

Figure 22C:
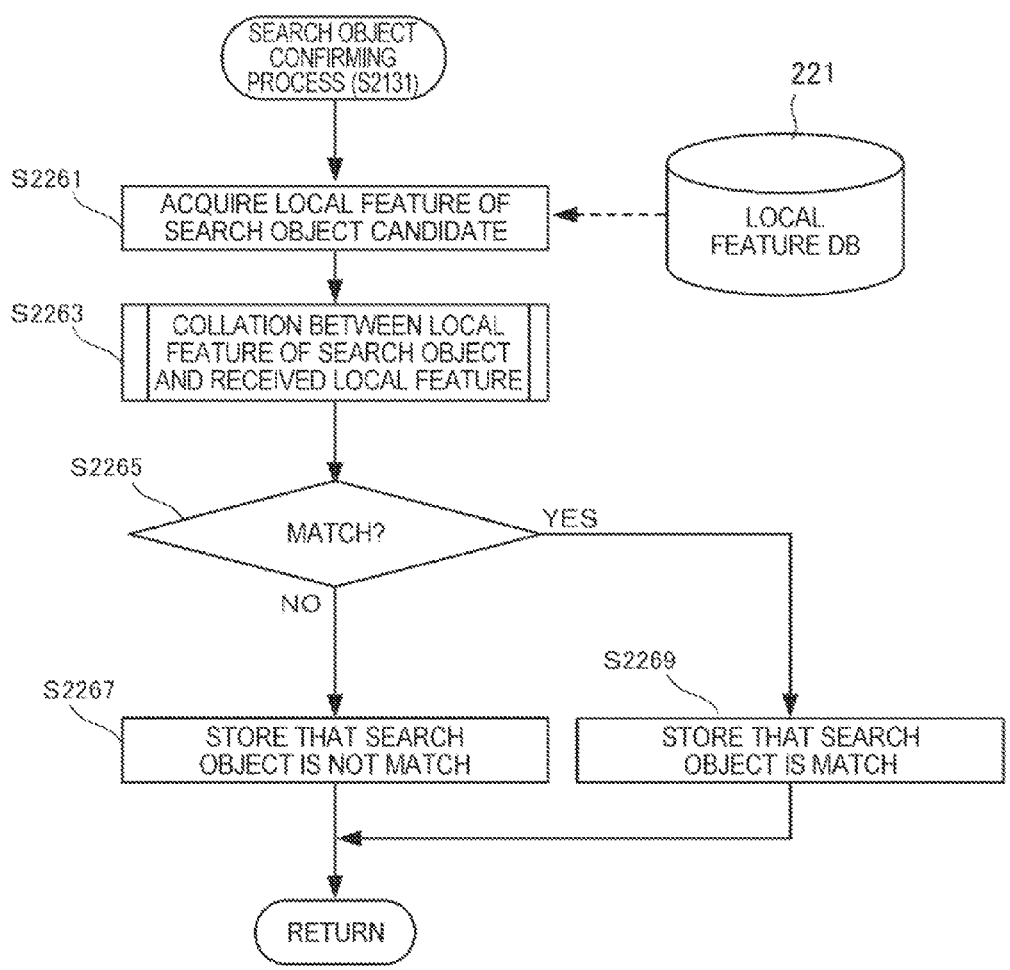
FIG. 22C is a flow chart showing a processing procedure of the search object recognizing process according to the second embodiment of the present invention.

FIG. 22C is a flow chart showing a processing procedure of the search object confirming process S2131 according to the present embodiment.

First, in step S2261, a local feature of a search object candidate is acquired from the local feature DB 221. Subsequently, in step S2263, collation is performed between the local feature of the search object and a local feature received from a communication terminal (refer to FIG. 22B).

In step S2265, a determination is made on whether or not the local features match. If so, the procedure advances to step S2269 to store the fact that the search object is a match. If not, the procedure advances to step S2267 to store the fact that the search object is not a match.

Moreover, while the collating process in step S2263 differs in that only local features of search object candidates are collated, the collating process is similar to step S2213 shown in FIG. 22A. Therefore, illustration and description thereof will be omitted. However, the thresholds α and β shown in FIG. 22B may be set so as to differ between a search object recognizing process and a search object confirming process depending in accuracy.

Third Embodiment

Next, an information processing system according to a third embodiment of the present invention will be described. The information processing system according to the present embodiment differs from the second embodiment described above in that a search object recognizing process is shared by a searching communication terminal and a search server. Since other configurations and operations are similar to those of the second embodiment, same configurations and operations will be denoted by same reference characters and detailed descriptions thereof will be omitted.

According to the present embodiment, since part of a process of search object recognition is executed by the searching communication terminal, traffic between the searching communication terminal and the search server can be reduced and, at the same time, processing load on the search server can be reduced.

Moreover, while an example where a recognizing process of a search object is performed by a searching communication terminal and a confirming process of the search object is performed by the search server 220 will be shown in the present embodiment, a different role allotment can be adopted based on communication traffic and processing loads on the searching communication terminal and the search server 220.

Operational Procedure of Information Processing System

Figure 23:
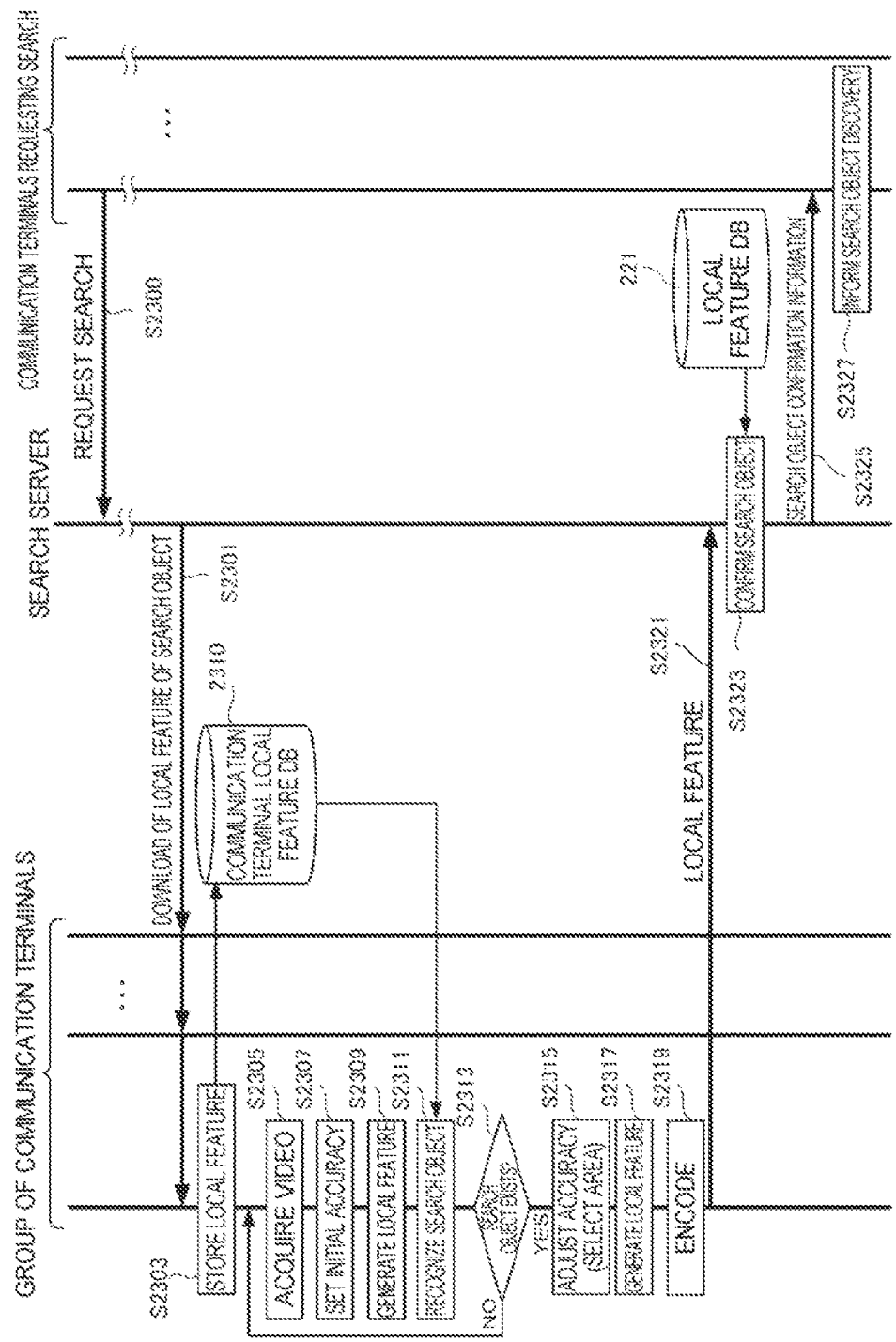
FIG. 23 is a sequence diagram showing an operational procedure of an information processing system according to a third embodiment of the present invention.

FIG. 23 is a sequence diagram showing an operational procedure of the information processing system according to the present embodiment. In FIG. 23, the initial setting process, the search requesting process, and the search object confirming process shown in FIG. 4 according to the second embodiment have been omitted or simplified in order to avoid complexity. These processes are equivalent to the processes shown in FIG. 4. Therefore, the process of downloading and activating an application have been omitted in FIG. 23.

The illustration of FIG. 23 starts with a search request from a search requesting communication terminal in step S2300. At this point, a local feature of a search object or search object-related information are transmitted to the search server 220 to be registered and retained in the respective DBs of the search server 220.

In step S2301, a local feature of a search object is downloaded from the search server 220 to a searching communication terminal. The local feature of the search object that is downloaded at this point may be all local features registered in the local feature DB 221 upon activation of the searching communication terminal. Alternatively, when a capacity of all local features registered in the local feature DB 221 is large, local features whose accuracies have been adjusted by a dimension number selection of a feature vector may be used. On the other hand, in case of a searching communication terminal that is already running, only a local feature of a search object for which a search request has been newly made may be downloaded.

In step S2303, the searching communication terminal registers the received local feature in the communication terminal local feature DB 2310 (refer to FIG. 8 for a configuration thereof) in association with a search object. In step S2305, the searching communication terminal captures videos of the respective search objects using the imaging unit. In step S2307, an initial accuracy of a local feature is set. In step S2309, local features are generated from the respective videos. Subsequently, in step S2311, a search object in the video is recognized by referencing the communication terminal local feature DB 2310. In step S2313, a determination is made as to whether the search object exists. When it is determined that the search object does not exist, the procedure returns to step S2305 to acquire a next video and repeat the recognizing process.

When it is determined that the search object exists, in step S2315, an accuracy of a local feature is adjusted. Moreover, an accuracy parameter to be adjusted may be retained by the searching communication terminal as a DB or may be downloaded together with a local feature of the search object. In addition, in step S2315, area selection of the search object is desirably performed. In step S2317, a local feature is generated at the adjusted accuracy (a higher accuracy than the initial setting). Subsequently, in step S2319, the local feature at high accuracy is encoded together with a feature point coordinate. The encoded local feature is transmitted in step S2321 from the searching communication terminal to the search server 220.

At the search server 220, in step S2323, the local feature DB 221 is referenced to collate the local feature at high accuracy. In case of a match, the search object is confirmed and information such as a search source is acquired from the search object DB 222 (not shown in FIG. 23). In addition, in step S2325, search object confirmation information is informed to the search requesting communication terminal that is the search source.

The search requesting communication terminal that is the search source receives a search result and, in step S2327, informs discovery of the search object.

Moreover, in FIG. 23, the searching communication terminal generates a local feature at an initial accuracy and performs recognition of a search object, performs accuracy adjustment and area selection, and once again generates a local feature. However, a recognizing process may be performed by generating a highly accurate local feature to begin with, and a local feature may be generated by performing an area selecting process by zooming in or the like. Accordingly, communication traffic and processing load on the search server can be reduced.

Fourth Embodiment

Next, an information processing system according to a fourth embodiment of the present invention will be described. The information processing system according to the present embodiment differs from the second and third embodiments described above in that the search server selects a searching communication terminal to be used for searching. Since other configurations and operations are similar to those of the second and third embodiments, same configurations and operations will be denoted by same reference characters and detailed descriptions thereof will be omitted.

According to the present embodiment, since a search range can be selected in advance, searching speed can be increased and processing load on the search server can be reduced.

Operational Procedure of Information Processing System

FIG. 24 is a sequence diagram showing an operational procedure of the information processing system according to the present embodiment. Moreover, in FIG. 24, the initial setting process, the search requesting process, and the search object confirming process shown in FIG. 4 according to the second embodiment have been omitted or simplified in order to avoid complexity. These processes are equivalent to the processes shown in FIG. 4. In FIG. 24, an application is only downloaded to a searching communication terminal which has made a search request and which is within a search range of a search object that is a search target and a concentrated search is performed. A search range may be divided into multiple levels, whereby a local feature of an accuracy may be selected or a method to be used in a recognizing process or a confirming process may be selected in correspondence to the levels.

The illustration of FIG. 24 starts with a search request from a search requesting communication terminal in step S2400. At this point, a local feature of a search object or search object-related information are transmitted to the search server 220 to be registered and retained in respective DBs of the search server 220 (not shown).

In step S2401, the search server 220 determines a search range from the search object for which a search request had been made or from related information. Subsequently, in step S2403, an application capable of processing the present embodiment and an accuracy parameter suitable for the search object are downloaded to a searching communication terminal within the search range. In this case, the communication terminal that is a download destination may be a communication terminal registered in advance or may be all surveillance cameras or mobile terminals with cameras which are within the search range. Alternatively, a start of search may simply be instructed to communication terminals to which the application has been mounted in advance and to communication terminals which have already downloaded the application. In FIG. 24, the communication terminals denoted by circles are selected as searching communication terminals while the communication terminals denoted by crosses are not selected as searching communication terminals.

First, in step S2405, the selected searching communication terminals perform accuracy adjustment to the downloaded accuracy parameter. In step S2407, the searching communication terminals capture respective videos using the imaging units. In step S2409, local features are generated from the respective videos. Subsequently, in step S2411, the generated local features are encoded together with feature point coordinates. The encoded local features are transmitted in step S2413 from the searching communication terminals to the search server 220.

At the search server 220, in step S2415, the local feature DB 221 is referenced to collate the local features, the search object is recognized from the videos, the search object is further confirmed, and information such as a search source is acquired from the search object DB 222 (not shown in FIG. 23). In addition, in step S2417, search object confirmation information is informed to the search requesting communication terminal that is the search source.

The search requesting communication terminal that is the search source receives a search result and, in step S2419, informs discovery of the search object.

Moreover, while recognition and confirmation of the search object have been performed by the search server 220 in FIG. 24, the recognizing process may be performed by the searching communication terminals and the confirming process may be performed by the search server as is the case in the third embodiment. By selecting a range of searching communication terminals as is the case in the present embodiment, communication traffic and processing loads on the searching communication terminals and the search server can be reduced.

Fifth Embodiment

Next, an information processing system according to a fifth embodiment of the present invention will be described. The information processing system according to the present embodiment differs from the second to fourth embodiments described above in that a single communication terminal performs all of the processes by a search requesting communication terminal, a searching communication terminal, and a search server. Since other configurations and operations are similar to those of the second to fourth embodiments, same configurations and operations will be denoted by same reference characters and detailed descriptions thereof will be omitted.

According to the present embodiment, a search object can be searched using a single communication terminal. The present embodiment is particularly useful when searching for a search object in a limited area such as the inside of a room or a building.

Functional Configuration of Communication Terminal

FIG. 25 is a block diagram showing a functional configuration of the communication terminal 2511 according to the present embodiment. Moreover, functional constituents similar to FIG. 6 according to the second embodiment will be denoted by same reference characters and descriptions thereof will be omitted in FIG. 25.

A selection is made using an operating unit (not shown) as to whether a search object registration or a search object search is to be performed by a communication terminal. Alternatively, only a search object registration may be selected and, otherwise, a search object search may be performed.

A registration/search determining unit 2501 determines whether a registration or a search of the search object is to be performed and causes different processes to be executed with respect to a local feature generated by the local feature generating unit 602. In case of a search object registration, the generated local feature is a local feature of a captured search object. Therefore, a local feature registering unit 2502 registers the local feature in a local feature DB 2510 in association with the search object. At the same time, data corresponding to an accuracy adjustment DB 2520 and a search object DB 2530 is retained.

On the other hand, in case of a search of a search object, the generated local feature is a local feature of a captured video. Therefore, a search object recognizing unit 2503 performs collation to check whether a local feature registered in the local feature DB 2510 is included in the local feature of the captured video in order to recognize the search object. When it is recognized that the search object exists in the video, an accuracy adjustment acquiring unit 2504 acquires an accuracy parameter that is suitable for confirming the search object from the accuracy adjustment DB 2520. The acquired accuracy parameter is retained in the accuracy parameter 606a of the accuracy adjusting unit 606 and an accuracy of a local feature that is generated from a video is adjusted. Moreover, while area selection including zooming into a search object is not illustrated in FIG. 25, search object confirmation can be performed more accurately by performing area selection.

A search object confirming unit 2506 collates the local feature of the video whose accuracy has been adjusted with a local feature in the local feature DB 2510 and confirms the recognized search object. Once the search object confirming unit 2506 confirms the search object, a search object discovery information informing unit 2507 references the search object DB 2530 and informs search object discovery information. In addition, when a communication terminal for search result confirmation is separately provided, a search object discovery information transmitting unit 2508 transmits search object discovery information to the communication terminal for search result confirmation.

Sixth Embodiment

Next, an information processing system according to a sixth embodiment of the present invention will be described. The information processing system according to the present embodiment differs from the second to fifth embodiments described above in that a search object to be searched based on a local feature is an illegal duplicate of a video. Since other configurations and operations are similar to those of the second to fourth embodiments, same configurations and operations will be denoted by same reference characters and detailed descriptions thereof will be omitted.

According to the present embodiment, an illegal duplicate can be searched in real time from a reproduced or broadcasted video.

Configuration of Information Processing System

FIG. 26 is a block diagram showing a configuration of an information processing system 2600 according to the present embodiment.

In the information processing system 2600 shown in FIG. 26, a network 2640 includes a plurality of communication terminals 2601 to 2605, an original video registering server 2620 in which an original video is registered, and an illegal duplicate monitoring server 2610 that is an information processing apparatus which monitors broadcasts and reproduction of an illegal duplicate.

The plurality of communication terminals 2601 to 2605 include mobile terminals 2601 and 2062, a monitor 2603, a mobile PC 2604, and a desktop PC 2605. The communication terminals 2601 to 2605 respectively include local feature generating units 2601a to 2605a, generate a local feature from a video to be downloaded or uploaded or a video that is being broadcasted or reproduced, and transmit the local feature to the illegal duplicate monitoring server 2610.

The original video registering server 2620 includes a video content generating provider, a video content providing provider, and the like. In addition, the original video registering server 2620 includes a local feature generating unit 2620a. The original video registering server 2620 registers a local feature generated from a characteristic frame (original image) of an original video or a local feature of a characteristic object, person, or a landscape element in the background that appears in the original video and combined information thereof, and the like in the illegal duplicate monitoring server 2610.

The illegal duplicate monitoring server 2610 registers the local feature of the original video transmitted from the original video registering server 2620 in the local feature DB 2611. In addition, the illegal duplicate monitoring server 2610 collates a local feature of a video which is transmitted in real time from the communication terminals 2601 to 2605 to be downloaded or uploaded or which is being broadcasted or reproduced with the local feature registered in the local feature DB 2611. A determination of an illegal duplicate is made when the local features match at a prescribed probability, in which case a warning that an illegal duplicate has been determined is issued to the transmission source and the illegal duplicate is informed to other communication terminals and to the related original video registering server 2620.

Operational Procedure of Information Processing System

FIG. 27 is a sequence diagram showing an operational procedure of the information processing system 2600 according to the present embodiment. Moreover, in FIG. 27, the downloading and activation of an application that is shown in FIG. 4 according to the second embodiment have been omitted in order to avoid complexity. The processes are equivalent to the processes shown in FIG. 4.

The illustration of FIG. 27 starts with registration of an original video from the original video registering server 2620 in step S2701. In this case, information on the original video and a corresponding local feature are transmitted to the illegal duplicate monitoring server 2610. In step S2703, the illegal duplicate monitoring server 2610 registers the received local feature in the local feature DB 2611 in association with an original video ID.

The communication terminals 2601 to 2605 respectively reproduce videos in step S2705. Moreover, step S2705 includes downloading and uploading of the videos. In step S2707, local features are generated from the respective videos. Subsequently, in step S2709, the generated local features are encoded together with feature point coordinates. The encoded local features are transmitted in step S2711 from the communication terminals 2601 to 2605 to the illegal duplicate monitoring server 2610.

At the illegal duplicate monitoring server 2610, in step S2713, the local feature DB 2611 is referenced to collate local features and to detect a match with the original image from the videos. In step S2715, a determination is made as to whether an illegal duplicate exists or not and, if not, a next local feature is received to repeat the detection of an illegal duplicate of step S2713. If an illegal duplicate is detected, the procedure advances to step S2717 to generate illegal duplicate information. Subsequently, in step S2719, an illegal duplicate warning is transmitted to a communication terminal reproducing the illegal duplicate. At the same time, information regarding the illegal duplicate is transmitted to the original video registering server 2620 related to the illegal duplicate.

In step S2721, the communication terminal reproducing the illegal duplicate issues an illegal duplicate warning. On the other hand, in step S2733, the original video registering server 2620 related to the illegal duplicate informs information on the illegal duplicate. Moreover, the information on the illegal duplicate may also be informed to other communication terminals not reproducing the illegal duplicate.

Other Embodiments

While the present invention has been described with reference to embodiments, the present invention is not intended to be limited to the embodiments described above. Various modifications to configurations and details of the present invention will occur to those skilled in the art without departing from the scope of the present invention. In addition, systems or apparatuses that combine different characteristics included in the respective embodiments in any way are also included in the scope of the present invention.

Furthermore, the present invention may be applied to a system constituted by a plurality of devices or to a single apparatus. In addition, the present invention can also be applied to cases where a control program that realizes functions of the embodiments is directly or remotely supplied to a system or an apparatus. Accordingly, a control program to be installed in a computer, a medium storing the control program, and a WWW (World Wide Web) that enables the control program to be downloaded for the purpose of realizing functions of the present invention using a computer are also included in the scope of the present invention.

The present application claims priority on the basis of Japanese Patent Application No. 2012-017384 filed on Jan. 30, 2012, the entire contents of which are incorporated herein by reference.

A part of or all of the present embodiment may also be described as, but not limited to, the appendices provided below.

(Appendix 1)

An information processing system, including:

first local feature storing unit that stores, in association with each other, a search object and m-number of first local features which are respectively constituted by a feature vector of 1 dimension to i dimensions and which are generated for each of m-number of local areas including each of m-number of feature points in an image of the search object;

second local feature generating unit that extracts n-number of feature points from an image of a video captured by first imaging unit, and that generates n-number of second local features respectively constituted by a feature vector of 1 dimension to j dimensions for n-number of local areas including each of the n-number of feature points; and recognizing unit that selects a smaller number of dimensions among the number of dimensions i of the feature vector of the first local feature and the number of dimensions j of the feature vector of the second local feature, and that recognizes that the search object exists in the image in the video when determining that a prescribed ratio or more of the m-number of first local features constituted by a feature vector up to the selected number of dimensions corresponds to the n-number of second local features constituted by a feature vector up to the selected number of dimensions.

(Appendix 2)

The information processing system according to Appendix 1, further including first local feature generating unit that extracts m-number of feature points from an image of the search object and that generates the m-number of first local features which are respectively constituted by a feature vector of 1 dimension to i dimensions.

(Appendix 3)

The information processing system according to Appendix 2, further including second imaging unit that captures an image of the search object, wherein the first local feature generating unit generates the m-number of first local features based on the image of the search object captured by the second imaging unit.

(Appendix 4)

The information processing system according to Appendix 3, further including informing unit that informs a recognition result obtained from the recognizing unit.

Appendix 5

The information processing system according to Appendix 4, further including a first communication terminal for generating a local feature of the search object, a second communication terminal for searching the search object based on the local feature, and an information processing apparatus that communicates with the first communication terminal and the second communication terminal, wherein the first communication terminal includes the second imaging unit, the first local feature generating unit, and the informing unit and transmits the m-number of first local features from the first communication terminal to the information processing apparatus, the second communication terminal includes the first imaging unit and the second local feature generating unit and transmits the n-number of second local features from the second communication terminal to the information processing apparatus, and the information processing apparatus includes the first local feature storing unit and the recognizing unit and transmits a recognition result of the recognizing unit from the information processing apparatus to the first communication terminal.

(Appendix 6)

The information processing system according to Appendix 2, wherein the search object is a lost article or a stolen article, the first local feature storing unit stores a first local feature generated by the first local feature generating unit from an image of the lost article or the stolen article to be searched, and the recognizing unit recognizes that the lost article or the stolen article exists in the image in the video when determining that a prescribed ratio or more of the m-number of first local features corresponds to the n-number of second local features.

(Appendix 7)

The information processing system according to Appendix 2, wherein the search object is a person, the first local feature storing unit stores a first local feature generated by the first local feature generating unit from an image of the person to be searched, and the recognizing unit recognizes that the person exists in the image in the video when determining that a prescribed ratio or more of the m-number of first local features corresponds to the n-number of second local features.

(Appendix 8)

The information processing system according to Appendix 2, wherein the search object is a duplicate, the first local feature storing unit stores a first local feature generated by the first local feature generating unit from an original image, and the recognizing unit recognizes that the original image exists in the image in the video when determining that a prescribed ratio or more of the m-number of first local features corresponds to the n-number of second local features.

(Appendix 9)

The information processing system according to any one of Appendices 1 to 8, wherein the second local feature generating unit includes accuracy adjusting unit that adjusts an accuracy of the second local feature, and the recognizing unit confirms the search object based on a second local feature generated by the second local feature generating unit by adjusting to a higher accuracy.

(Appendix 10)

The information processing system according to any one of Appendices 1 to 9, wherein the first local feature and the second local feature are each generated by dividing a local area including a feature point extracted from an image into a plurality of sub-areas and generating a feature vector of a plurality of dimensions constituted by a histogram in a gradient direction in the plurality of sub-areas.

(Appendix 11)

The information processing system according to Appendix 10, wherein the first local feature and the second local feature are each generated by removing a dimension at which a correlation between adjacent sub-areas is higher among the generated feature vector of a plurality of dimensions.

(Appendix 12)

The information processing system according to Appendix 10 or 11, wherein the plurality of dimensions of the feature vector are arranged to circle the local area once for every predetermined number of dimensions so that dimensions can be selected starting from a first dimension in a descending order of contributions to the feature point and in accordance with an increase in accuracy that is required with respect to the local feature.

(Appendix 13)

The information processing system according to Appendix 12, wherein the second local feature generating unit generates, corresponding to a correlation of the search objects to be searched, the second local feature with a smaller number of dimensions for a search object that has a lower correlation with another search object.

(Appendix 14)

The information processing system according to Appendix 12 or 13, wherein the first local feature storing unit stores, corresponding to a correlation of the search objects to be searched, the first local feature with a smaller number of dimensions for a search object that has a lower correlation with another search object.

(Appendix 15)

An information processing method in an information processing system including first local feature storing unit that stores, in association with each other, a search object and m-number of first local features which are respectively constituted by a feature vector of 1 dimension to i dimensions and which are generated for each of m-number of local areas including each of m-number of feature points in an image of the search object, the method including the steps of:

extracting n-number of feature points from an image of a video captured by first imaging unit and generating n-number of second local features respectively constituted by a feature vector of 1 dimension to j dimensions for n-number of local areas including each of the n-number of feature points; and selecting a smaller number of dimensions among the number of dimensions i of the feature vector of the first local feature and the number of dimensions j of the feature vector of the second local feature, and recognizing that the search object exists in the image in the video when determining that a prescribed ratio or more of the m-number of first local features constituted by a feature vector up to the selected number of dimensions corresponds to the n-number of second local features constituted by a feature vector up to the selected number of dimensions.

(Appendix 16)

A communication terminal including:

second local feature generating unit that extracts n-number of feature points from an image in a captured video and that generates n-number of second local features respectively constituted by a feature vector of 1 dimension to j dimensions for n-number of local areas including each of the n-number of feature points; and first transmitting unit that transmits the n-number of second local features to an information processing apparatus that recognizes a search object included in the captured image based on a collation of local features.

(Appendix 17)

A control method of a communication terminal, including the steps of:

extracting n-number of feature points from an image in a captured video and generating n-number of second local features respectively constituted by a feature vector of 1 dimension to j dimensions for n-number of local areas including each of the n-number of feature points; and transmitting the n-number of second local features to an information processing apparatus that recognizes a search object included in the captured image based on a collation of local features.

(Appendix 18)

A control program that causes a computer to execute the steps of:

extracting n-number of feature points from an image in a captured video and generating n-number of second local features respectively constituted by a feature vector of 1 dimension to j dimensions for n-number of local areas including each of the n-number of feature points; and transmitting the n-number of second local features to an information processing apparatus that recognizes a search object included in the captured image based on a collation of local features.

(Appendix 19)

A communication terminal including:

first local feature generating unit that extracts m-number of feature points from a captured video of a search object and that generates m-number of first local features respectively constituted by a feature vector of 1 dimension to i dimensions for m-number of local areas including each of the m-number of feature points;

second transmitting unit that transmits the m-number of first local features to an information processing apparatus that recognizes whether or not a captured search object is included in another image based on a collation of local features; and first receiving unit that receives information indicating the captured search object included in the other image from the information processing apparatus.

(Appendix 20)

A control method of a communication terminal, including the steps of:

extracting m-number of feature points from a captured video of a search object and generating m-number of first local features respectively constituted by a feature vector of 1 dimension to i dimensions for m-number of local areas including each of the m-number of feature points;

transmitting the m-number of first local features to an information processing apparatus that recognizes whether or not a captured search object is included in another image based on a collation of local features; and receiving information indicating the captured search object included in the other image from the information processing apparatus.

(Appendix 21)

A control program of a communication terminal, causing a computer to execute the steps of:

extracting m-number of feature points from a captured video of a search object and generating m-number of first local features respectively constituted by a feature vector of 1 dimension to i dimensions for m-number of local areas including each of the m-number of feature points;

transmitting the m-number of first local features to an information processing apparatus that recognizes whether or not a captured search object is included in another image based on a collation of local features; and receiving information indicating the captured search object included in the other image from the information processing apparatus.

(Appendix 22)

An information processing apparatus including:

first local feature storing unit that stores, in association with each other, a search object and m-number of first local features which are respectively constituted by a feature vector of 1 dimension to i dimensions and which are generated for each of m-number of local areas including each of m-number of feature points in an image of the search object;

second receiving unit that extracts n-number of feature points from an image of a video captured by a first communication terminal which searches for the search object and that receives, from the first communication terminal, n-number of second local features respectively constituted by a feature vector of 1 dimension to j dimensions for n-number of local areas including each of the n-number of feature points;

recognizing unit that selects a smaller number of dimensions among the number of dimensions i of the feature vector of the first local feature and the number of dimensions j of the feature vector of the second local feature and that recognizes that the search object exists in the image in the video when determining that a prescribed ratio or more of the m-number of first local features constituted by a feature vector up to the selected number of dimensions corresponds to the n-number of second local features constituted by a feature vector up to the selected number of dimensions; and second transmitting unit that transmits information indicating the recognized search object to a second communication terminal having requested a search for the search object.

(Appendix 23)

A control method of an information processing apparatus including first local feature storing unit that stores, in association with each other, a search object and m-number of first local features which are respectively constituted by a feature vector of 1 dimension to i dimensions and which are generated for each of m-number of local areas including each of m-number of feature points in an image of the search object, the control method including the steps of:

extracting n-number of feature points from an image of a video captured by a first communication terminal that searches for the search object and receiving, from the first communication terminal, n-number of second local features respectively constituted by a feature vector of 1 dimension to j dimensions for n-number of local areas including each of the n-number of feature points;

selecting a smaller number of dimensions among the number of dimensions i of the feature vector of the first local feature and the number of dimensions j of the feature vector of the second local feature and recognizing that the search object exists in the image in the video when determining that a prescribed ratio or more of the m-number of first local features constituted by a feature vector up to the selected number of dimensions corresponds to the n-number of second local features constituted by a feature vector up to the selected number of dimensions; and transmitting information indicating the recognized search object to a second communication terminal having requested a search for the search object.

(Appendix 24)

A control program of an information processing apparatus including first local feature storing unit that stores, in association with each other, a search object and m-number of first local features which are respectively constituted by a feature vector of 1 dimension to i dimensions and which are generated for each of m-number of local areas including each of m-number of feature points in an image of the search object, the control program causing a computer to execute the steps of:

extracting n-number of feature points from an image of a video captured by a first communication terminal that searches for the search object and receiving, from the first communication terminal, n-number of second local features respectively constituted by a feature vector of 1 dimension to j dimensions for n-number of local areas including each of the n-number of feature points;

selecting a smaller number of dimensions among the number of dimensions i of the feature vector of the first local feature and the number of dimensions j of the feature vector of the second local feature and recognizing that the search object exists in the image in the video when determining that a prescribed ratio or more of the m-number of first local features constituted by a feature vector up to the selected number of dimensions corresponds to the n-number of second local features constituted by a feature vector up to the selected number of dimensions; and transmitting information indicating the recognized search object to a second communication terminal having requested a search for the search object.

We claim:

1. An information processing system, comprising a processor and a memory, which includes:
   a first local feature storing unit configured to store, in association with each other, a search object and m-number of first local features which are respectively constituted by a feature vector of 1 dimension to i dimensions and which are generated for each of m-number of local areas including each of m-number of feature points in an image of the search object;

a second local feature generating unit configured to extract an n-number of feature points from an image of a video captured by a first imaging unit, and that generates n-number of second local features respectively constituted by a feature vector of 1 dimension to j dimensions for n-number of local areas including each of the n-number of feature points; and a recognizing unit that is configured to select a smaller number of dimensions among the number of dimensions i of the feature vector of the first local feature and the number of dimensions j of the feature vector of the second local feature, and that recognizes that the search object exists in the image in the video when determining that a prescribed ratio or more of the m-number of first local features constituted by a feature vector up to the selected number of dimensions corresponds to the n-number of second local features constituted by a feature vector up to the selected number of dimensions.

2. The information processing system according to claim 1, further comprising a first local feature generating unit configured to extract an m-number of feature points from an image of the search object and that generates the m-number of first local features which are respectively constituted by a feature vector of 1 dimension to i dimensions.

3. The information processing system according to claim 2, further comprising a second imaging unit configured to capture an image of the search object, wherein the first local feature generating unit is configured to generate the m-number of first local features based on the image of the search object captured by the second imaging unit.

4. The information processing system according to claim 3, further comprising an informing unit configured to inform a recognition result obtained from the recognizing unit.

5. The information processing system according to claim 4, further comprising a first communication terminal configured for generating a local feature of the search object, a second communication terminal configured for searching the search object based on the local feature, and an information processing apparatus configured to communicate with the first communication terminal and the second communication terminal, wherein the first communication terminal includes the second imaging unit, the first local feature generating unit, and the informing unit and is configured to transmit the m-number of first local features from the first communication terminal to the information processing apparatus, the second communication terminal includes the first imaging unit and the second local feature generating unit and is configured to transmit the n-number of second local features from the second communication terminal to the information processing apparatus, and the information processing apparatus includes the first local feature storing unit and the recognizing unit and is configured to transmit a recognition result of the recognizing unit from the information processing apparatus to the first communication terminal.

6. The information processing system according to claim 5, wherein the second local feature generating unit includes an accuracy adjusting unit configured to adjust an accuracy of the second local feature, and the recognizing unit is configured to confirm the search object based on a second local feature generated by the second local feature generating unit by adjusting to a higher accuracy.

7. The information processing system according to claim 4, wherein the second local feature generating unit includes an accuracy adjusting unit configured to adjust an accuracy of the second local feature, and the recognizing unit is configured to confirm the search object based on a second local feature generated by the second local feature generating unit by adjusting to a higher accuracy.

8. The information processing system according to claim 3, wherein the second local feature generating unit includes an accuracy adjusting unit configured to adjust an accuracy of the second local feature, and the recognizing unit is configured to confirm the search object based on a second local feature generated by the second local feature generating unit by adjusting to a higher accuracy.

9. The information processing system according to claim 2, wherein the search object is a lost article or a stolen article, the first local feature storing unit is configured to store a first local feature generated by the first local feature generating unit from an image of the lost article or the stolen article to be searched, and the recognizing unit is configured to recognize that the lost article or the stolen article exists in the image in the video when determining that a prescribed ratio or more of the m-number of first local features corresponds to the n-number of second local features.

10. The information processing system according to claim 2, wherein the search object is a person, the first local feature storing unit is configured to store a first local feature generated by the first local feature generating unit from an image of the person to be searched, and the recognizing unit is configured to recognize that the person exists in the image in the video when determining that a prescribed ratio or more of the m-number of first local features corresponds to the n-number of second local features.

11. The information processing system according to claim 2, wherein the search object is a duplicate, the first local feature storing unit is configured to store a first local feature generated by the first local feature generating unit from an original image, and the recognizing unit is configured to recognize that the original image exists in the image in the video when determining that a prescribed ratio or more of the m-number of first local features corresponds to the n-number of second local features.

12. The information processing system according to claim 1, wherein the second local feature generating unit includes accuracy adjusting unit that is configured to adjust an accuracy of the second local feature, and the recognizing unit is configured to confirm the search object based on a second local feature generated by the second local feature generating unit by adjusting to a higher accuracy.

13. The information processing system according to claim 1, wherein the first local feature and the second local feature are each generated by dividing a local area including a feature point extracted from an image into a plurality of sub-areas and generating a feature vector of a plurality of dimensions constituted by a histogram in a gradient direction in the plurality of sub-areas.

14. The information processing system according to claim 13, wherein the first local feature and the second local feature are each generated by removing a dimension at which a correlation between adjacent sub-areas is higher among the generated feature vector of a plurality of dimensions.

15. The information processing system according to claim 13, wherein the plurality of dimensions of the feature vector are arranged to circle the local area once for every predetermined number of dimensions so that dimensions can be selected starting from a first dimension in a descending order of contributions to the feature point and in accordance with an increase in accuracy that is required with respect to the local feature.

16. The information processing system according to claim 15, wherein the second local feature generating unit is configured to generate, corresponding to a correlation of the search objects to be searched, the second local feature with a smaller number of dimensions for a search object that has a lower correlation with another search object.

17. The information processing system according to claim 15, wherein the first local feature storing unit is configured to store, corresponding to a correlation of the search objects to be searched, the first local feature with a smaller number of dimensions for a search object that has a lower correlation with another search object.

18. The information processing system according to claim 2, wherein the second local feature generating unit includes an accuracy adjusting unit configured to adjust an accuracy of the second local feature, and the recognizing unit is configured to confirm the search object based on a second local feature generated by the second local feature generating unit by adjusting to a higher accuracy.

19. An information processing method in an information processing system including a first local feature storing unit that is configured to store, in association with each other, a search object and m-number of first local features which are respectively constituted by a feature vector of 1 dimension to i dimensions and which are generated for each of m-number of local areas including each of m-number of feature points in an image of the search object, the method comprising the steps of:

extracting n-number of feature points from an image of a video captured by first imaging unit and generating n-number of second local features respectively constituted by a feature vector of 1 dimension to j dimensions for n-number of local areas including each of the n-number of feature points; and selecting a smaller number of dimensions among the number of dimensions i of the feature vector of the first local feature and the number of dimensions j of the feature vector of the second local feature, and recognizing that the search object exists in the image in the video when determining that a prescribed ratio or more of the m-number of first local features constituted by a feature vector up to the selected number of dimensions corresponds to the n-number of second local features constituted by a feature vector up to the selected number of dimensions.

\* \* \* \* \*